United States Patent [19]
Evans et al.

[11] Patent Number: 5,658,037
[45] Date of Patent: Aug. 19, 1997

[54] RETRACTABLE CLOSURE SYSTEM

[76] Inventors: Jeffrey L. Evans, 3590 State Rte. #225, Diamond, Ohio 44412; William G. Oldfield, 4342 Timberbrook, Canfield, Ohio 44406; Donald L. Price, 7960 Market St. #4, Boardman, Ohio 44512

[21] Appl. No.: 372,773

[22] Filed: Jan. 13, 1995

Related U.S. Application Data

[63] Continuation-in-part of Ser. No. 220,824, Mar. 31, 1994, abandoned.

[51] Int. Cl.$^6$ ................................................ B60P 7/02
[52] U.S. Cl. .................... 296/98; 296/100; 160/122; 160/311; 160/317
[58] Field of Search ........................ 296/43, 98, 100, 296/101, 138, 140, 141, 142, 181; 160/41, 120, 122, 241, 243, 290.1, 311, 317; 52/2.13

[56] References Cited

U.S. PATENT DOCUMENTS

| 77,499 | 5/1868 | Legg et al. |
| 1,169,927 | 2/1916 | Collier. |
| 1,295,712 | 2/1919 | Drew. |

(List continued on next page.)

FOREIGN PATENT DOCUMENTS

| 2747-603 | 4/1979 | Germany | 296/100 |
| 2-117419 | 5/1990 | Japan | 296/100 |
| 1262880 | 2/1972 | United Kingdom . | |
| 1262879 | 2/1972 | United Kingdom . | |
| 1542812 | 3/1979 | United Kingdom . | |
| 1542811 | 3/1979 | United Kingdom . | |
| 2049568 | 12/1980 | United Kingdom . | |
| 2106166 | 4/1983 | United Kingdom . | |
| 2124159 | 2/1984 | United Kingdom . | |

OTHER PUBLICATIONS

Allvan Corp., 1 pg. brochure entitled "Allvan Tautliner" LaVergne, TN (date unknown but believed prior to Mar. 1994).

Allvan Corp., 2 pg. brochure entitled "Sesam 'Tops' for Top Loading" (date unknown but believed prior to Mar. 1994).

Cramaro Tarpaulin Systems, Inc., 3 pg. brochure entitled "Tarp–All" (date unknown but believed prior to Mar. 1994).

Donovan Enterprises, Inc., 6 pg. brochure entitled "Donovan Enterprises, Inc. Heavy Duty Truck Division" (date unknown, believed prior to Mar. 1994).

(List continued on next page.)

*Primary Examiner*—Dean Kramer
*Attorney, Agent, or Firm*—Fay, Sharpe, Beall, Fagan, Minnich & McKee

[57] ABSTRACT

A retractable closure includes a flexible sheet that is comprised, at least in part, of torsion spring material that causes the flexible sheet to form a roll when retracted. The flexible sheet preferably is of sufficient length and width, when extended, typically to close, cover, curtain or partition a selected area. In preferred practice, the torsion spring material comprises a plurality of torsion spring members carried in separate pockets of the flexible sheet at intervals spaced across the width of the flexible sheet. The flexible sheet is unrolled and extended lengthwise by pressurizing and expanding a plurality of elongate fluid-pressure-expansible members that are connected to the flexible sheet, with the expansible members extending along a selected portion of the length of the sheet at intervals spaced across the width of the sheet—preferably with each expansible member carried in a separate pocket of the flexible sheet. The flexible sheet is retracted lengthwise and formed into a roll under the influence of the torsion spring members during the release of pressurized fluid from the expansible members. Other aspects of the invention relate to features of component parts that preferably are utilized in assembling a retractable closure; to a manner in which closure components are connected to advantageously provide for relative movement between torsion springs and flexible sheet material during retraction and extension of the closure; and to a preferred manner in which the extended closure is tensioned and held in place when the closure is utilized to close a side opening of a freight hauling vehicle.

54 Claims, 15 Drawing Sheets

U.S. PATENT DOCUMENTS

| | | |
|---|---|---|
| 1,298,733 | 4/1919 | King . |
| 1,476,002 | 12/1923 | McPhaill et al. . |
| 1,697,087 | 1/1929 | Reardon . |
| 1,772,892 | 8/1930 | Green . |
| 1,960,096 | 5/1934 | Winner . |
| 1,973,382 | 9/1934 | Merkl . |
| 2,114,754 | 4/1938 | Wasberg . |
| 2,234,685 | 3/1941 | Vance . |
| 2,446,800 | 8/1948 | Arrighi . |
| 2,573,441 | 10/1951 | Hess . |
| 2,576,613 | 11/1951 | Lermont . |
| 2,585,976 | 2/1952 | Teeter . |
| 2,807,499 | 9/1957 | Duddleston . |
| 2,811,321 | 10/1957 | LaBarre . |
| 2,814,997 | 12/1957 | Deam . |
| 2,891,612 | 6/1959 | Johnson et al. . |
| 2,986,424 | 5/1961 | Larsen . |
| 2,991,116 | 7/1961 | Andrews . |
| 3,035,531 | 5/1962 | Leriche . |
| 3,185,112 | 5/1965 | Johnston . |
| 3,231,006 | 1/1966 | Fisher et al. . |
| 3,252,730 | 5/1966 | Chieger et al. . |
| 3,266,837 | 8/1966 | Stricker et al. . |
| 3,306,344 | 2/1967 | Youngs ................................ 160/241 |
| 3,393,920 | 7/1968 | Ehrlich . |
| 3,397,009 | 8/1968 | Landenberger . |
| 3,453,020 | 7/1969 | Santillo, Jr. . |
| 3,467,431 | 9/1969 | Turcotte . |
| 3,499,680 | 3/1970 | Stroebel . |
| 3,641,943 | 2/1972 | O'Neill . |
| 3,709,552 | 1/1973 | Broadbent . |
| 3,785,694 | 1/1974 | Sargent . |
| 3,829,154 | 8/1974 | Becknell . |
| 4,014,377 | 3/1977 | Kochanowski . |
| 4,046,416 | 9/1977 | Penner . |
| 4,103,368 | 8/1978 | Lockshaw . |
| 4,225,175 | 9/1980 | Fredin . |
| 4,230,171 | 10/1980 | Baker, Sr. . |
| 4,256,164 | 3/1981 | Ageaoili . |
| 4,272,119 | 6/1981 | Adams . |
| 4,302,043 | 11/1981 | Dimmer et al. . |
| 4,302,044 | 11/1981 | Sims . |
| 4,335,915 | 6/1982 | Knapp . |
| 4,380,350 | 4/1983 | Block . |
| 4,397,347 | 8/1983 | Brabant . |
| 4,408,793 | 10/1983 | Broadbent . |
| 4,433,711 | 2/1984 | Lew ................................ 160/241 |
| 4,453,875 | 6/1984 | Johnson, Sr. . |
| 4,471,500 | 9/1984 | Long et al. . |
| 4,484,777 | 11/1984 | Michel . |
| 4,505,512 | 3/1985 | Schmeichel et al. . |
| 4,545,611 | 10/1985 | Broadbent . |
| 4,671,562 | 6/1987 | Broadbent . |
| 4,691,957 | 9/1987 | Ellingson . |
| 4,700,985 | 10/1987 | Whitehead . |
| 4,821,785 | 4/1989 | Rolan . |
| 4,827,997 | 5/1989 | Rolan . |
| 4,834,445 | 5/1989 | Odegaard . |
| 4,874,196 | 10/1989 | Goldstein et al. . |
| 4,909,563 | 3/1990 | Smith . |
| 4,915,439 | 4/1990 | Cramaro . |
| 4,947,937 | 8/1990 | Searer et al. . |
| 4,987,942 | 1/1991 | Eriksson ................................ 160/122 |
| 5,002,328 | 3/1991 | Michel . |
| 5,007,672 | 4/1991 | Koch . |
| 5,031,955 | 7/1991 | Searfoss . |
| 5,044,689 | 9/1991 | Evers . |
| 5,050,923 | 9/1991 | Petelka . |
| 5,058,956 | 10/1991 | Godwin, Sr. . |
| 5,085,473 | 2/1992 | Yang . |
| 5,096,250 | 3/1992 | Menz . |
| 5,125,713 | 6/1992 | Willingham et al. . |
| 5,129,698 | 7/1992 | Cohrs et al. . |
| 5,152,575 | 10/1992 | DeMonte et al. . |
| 5,165,461 | 11/1992 | Haddad, Jr. . |
| 5,174,625 | 12/1992 | Gothier et al. . |
| 5,179,991 | 1/1993 | Haddad, Jr. . |
| 5,180,203 | 1/1993 | Goudy . |
| 5,186,231 | 2/1993 | Lewis . |
| 5,205,605 | 4/1993 | Haddad, Jr. . |
| 5,211,441 | 5/1993 | Barkus et al. . |
| 5,238,287 | 8/1993 | Haddad, Jr. . |
| 5,275,459 | 1/1994 | Haddad, Jr. . |
| 5,282,663 | 2/1994 | Horton . |
| 5,328,228 | 7/1994 | Klassen . |
| 5,332,021 | 7/1994 | Todd et al. . |

OTHER PUBLICATIONS

Fruehauf Trailer Corp., 4 pg. brochure entitled "Fruehauf Curtain–Side Trailers" (date unknown, believed prior to Mar. 1994).

Fruehauf Trailer Corp., 8 pg. brochure entitled "The Fruehauf Select Platform Series" No Date (Other Art Continued on pp. 6 and 7).

Great Dane Trailer Corp., 2 pg. brochure entitled "Curtain–side Van Trailers", (date unknown, believed prior to Mar. 1994).

Heavy Duty Trucking article entitled "Curtainsides For Free Trade" pp. 82–82 (Jul., 1993).

Merlot Tarpaulin & Sidekit Mfg. Co., 1 pg. brochure entitled "Flat Bed Custom Merlot Side Kit" (date unknown, believed to be prior to Mar. 1994).

Merlot Tarpaulin & Sidekit Mfg. Co., 1 pg. brochure entitled "Merlot Side Kit Options" (dated unknown, believed to be prior to Mar. 1994).

Merlot Tarpaulin & Sidekit Mfg. Co., 1 pg. brochure entitled "Fiber–Lite Side–Kit Panels" (date unknown, believed to be prior to Mar. 1994).

Merlot Tarpaulin & Sidekit Mfg. Co., 1 pg. brochure entitled "Mer–lite Side–Kit Panels" (date unknown, believed to be prior to Mar. 1994).

Merlot Tarpaulin & Sidekit Mfg. Co., 1 pg. brochure entitled "Now! Save with the New Sundance ECONO–KIT" (date unknown, believed prior to Mar. 1994).

Merlot Tarpaulin & Sidekit Mfg. Co., 4 pg. fax to North East Transfer dated Apr. 1, 1994.

O'Neal Tarpaulin Co., 1 pg. 2–sided brochure entitled "AIRLOCKE Model SP Inflatable Dock Seal" (date unknown, believed prior to Mar. 1994).

O'Neal Tarpaulin Co., 4 pg. brochure entitled "Stop . . . Airlocke Soft Pressure Dock Seals" date unknown, believed prior to Mar. 1994).

Till–Fab Ltd., 3 pg. brochure entitled "ROOL–TITE Flat Deck Tarping Systems" (date unknown, believed prior to Mar. 1994).

Utility Trailer Mfg. Co., 8 pg. brochure entitled "The Utility Tautliner For Carriers That Mean Business" (date unknown, believed prior to Mar. 1994).

Utility Trailer Mfg. Co., 4 pg. brochure entitled "The Utility Tautliner Truck Body" (date unknown, believed prior to Mar. 1994).

Vulcan Spring & Mfg. Co., 12 pg. brochure entitled "VULCAN Constant Force Spring Design Guide" (date unknown, believed prior to Mar. 1994).

Donovan Enterprises, Inc., 6 pg. brochure entitled "Donovan Enterprises, Inc. Heavy Duty Truck Division" (date unknown, believed prior to Mar. 1994).

Donovan Enterprises, Inc., 6 pg. brochure entitled "Donovan Enterprises, Insulated Products Division" (date unknown, believed prior to Mar. 1994).

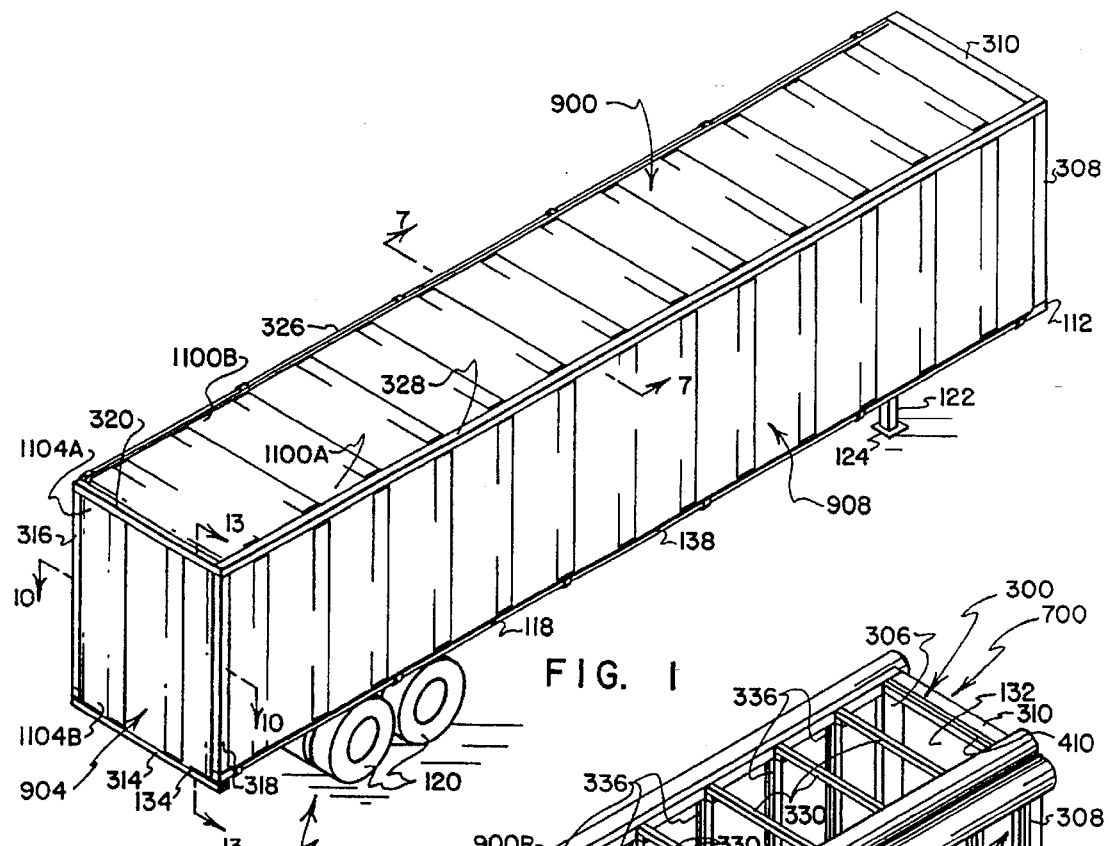

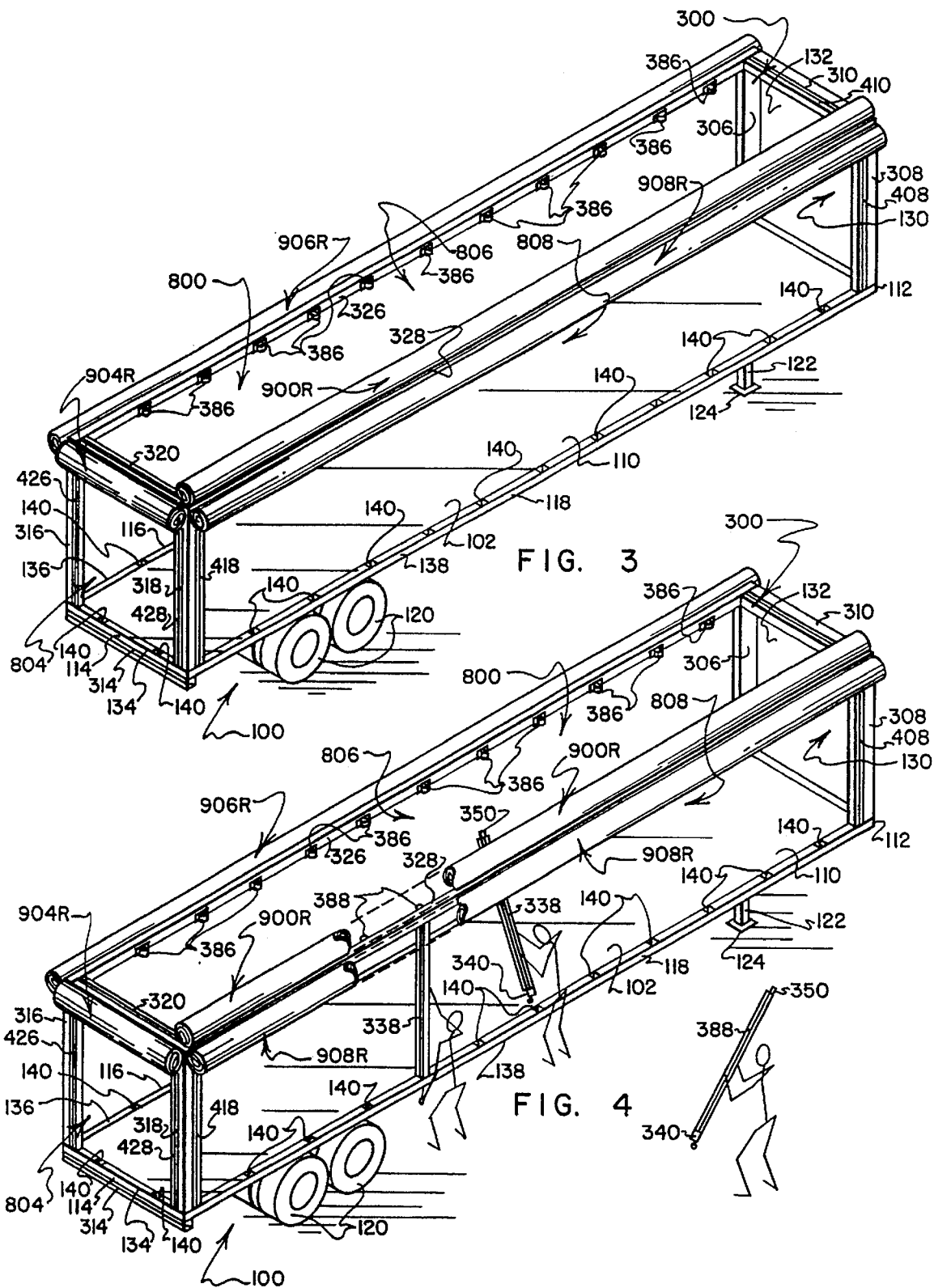

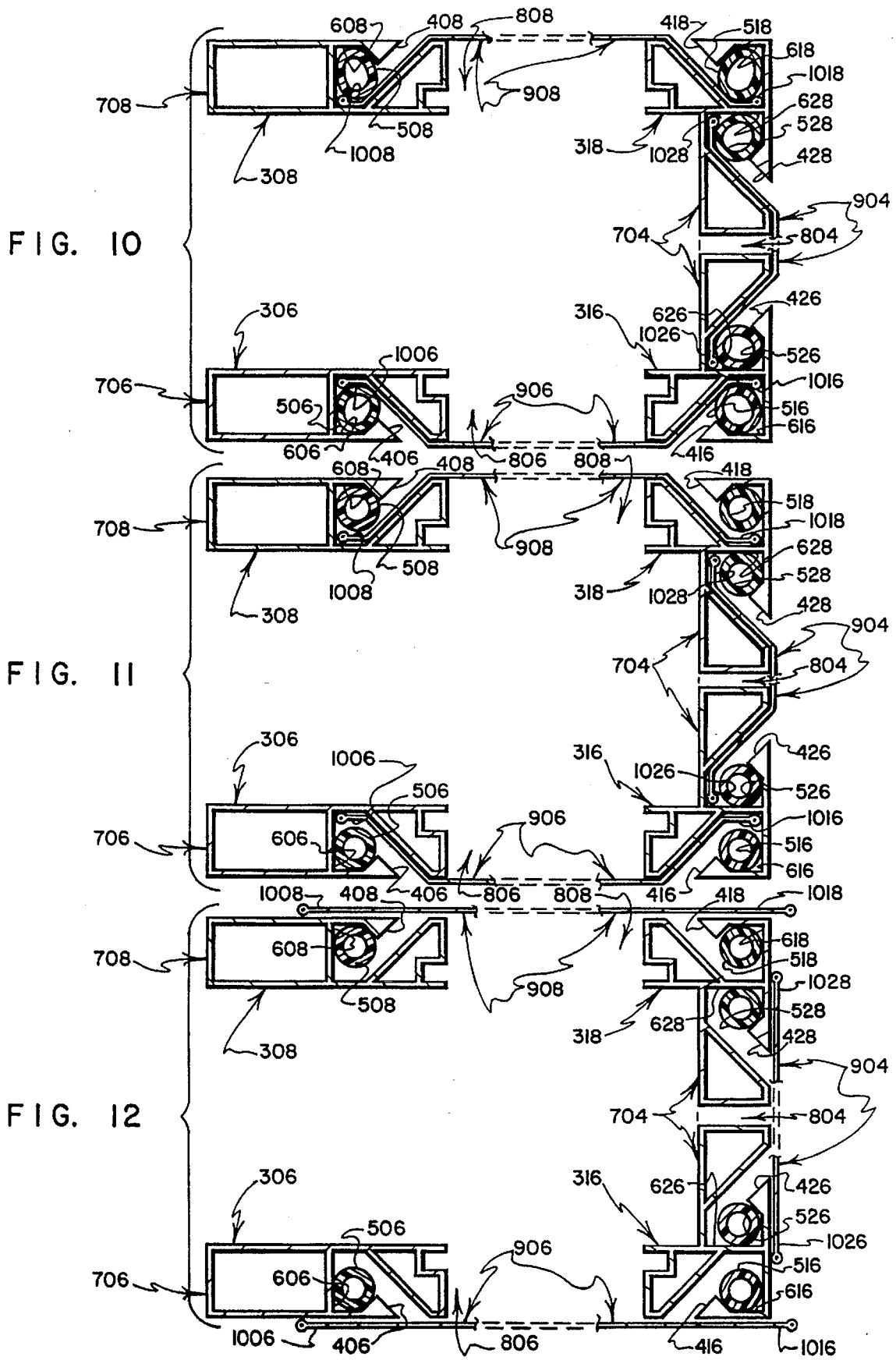

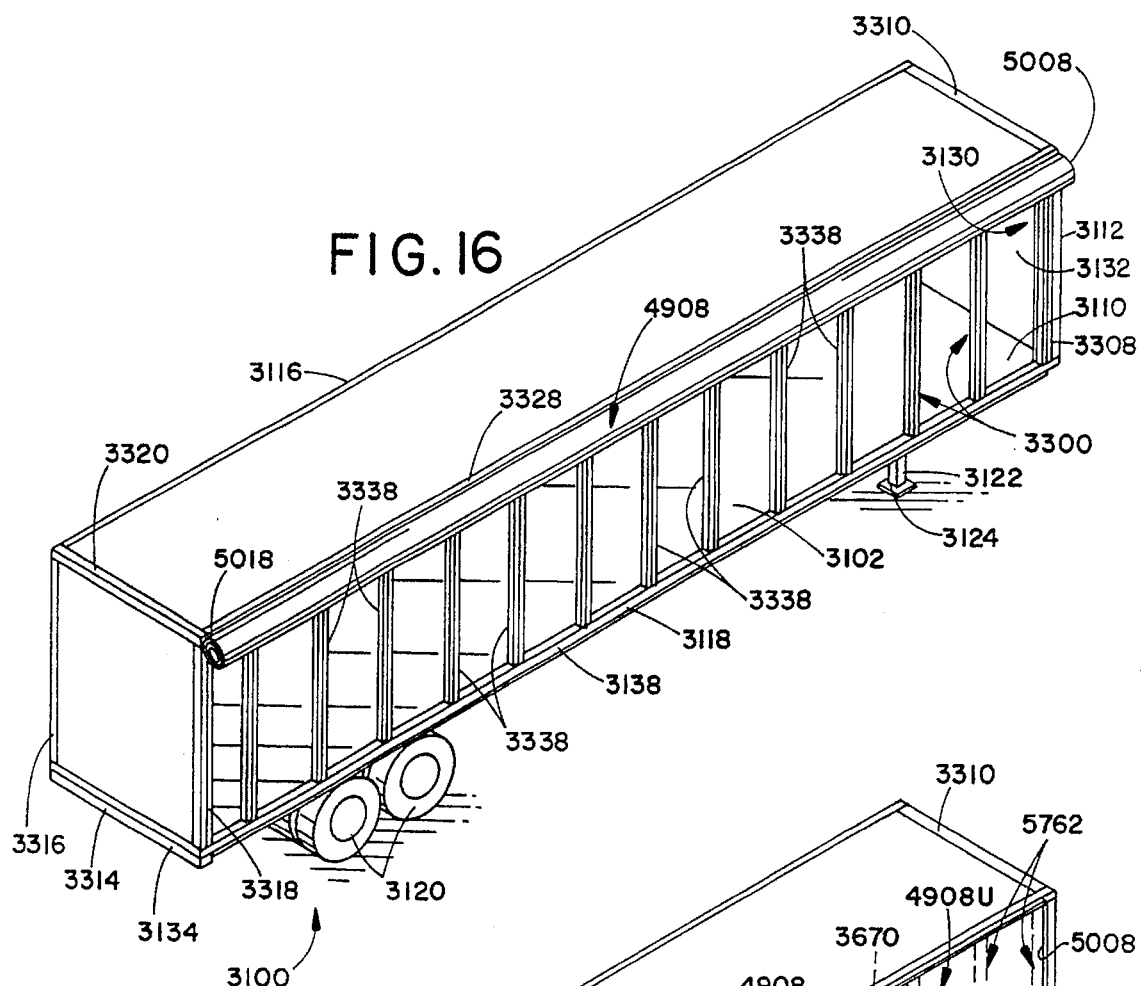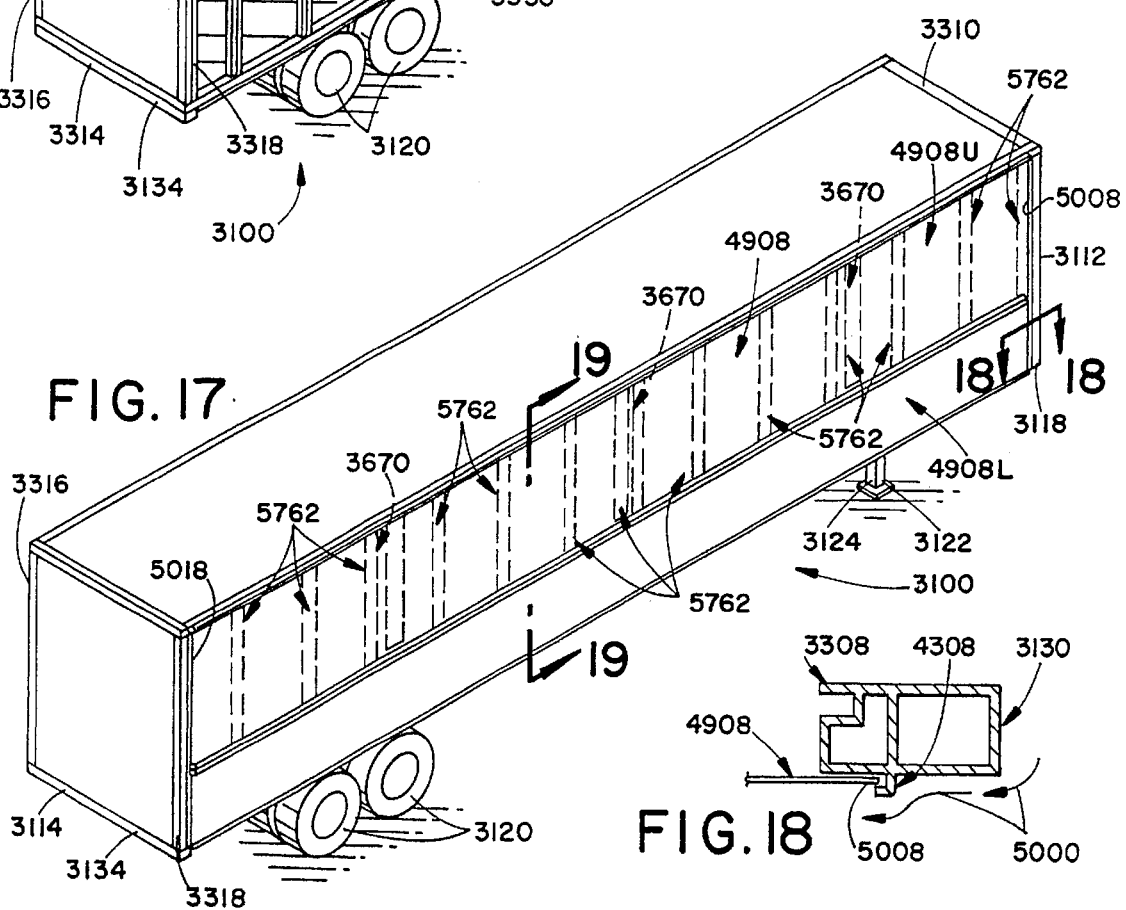

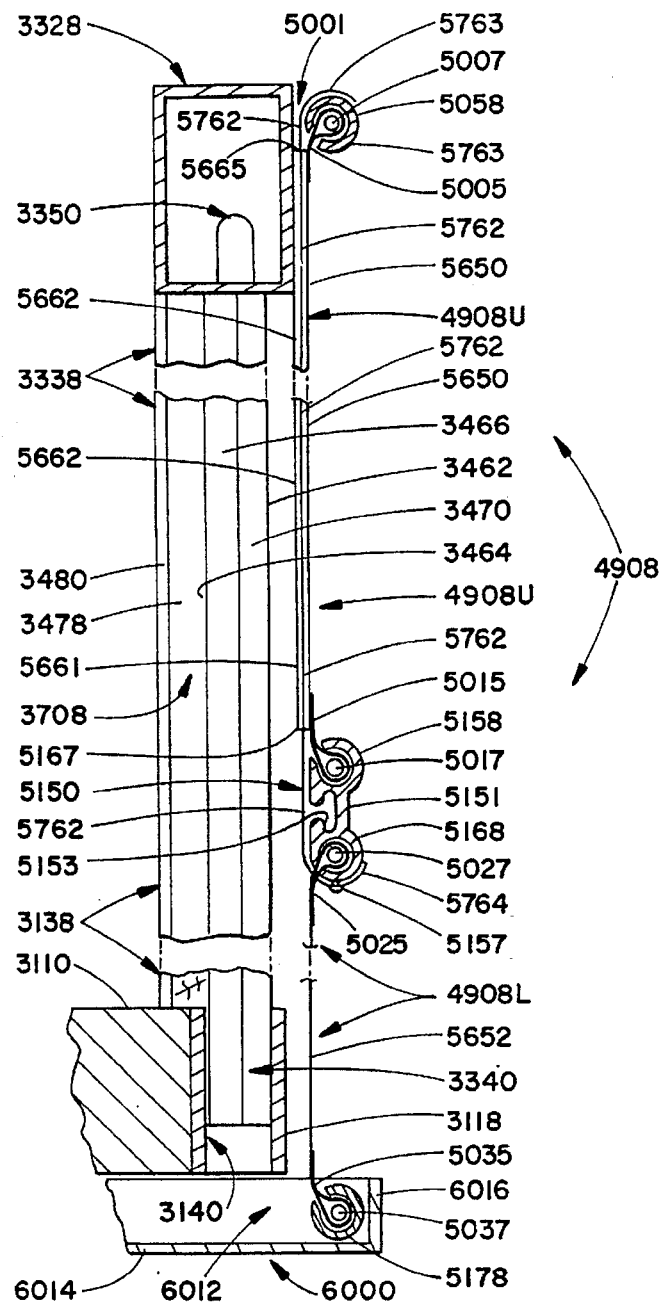
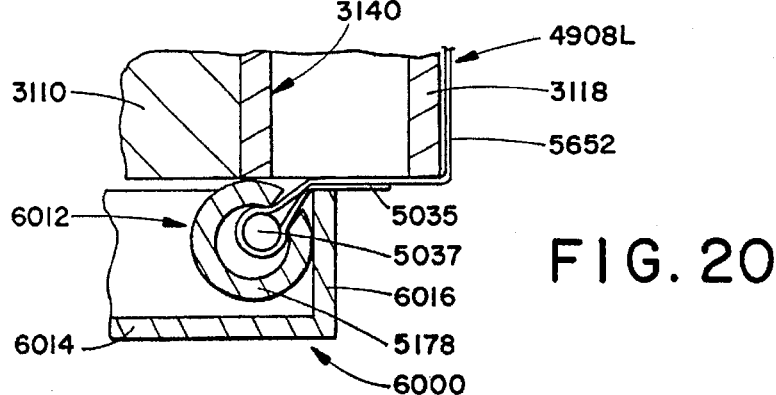
FIG. 19
FIG. 20

RETRACTABLE CLOSURE SYSTEM

CROSS-REFERENCE TO RELATED APPLICATION

The present application is a continuation-in-part of application Ser. No. 08/220,824 filed Mar. 31, 1994 now abandoned by Jeffrey E. Evans, William G. Oldfield and Donald L. Price entitled RETRACTABLE CLOSURE SYSTEM (referred to hereinafter as the "Parent Case"), the disclosure of which is incorporated herein by reference.

BACKGROUND OF THE INVENTION

1. Field of the Invention

The present invention relates to a retractable closure system that employs a flexible, top-hung, upwardly retractable, downwardly extensible, curtain-like closure which is formed from a combination of tear-resistant fabric and torsion spring material having a "retracted form memory" that normally causes the closure to coil during retraction to form a roll when retracted, and that utilizes the action of a power operated means and the influence of gravity to overcome the action of the spring material to cause the closure to extend by being "unrolled," with the power operated means preferably taking the form of a spaced array of fabric connected, vertically extending, fluid-pressure-expansible members that inflate when pressurized to extend the closure, and that deflate when depressurized to permit the closure to retract and roll-up under the influence of the torsion spring material. In preferred practice, the torsion spring material and the pressure expansible members extend along and connect with only an upper portion of the tear-resistant fabric—an arrangement that causes closure "roll-up" during retraction to be initiated near the juncture of upper and lower portions of the curtain-like closure so that the lower portion of the curtain-like closure is caused to be coiled into a "double roll" together with the upper portion, with this form of closure being particularly well suited for use in selectively opening and closing side walls of a freight hauling vehicle such as a semi-trailer. An optional vehicle-connected tensioning and latching system is disclosed for releasably retaining the closure in its "extended" or "closed" position. Improved components for mounting and connecting closure components also are disclosed.

2. Prior Art

The use of flexible closures such as tarpaulins to close, cover, curtain or partition selected areas typically has associated therewith a number of drawbacks. Among these shortcomings are difficulties that tend to be encountered 1) in drawing flexible closures into proper "extended" or "closed" positions, 2) in securing flexible closures once they have been properly extended or closed, 3) in establishing suitable weather resistant seals about the perimeters of properly extended or closed closures, 4) in retracting flexible closures when they are to be retracted or withdrawn from their extended or closed positions, and 5) in protectively storing flexible closures after they have been retracted or withdrawn from their extended or closed positions.

The relatively heavy, bulky and very flexible nature of large tarpaulins often cause such closures to be quite difficult to draw into properly extended or closed positions for service as closures, covers, curtains and partitions. Areas across which tarpaulins are to be stretched often are defined by tall or otherwise relatively inaccessible framework that prevents ready access. Wind, rain and other environmental factors such as the presence of snow and ice often contribute to the difficulty that is encountered in moving tarpaulins into position. The size, shape and other characteristics of a structure that is to be covered also may significantly complicate the effort that must be expended to draw a tarpaulin into a proper operating position, especially if the structure that is to be covered has pointed projections or other formations that may tend to cut, impale or otherwise hinder the damage-free positioning of areas of a tarpaulin that contact such formations.

Releasably securing a tarpaulin in its extended or closed position typically calls for the use of a relatively large number of ropes or straps that individually must be drawn taut and tied in place. The investment of time and effort that typically must be expended to properly secure a tarpaulin to prevent its being drawn out of proper position and/or damaged by wind, rain or other environmental conditions often proves to be unwieldly.

If weather-tight seals need to be established about any significant portion of the perimeter of a tarpaulin, prior proposals typically call for the relatively clumsy use of tape or other disposable means for establishing make-shift "seals" that seldom are capable of serving more than a single use. The need to repeatedly check the integrity of and to repeatedly repair clumsily formed, make-shift seals that extend perimetrically about portions of tarpaulins represents quite an unsatisfactory characteristic that has come to be associated with present-day use of tarpaulins as flexible covers.

Because tarpaulins in present day use tend to be "retracted" by substantially the same sort of primitive "pulling and tugging" technique that typically is used to effect movement into an extended or closed position, the business of removing or withdrawing tarpaulins from their operating positions tends to be characterized by substantially the same types of drawbacks that are associated with moving tarpaulins into their operating positions. Moreover, damage to tarpaulins that is occasioned during removal from service often exceeds damage that is incurred during installation both because "removed" covers tend to be jerked and tossed about with somewhat less care than characterizes the handling of such covers while they are being "installed," and because removed covers often are "dropped" with abandon once they have been pulled free from the structures on which they have been supported during use.

Storing a flexible cover such as a tarpaulin when it is not in use typically has been attended to in one of two ways: 1) by folding the tarpaulin and removing it to a storage location where it usually is protectively housed to prevent its being exposed to the elements; or 2) by gathering portions of the tarpaulin to form some manner of roll or bundle of closure material that is lashed together or otherwise secured so it can be held in place at a location that is relatively near where the tarpaulin next will be put into service. Folding or bundling a flexible closure such as a tarpaulin requires an undesirable investment of time and effort, and easily can cause significant wear and tear unless a special effort is made to protect the integrity of the tarpaulin during the exercise. If protective storage enclosures are to be provided to properly shield folded or bundled tarpaulins from the effects of weather and the like, the cost of providing such enclosures, and of providing upkeep adds to the cost that is associated with the use of tarpaulins.

Over-the-road freight hauling vehicles such as flat bed trucks and trailers provide particularly demanding environments wherein flexible covers and closures such as tarpaulins are used to retractably cover and close top, side and rear wall openings through which loading and unloading access periodically must be provided. In recognition of drawbacks (such as are described above) that typically are encountered when tarpaulins are to be used to selectively cover top, side and rear wall openings of freight hauling vehicles, a variety of proposals have been made in an effort to provide so-called "curtainside vehicles" with permanently attached, movably mounted flexible closures that can be retracted and extended between "retracted" and "extended" operating positions.

A number of proposals for "curtainside vehicles" call for the use of manually movable, track-mounted closures with accordion-fold walls. Closure supports that are utilized in implementing these proposals tend to be either 1) relatively primitive and difficult to operate, or 2) unduly complex, expensive and subject to breakdown.

Other proposals call for "curtainside vehicles" to employ spindle-mounted sheets of tarpaulin-like flexible closure material that are "rolled" and "unrolled" to move the sheets between storage and operating positions. Electric motors, electrical controls and interconnecting circuitry typically are provided to operate the rolls to effect retraction and extension of the closure material, together with a number of relatively movable drive components—all of which adds undesirable weight and complexity, and tends to unduly encumber the vehicles on which such components are carried.

To render so-called "curtainside vehicles" easier to load and unload, various types of removable wall components have been proposed for use in the framework of side and top walls. Component removability is desired so that side and top walls can be "opened" sufficiently to permit vehicle loading and unloading to take place in a substantially obstruction-free manner. Complicating the need to provide removable side and top wall components is a competing need that must be addressed concurrently, namely the need to retain in place a sufficient number of side and top wall components to ensure that the retracted closure members continue to be properly supported. Providing an ideal type of support system that not only includes a relatively large number of removable components but also serves to adequately support retracted closures presents a challenge that has not been adequately addressed by prior proposals. Also inadequately addressed by prior proposals is the need that often arises for removable component wall structures to serve as so-called "load bearing walls"—wall structures that will withstand being engaged and impacted by shifting cargo and the like.

3. The Referenced Parent Case

While the above-referenced Parent Case addresses many of the needs and shortcomings delineated above, the present application builds upon the subject matter of the Parent Case and presents to a number of improvement features, many of which can be employed not only on new curtain-like closure embodiments that are disclosed in the present document, but also on curtain-like closure embodiments of the type that are disclosed in the Parent Case.

While the Parent Case discloses closure features that are applicable to a curtain-like closures of a variety of types and/or that extend in a variety of orientations, the present case discloses a number of improvements that are particularly well suited for use with top-hung, upwardly retractable, downwardly extensible, curtain-like closures that are formed from a tear-resistant fabric and that are used for such purposes as selectively closing side openings of freight carrying vehicles—closures that utilize the action of a power operated means and the influence of gravity to overcome the action of torsion spring members to cause the closures to extend by being "unrolled" in a downward direction, and that utilize the action of the torsion spring members to cause the closures to coil during upward retraction movement, with each curtain forming a separate roll when it is in its retracted position.

Stated in another way, whereas the Parent Case represented work of the three named inventors that took place during initial phases of a continuous and continuing program of research and development, the present application represents an improved work product that has emerged as the result of a continuing investment in this program—a work product that preferably incorporates novel and improved features that are particularly well suited for use in selectively closing vertically extending side wall openings of over-the-road freight hauling vehicles. Because much as been learned as retractable closures of the type disclosed in the referenced Parent Case have begun to be tested on over-the-road freight hauling vehicles, the present application addresses needs that have been discovered for improvement features, and discloses retractable closure improvement features that provide advantages that enhance and extend beyond the scope of the invention of the referenced Parent Case.

SUMMARY OF THE INVENTION

The present invention addresses the foregoing and other drawbacks of the prior art by providing a novel and improved retractable closure system for selectively extending from a roll and retracting into a roll a curtain of flexible closure material without requiring manual assistance. Improved component parts for assembling retractable closures are disclosed, as are retractable closure assemblies that feature improved ease of assembly and repair, and other structural features that offer improved operational performance.

A significant feature that the present invention shares in common with the invention of the referenced Parent Case is "simplicity." In preferred practice, both the present invention and the invention of the referenced Parent Case (referred to collectively hereinafter as "the present and Parent Case inventions") permit flexible, retractable, curtain-like closures to be formed from simple sets of rugged components that, when assembled, provide flexible closures that are of extremely durable, long-lived character.

While retractable closures of a wide variety of shapes and sizes can embody features of the present and Parent Case inventions, it will be understood that, for the sake of convenience, retractable closures that are disclosed in the present document and in the Parent Case are of generally rectangular shape, having length and width dimensions that typically are greater than "a meter" or "a yard." For example, in the drawings of both the present case and the referenced Parent Case, retractable closures, each measuring a plurality of yards both in length and width, are depicted— with the actual size of the closures being selected typically to provide closures for side wall openings of what are known to those who are skilled in the art as "curtainside trailers."

In accordance with preferred practice of the present and Parent Case inventions, the "length" dimension of a particular closure is measured in a direction that aligns with the path of movement that is followed by portions of the closure in moving between "retracted" and "extended" positions. Thus, for example, 1) where a closure embodying the present invention is to be "unrolled" (in a vertically downwardly extending direction from an overhead location where a retracted roll of closure material is "top hung") in moving from its retracted position to its extended position, and 2)

where the closure "rolls up" in moving from its extended position toward its retracted position, the "length" of the closure is considered to be the vertically measured "height" of the closure (when extended); and the "width" of the closure is considered to be the closure's horizontal dimension.

In accordance with preferred practice of the present and Parent Case inventions, "extension" and "retraction" members extend "lengthwise" with respect to their associated sheet of flexible closure material (i.e., along the length of the closure). And, in accordance with preferred practice, the "extension" and "retraction" members are situated in side-by-side relationship at spaced locations spread across the width of the closure. Thus, the extension and retraction members can be said to "run lengthwise" with respect to the retractable closures that they operate, and can be said to be "spaced across the width of" the retractable closures that they operate.

Significant feature of retractable closures that embody the preferred practice of the present and Parent Case inventions reside in the fact that they employ no "external" drive systems that contain many relatively movable parts for extending and retracting the sheets of flexible closure material. There are no rotatably mounted drums on which the curtain-like closures are spindled for retraction and extension. There are no piston rods that project in one direction and withdraw in an opposite direction to effect curtain extension and retraction, no drive screws that rotate and counter-rotate to move carriages between extended and retracted positions for extending and retracting the curtain, no tracks within which bearing hangers must travel forwardly and rearwardly to extend and retract a curtain—which components commonly are utilized in implementing prior proposals, but are neither required nor desired in implementing the preferred practice of the present and Parent Case inventions.

What the present and Parent Case inventions preferably utilize (in place of "external" drive systems having many relatively movable parts) are lightweight curtain type closures are correspondingly lightweight extension and retraction members that are coupled to sheets of relatively lightweight, flexible closure material—with connections preferably being formed between the sheet and its extension and retraction members by means of pocket formations into which the extension and retraction members are slidably inserted.

"Extension" members preferably are selected so that, when they "extend," they do so in a relatively forceful manner so as to effect extension movement of the sheet of flexible closure material to which they are attached or otherwise suitably connected. Likewise, "retraction" members preferably are selected so that, when they "retract," they do so in a relatively forceful manner so as to effect retraction movement of the sheet of flexible closure material to which they are attached or otherwise suitably connected.

In preferred practice, the "extension" members 1) are not self-biased toward either of their "extended" or "retracted positions; rather, they 2) preferably take the form of elongate, tubular, fluid-pressure-expansible members that extend forcefully longitudinally with respect to their associated sheet of flexible closure material Only when "pressurized" (e.g., by being connected to a source of pressurized fluid such as compressed air), and 3) preferably are attached or otherwise connected to selected portions of their associated sheet of flexible closure material so as to effect extension of the associated sheet of flexible closure material only when the extension members are expanded (e.g., by being connected to a source of pressurized fluid such as compressed air).

In preferred practice, the "retraction" members 1) are self-biased toward their "retracted" position, 2) preferably take the form of thin, elongate, generally flat members (as viewed in cross section) that 3) can be laid out to extend substantially flat as they extend lengthwise with respect to the associated retractable closure, but that 4) require an application of force thereto to hold these members "extended" (with the force that is required being such force as is needed to counteract the normal self-biased tendency of these members to assume a helically coiled "retracted" configuration). In preferred practice the spring members are helically coiled torsion springs that have been formed from flat bands of spring steel that have been "wound" to define helically coiled shapes to which the spring members seek to return when they retract.

While it is within the contemplation of the present and Parent Case inventions to provide at least one of the needed types of "retraction" and "extension" components by incorporating the needed lengthwise retraction or extension characteristics in a material that also is used to form the flexible sheet (that defines principal parts of a retractable closure, cover, curtain or partition), preferred practice calls for the flexible sheet not to provide either the needed retraction capability or the needed extension capability of the retractable closure that it helps to form. Utilizing the flexible sheet to define neither the "retraction" nor "extension" members presently is believed to be preferable for the reason that, there undoubtedly will occur instances when one or more of the retraction or extension members will succumb to fatigue or will be damaged during use (perhaps due to impact with a moving vehicle or with some other form of foreign object), which will give rise to a need for maintenance and/or replacement.

By keeping the retraction and extension members separate from the largest component of a retractable closure (namely the flexible sheet of fabric or other material that is extended and retracted by the extension and retraction members), and by selecting the manner by which the extension and retraction members are attached or otherwise connected to the flexible sheet so that ready access is provided to the extension and retraction members for purposes of maintenance and/or replacement, the resulting closure should be rendered relatively easy to maintain, and should, therefore, be capable of being kept in service far longer than would be the case if the nature of the extension or retraction members, or their manner of connection to the flexible sheet were rendered more complex so as to cause maintenance of the resulting closures to be rendered more difficult.

While it is within the contemplation of the present and Parent Case inventions to provide combination retraction/ extension members that serve both to provide needed retraction and needed extension capabilities, preferred practice presently calls for the requisite retraction and extension functions to be performed by separate retraction and extension members. Thus, although it clearly is possible to connect a normally coiled torsion spring to a length of fluid-pressure-expansible tubing (such as is used to form normally "flat" fire hoses) to form a "combination extension and retraction member," the present view remains that it is better to keep separate the functions and the physical embodiments of the retraction and extension members so that these separate members can be individually attached or otherwise suitably connected to a sheet of flexible material to form a retractable closure that easily can be maintained as by accessing only such ones of these members as may require service and/or replacement. It is believed that this "keep separate/keep simple" approach will, in the long run, prove to provide retractable closures that can be kept in service for very long periods of time through the judicious use of simple service and/or replacement techniques.

The "extension" and "retraction" members preferably are selected such that they have an elongate form that can extend lengthwise along their associated sheet of flexible closure material in intimate contact therewith, and that can lie relatively flat so as to be "coiled up" (or otherwise "collected" in a suitably configured "retracted" form) when the flexible sheet is "coiled up" (or otherwise "collected" in a suitably configured "retracted" form) during retraction. Because the retraction and extension members "coil up with" and otherwise essentially "comprise component parts of" their associated sheet of flexible closure material, these "operating components" do not function in the manner of "external" actuators that apply "external force" to a sheet of flexible closure material—as is the case with power-retracted and power-extended retractable closures that embody prior proposals. Rather, these sheet-shape-conforming "operating components" essentially comprise integral parts of a flexible sheet of closure material and can be thought of as effecting extension and retraction movements essentially by gently applying only a minimum of required "internal force," namely precisely the magnitude of force that is needed in order to effect desired "operation" of the closure.

Thus, an important characteristic of curtain-like closures that embody the preferred practice of the present and Parent Case inventions resides in the adequately forceful yet inherently gentle and controlled manner in which the closures retract and extend. Whereas closures that embody prior proposals were caused to retract and extend by application of "external force" to the flexible fabric of the closures, closures that embody the preferred practice of the present invention extend and retract under the influence of essentially "internally generated force." Whereas closures of prior art proposals often were caused to be damaged by the application of external force that proved to be of greater-than-intended magnitude, closures that embody the preferred practice of the present invention tend to generate internal force that is only of the magnitude that is required to effect operation of the closure. Accordingly, closures that embody the preferred practice of the present and Parent Case inventions tend not to be subjected to excessive force damage (of the type that obtains when external operating mechanisms are utilized to externally apply force that easily can exceed what is required to effect closure movement), and therefore tend to exhibit significantly longer service lives than are exhibited by closures of prior proposals.

In one form of preferred practice, the helically coiled torsion springs are of a type known as "constant force springs"—which means, among other things, that, at any given stage during spring-force-powered retraction of a sheet of material, the force that is being applied by equal lengths of the spring material to adjacent equal lengths of flexible sheet material are substantially equal—whereby, during retraction, a relatively lightweight end region of the flexible sheet will be the first part of the retractable closure that succumbs to the torsion coiling force that is generated by the springs, and that causes the portions of the retractable closure to "curl" or "roll up" as the tubular extension members are depressurized. As the presence of pressurized fluid within the extension members is progressively relieved or depleted, the retractable closure or curtain gently but steadily progressively retracts as by "rolling up" to form a helically wound coil or roll.

An option that can be used with either of the inventions of the present and Parent Cases is for selected edge regions of a curtain-like retractable closure to be "sealed" and/or "clamped" in place after the closure has been extended from its retracted position to its extended or operating position. In accordance with this option, receiving-slot-defining structures are provided that extend about selected portions of the perimeter of the extended closure; selected edge portions of the extended closure are slided into the receiving slots when it is desired to seal and/or clamp edges of the closure; and, fluid-pressure-expansible sealing members that are carried internally with respect to the receiving slots are inflated or otherwise expanded, and are thereby caused to clamp edge portions of the closure that are received within the receiving slots. By this arrangement, otherwise "loose edges" of a curtain-like closure member can be securely grasped, clamped, retained and sealed—and thus are prevented from detrimentally "flopping about" in the wind. Weathertight seals easily can be provided by this method to aid the closures in protecting curtain-enclosed cargo (and to serve a wide variety of other useful purposes).

Another option addresses a long-standing need to provide freight hauling vehicles with retractable closure "support frameworks" that are light in weight, that feature removable side wall stakes and removable top wall struts, and that are capable of serving as so-called "load bearing walls." Because retractable closures that embody the preferred practice of the present and Parent Case inventions are characteristically simple in form and light of weight, these simple-to-mount, lightweight closures can be carried by relatively simply configured support frameworks that can make use of the strength of these frames to serve as so-called "load bearing walls" that will withstand being engaged by cargo.

In some applications it is highly desirable for large numbers of side wall stakes and top wall struts to be removable from side and top wall portions of a closure-supporting framework so that, when closures are "retracted" (typically into "roll form configuration"), removal of side wall stakes and top wall struts will permit loads to be moved onto and off of the flat bed of a freight hauling vehicle in a substantially unobstructed fashion. Because closures that embody the preferred practice of the present and Parent Case inventions tend to be of relatively lightweight construction, they make possible the provision of relatively simply configured, relatively light-weight support structures from which substantially all but the "end-most" components can be removed—so that side and top wall openings can be provided that are substantially unobstructed for substantially the full length of the flat beds of freight hauling vehicles on which these support structures are mounted. Thus, another optional feature resides in the provision of component-removable support frames that are particularly well suited for supporting removable closures on freight hauling vehicles and the like.

During a continuing program of development, much has been learned, for example:

About the character of the material that preferably is used to form the main "fabric" of a retractable closure—including the desirability that such material exhibit a high degree of tear resistance and resistance to deformation so that the material remains in tact, holds its shape, and thereby exhibits good service life;

About the desirability of configuring selected edge regions of the "fabric" of a retractable closure to carry strips of "welt" material such as nylon cord, with the welt-carrying edges being received by and retained within elongate extrusions of hollow, rigid material such as aluminum extrusions that are of generally C-shaped cross section, to thereby provide a simple means of forming secure connections with the "fabric" of a retractable closure;

About the desirability of shielding the elongate "extension" and "retraction" members that are to be connected to the "fabric" of a retractable closure for cooperatively interacting to selectively extend and retract the closure, and about the desirability of maintaining a relatively smooth, relatively obstruction-free outer surface of the "fabric" of a retractable closure—with these objectives preferably being realized through the utilization of inwardly facing "pockets" of closure fabric that are provided so as to extend lengthwise along the inner surface of the "fabric" of a retractable closure to at least partially contain the extension and retraction members;

About the desirability of utilizing only a relatively small number of strategically placed extension members (that preferably are not located in close proximity to opposite vertically-extending ends of a top-hung retractable closure) in combination with a significantly greater number of substantially evenly spaced retraction members to thereby enhance the ability of a retractable closure to execute smooth extension and retraction movements that are of controlled character;

About the desirability of coordinating the locations of closure-carried retraction members with the locations of vehicle-carried, vertically extending, header support stakes so that the vertically extending stakes to assist in stabilizing the orientation of the retraction members of an extended closure—to enhance the stability of an extended closure, and to help ensure that the retraction members are not needlessly "cycled," for example during movement from place to place of a vehicle on which the closure may be mounted, to thereby thereby improve retraction member performance and longevity of service;

About the desirability of rigidly connecting elongate torsion spring members (that preferably comprise the retraction members of a retractable closure) to the "fabric" of a retractable closure at only one location along the length of each of the elongate spring members, with other portions of each of the elongate spring members being permitted to move (in directions extending along the lengths of the spring members) relative to the fabric of the closure—so that the spring members and the fabric of the closure can move relative to each other as may be needed (to coil and uncoil during extension and retraction of the closure), with the location of the rigid connection preferably being at the lower end region of each of the torsion spring members;

About the desirability of enhancing the longevity of service of elongate torsion spring members that preferably comprise the retraction members of a retractable closure by providing retraction-member-to-curtain end connections that preserve the normal "curl" of end regions of elongate torsion spring members;

About the desirability of not extending the extension and retraction members across a selected bottom section of a vertically hung retractable closure to minimize impact damage to the extension and retraction members (which is most likely to occur in the vicinity of the bottom section of a closure), and about the desirability of taking advantage of the absence of extension and retraction members in the bottom section to permit a retractable closure to execute an improved type of "double-wrap roll-up" movement during retraction;

About the advantages that can obtain if an upper section of a retractable closure (that has extension and retraction members extending along its length at locations spaced across its width) is extrusion-connected to a lower section of the closure (that has no extension and retraction members extending along its length), with the connecting extrusion taking a novel and advantageous form;

About the desirability of providing a retractable closure with a latching and tensioning system for releasably connecting with a bottom edge region of an "extended" retractable closure to selectively tension and releasably retain an "extended" closure in its "extended" position, for example during over-the-road travel of a vehicle on which the closure is mounted; and, About other features such as improved systems for use in securely retaining and stabilizing retractable closures in their extended (i.e., "closed") or retracted (i.e., "open") positions so that components of the closures, particularly the retraction members, are not subjected to undue wear and fatigue by being needlessly "cycled" during over-the-road travel and during other movement of vehicles on which the closures are mounted.

The foregoing and other improvements, taken singly and in various forms of combination, number among the features that are encompassed by the purview of the present invention.

BRIEF DESCRIPTION OF THE DRAWINGS

The foregoing and other features of the invention, including methods that make use of such features, will be better understood by referring to the description and the claims that follow, taken together with the accompanying drawings, 1) wherein FIGS. 1 through 15 are reproduced from the referenced Parent Case so that the disclosure of the present document will be complete, 2) wherein FIGS. 16 through 25 depict the preferred practice of the present invention, 3) wherein FIGS. 26 through 29 depict modified forms of the preferred practice of the present invention, and 4) wherein:

FIG. 1 is a perspective view of a flat bed trailer that is equipped with side, top and real walls that are selectively covered by retractable curtain-like closures that embody features of the invention of the referenced Parent Case, with all three of these retractable closures all shown in their extended positions;

FIG. 2 is a perspective view thereof that is similar to FIG. 1, but with the retractable closures all shown "rolled up" in their retracted positions, with removable components of the side and top walls shown in their installed positions;

FIG. 3 is a perspective view thereof similar to FIG. 2, but with removable components of the side and top walls having been removed;

FIG. 4 is a perspective thereof view similar to FIG. 3, but illustrating the manner in which removable side wall stakes are removed from and/or reinstalled to form component parts of the right side wall;

FIG. 5 is a partially exploded perspective view, on an enlarged scale, of selected components that are depicted in FIGS. 1–4, showing portions of a removable side wall stake, of a removable roof strut, and of a header to which both the stake and the strut are releasably connectable, with portions broken away and/or shown in cross-section;

FIG. 6 is a partially exploded sectional view as seen principally from a plane indicated by a line 6—6 in FIG. 2;

FIG. 7 is a sectional view, on an enlarged scale, as seen from a plane indicated by a line 7—7 in FIG. 1, with portions broken away and/or shown in cross-section, but with tie-down straps of the two depicted curtain-like closures disconnected from conventional "load binders" (not shown) that typically are utilized to draw the straps taut;

FIG. 8 is a sectional view similar to FIG. 7, but with the two depicted curtain-like closures retracted into helically coiled "rolls;"

FIG. 9 is a perspective view, portions of which are broken away and/or shown in cross-section, depicting features of components that are utilized in providing a typical curtain-type retractable closure of the type depicted in FIGS. 1–4;

FIG. 10 is a sectional view, on an enlarged scale, as seen from a plane indicated by a line 10—10 in FIG. 1, with portions broken away and/or shown in cross-section, and with expansible seals "expanded" to releasably grip opposed edges of the three depicted curtain-like closures;

FIG. 11 is a sectional view similar to FIG. 10, but with fluid pressure in the expansible seals having been sufficiently depleted to release the grip of the seals on opposed edges of the three depicted curtain-like closures;

FIG. 12 is a sectional view similar to FIG. 11, but with opposed edges of one of the three depicted curtain-like closures removed from groove-like receiving formations into which opposed edge portions of the closures are inserted when the opposed edge portions are to be releasably gripped by the expansible seals;

FIG. 13 is a sectional view, on an enlarged scale, as seen from a plane indicated by a line 13—13 in FIG. 1, with portions broken away and/or shown in cross-section, and with expansible seals "expanded" to releasably grip opposed edges of the two depicted curtain-like closures;

FIG. 14 is a sectional view similar to FIG. 13, but with the two depicted curtain-like closures retracted into helically coiled "rolls;"

FIG. 15 is a schematic depiction of one typical type of array of control valves, conduits and fluid pressure responsive members that preferably are utilized to effect extension and retraction of retractable closures that embody features such as are disclosed herein, and to operate optional clamping type seals that are provided to selectively engage edge regions of the closures when the closures are extended;

FIG. 16 is a perspective view, similar to FIG. 2, of a flat bed trailer that is equipped with a retractable right side wall closure that embodies the preferred practice of the present invention, with the retractable closure shown "rolled up" in its retracted position, and with removable components of the right side wall shown in their installed positions;

FIG. 17 is a perspective view, similar to FIG. 16, but with the retractable right side closure shown in its extended position, and with locations of retraction and extension members of the closure being indicated by hidden lines;

FIG. 18 is a sectional view, on an enlarged scale, as seen from a plane indicated by a line 18—18 in FIG. 17;

FIG. 19 is a sectional view, on an enlarged scale, as seen from a plane indicated by a line 19—19 in FIG. 17, with a lower portion of the closure shown received in a closure tensioning tray that is "open;"

FIG. 20 is a sectional view, on an even more enlarged scale, similar to FIG. 19, but showing only a lower portion thereof received in the closure tensioning tray, but with the tray "closed;"

FIG. 21 is a perspective view of the right side wall closure that is shown in cross-section in FIG. 18, but with portions broken away and/or shown in cross-section;

FIG. 22 is a sectional view similar to FIG. 19 but showing the retractable closure during an initial stage of retraction;

FIG. 23 is a sectional view, on an even more enlarged scale, similar to FIG. 22, but showing portions of the retractable closure "rolled up" to a retracted position;

FIG. 24 is a sectional view, on a smaller scale, showing portions of a power-operated system for "extending" and "retracting" the closure tensioning tray, with the tray being shown "open;"

FIG. 25 is a sectional view similar to FIG. 24, but with the tray being shown "closed;"

FIG. 26 is a perspective view similar to FIG. 21 but showing a modified form of the preferred embodiment of retractable closure, with the closure extended;

FIG. 27 is a sectional view similar to FIG. 26 but showing portions of the retractable closure retracted;

FIG. 28 is a sectional view similar to FIG. 27 but showing the retracted closure elevated by means of an optional mechanism for raising a retracted closure; and, FIG. 29 is a perspective view similar to FIGS. 21 and 26 but showing still another retractable closure embodiment that incorporates features of the present invention, with portions of a bottom edge region of the closure being received in retractable closure tensioning jaws that are shown "open."

DESCRIPTION OF THE PREFERRED EMBODIMENT

Figure 5:
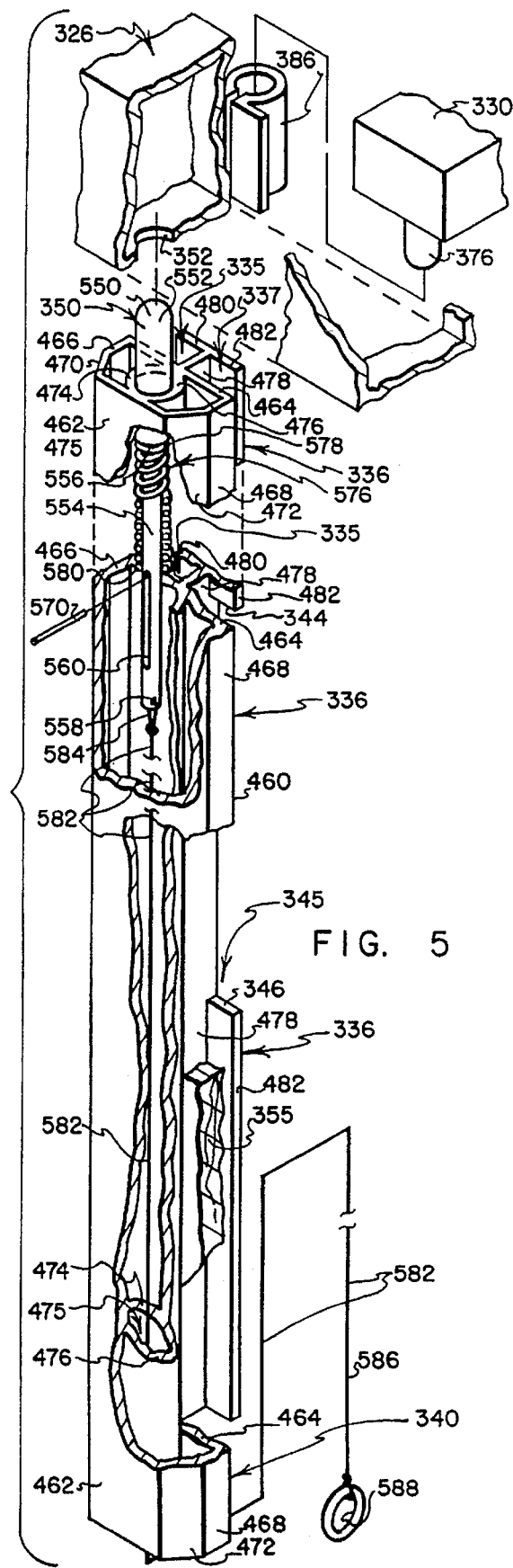

In order for the disclosure of the present document to be complete, FIGS. 1–15 (and a majority of the discussion that follows which makes reference to FIGS. 1–15) are reproduced from the referenced Parent Case.

Referring to FIGS. 1–3, a conventional, commercially available, freight hauling trailer (to which a retractable closure system that embodies features of the invention of the referenced Parent Case) is indicated generally by the numeral 100. The trailer 100 has an elongate, generally rectangular, flat bed 110 that extends generally from a front end region 112 to a rear end region 114, and from a left side region 116 to a right side region 118. Referring to FIGS. 2–4, the flat bed 110 of the trailer 100 includes a substantially flat, upwardly facing deck 102.

Wheels 120 underlie rearward portions of the flat bed 110. While a non-wheeled support 122 including depending, pavement-engaging legs 124 is shown underlying frontward portions of the flat bed 110, it will be understood that a conventional, commercially available tractor (not shown) having a standard fifth wheel trailer connection (not shown) can be coupled in a conventional manner to a conventionally configured kingpin (not shown) that depends in a conventional manner beneath frontward portions of the flat bed 110. When the fifth wheel of a tractor is connected to the kingpin of the trailer 100, the legs 124 of the support 122 can be retracted so that the tractor can support the front end region of the trailer 100 and can tow the trailer 100 from place to place.

Referring to FIGS. 2–4, a forward bulkhead structure 130, indicated generally by the numeral 130 is provided at the front end region 112 of the trailer 100. The bulkhead structure 130 defines an upright front wall 132 that extends transversely across the front end of the flat bed 110. A bumper rail 134 is provided at the rear end region 114 of the trailer 100 and extends transversely across the rear end of the flat bed 110. Left and right rub rails 136, 138 extend along left and right sides 116, 118 of the flat bed 110. Referring to FIGS. 3 and 4, upwardly opening stake pockets 140 are defined at spaced intervals along the rear bumper rail 134, and along the left and right rub rails 136, 138.

Features of the trailer 100 that have been enumerated thus far are conventional in nature. While not all flat bed trailers presently in service are provided with such features, many are.

Referring to FIG. 2, the trailer 100 is provided with a system of framework, indicated generally by the numeral 300, that cooperates with the bulkhead 130 to define a box-like frame that resides atop the flat bed 110 for surrounding such cargo (not shown) as may be positioned atop the flat bed 110.

In overview, components of the framework 300 include specially configured left and right uprights 306, 308, and a specially configured top wall member 310 that extend rearwardly from left, right and top sides of the front wall 130; specially configured left and right corner uprights 316, 318 and a specially configured top wall member 320 that bridges between the uprights 316, 318, located at the rear of the flat bed 102; a specially configured left header 326 that bridges between upper end regions of the left uprights 306, 316; a specially configured right header 328 that bridges between upper end regions of the right uprights 308, 318; top wall struts 330 that bridge between the headers 326, 328 (the struts 330 may be removed from the framework 300, as is depicted in FIGS. 3–4); and rear, left and right wall stakes 334, 336, 338 (which also may be removed from the framework 300, as depicted in FIGS. 3–4).

The left and right headers 326, 328 are principally formed from elongate, hollow, tubular extrusions of aluminum alloy, with the composition of the alloy being selected to provide strength, durability and suitable resistance to corrosion. The headers 326, 328 have identical, generally rectangular cross sections that are of substantially uniform configuration along the full lengths of the headers 326, 328.

The top wall or "roof" struts 330 are principally formed from elongate, hollow, tubular extrusions of aluminum alloy, with the composition of the alloy being selected to provide strength, durability and suitable resistance to corrosion. The struts 330 have generally rectangular cross sections that are substantially uniform along their full lengths. The struts 330 are removable from the framework 300 (compare FIGS. 3 and 4 wherein the struts 330 have been removed from the framework 300 with FIG. 2 wherein the struts 330 are depicted as extending between the left and right headers 326, 328). The struts 330 are identically configured, and are therefore interchangeable one with another. Features of a typical one of the struts 330 are illustrated in FIGS. 5–8.

Figure 6:
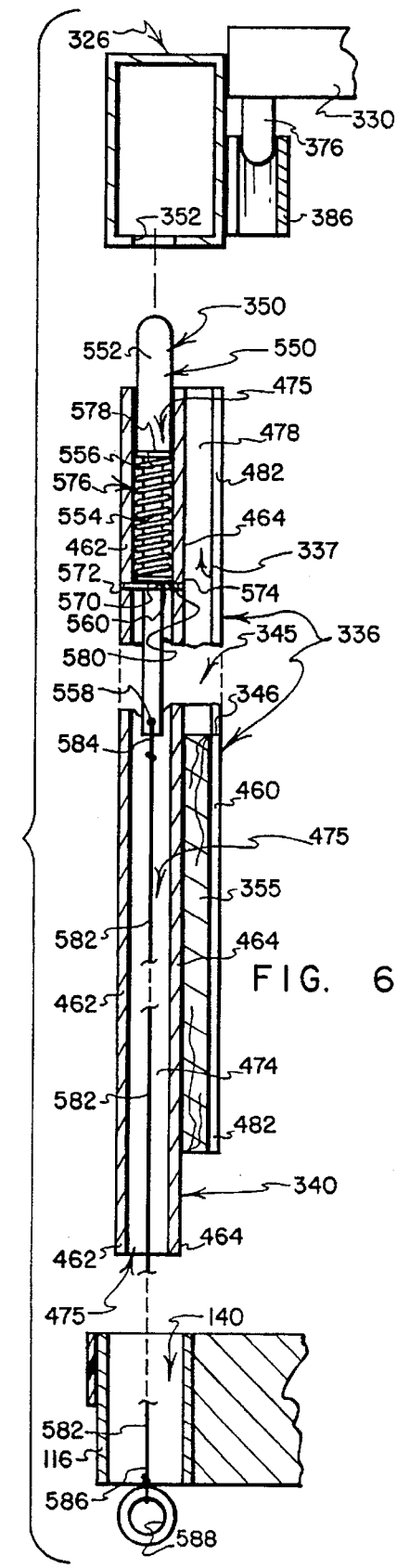
Figure 7:
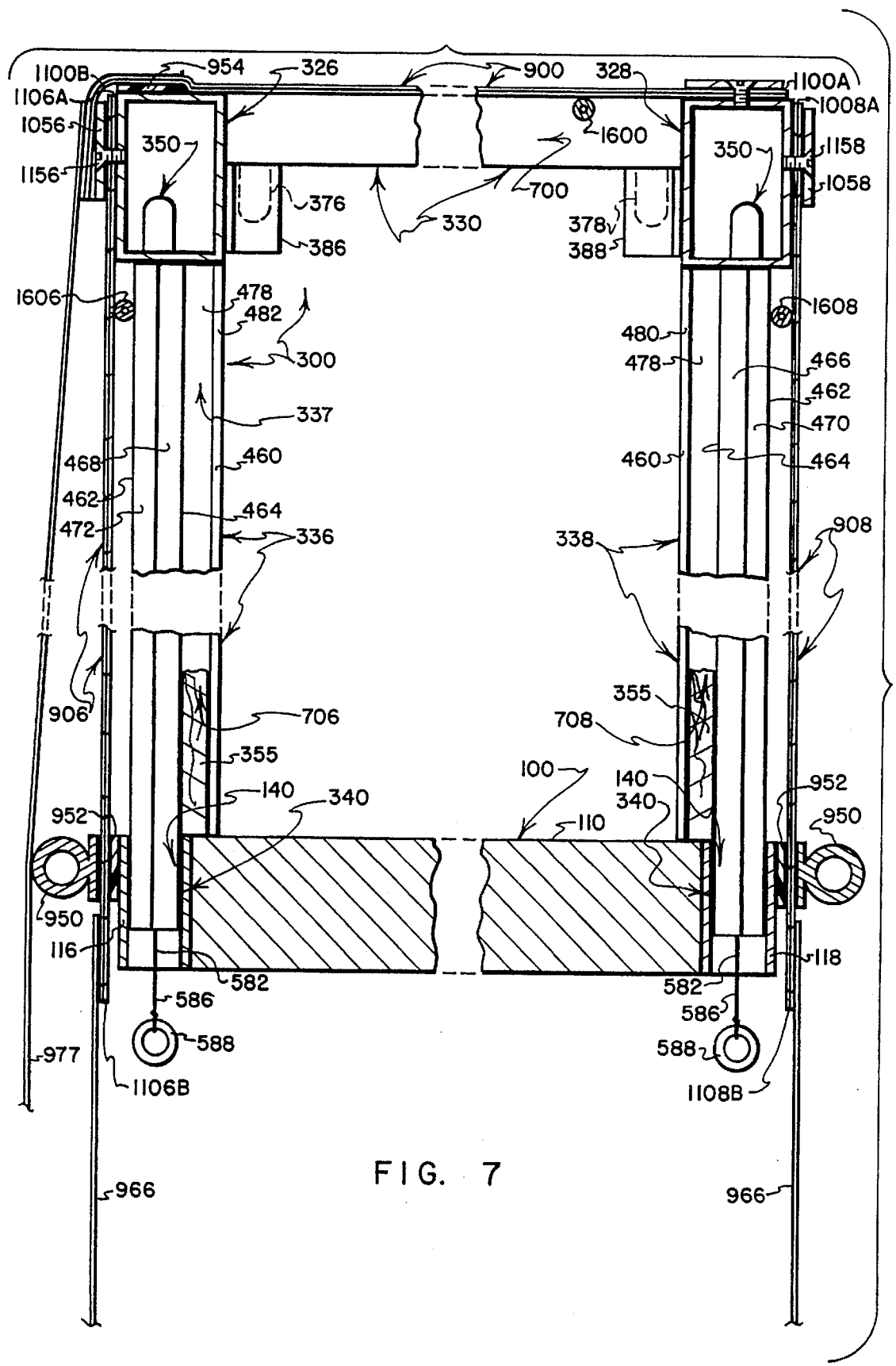
Figure 8:
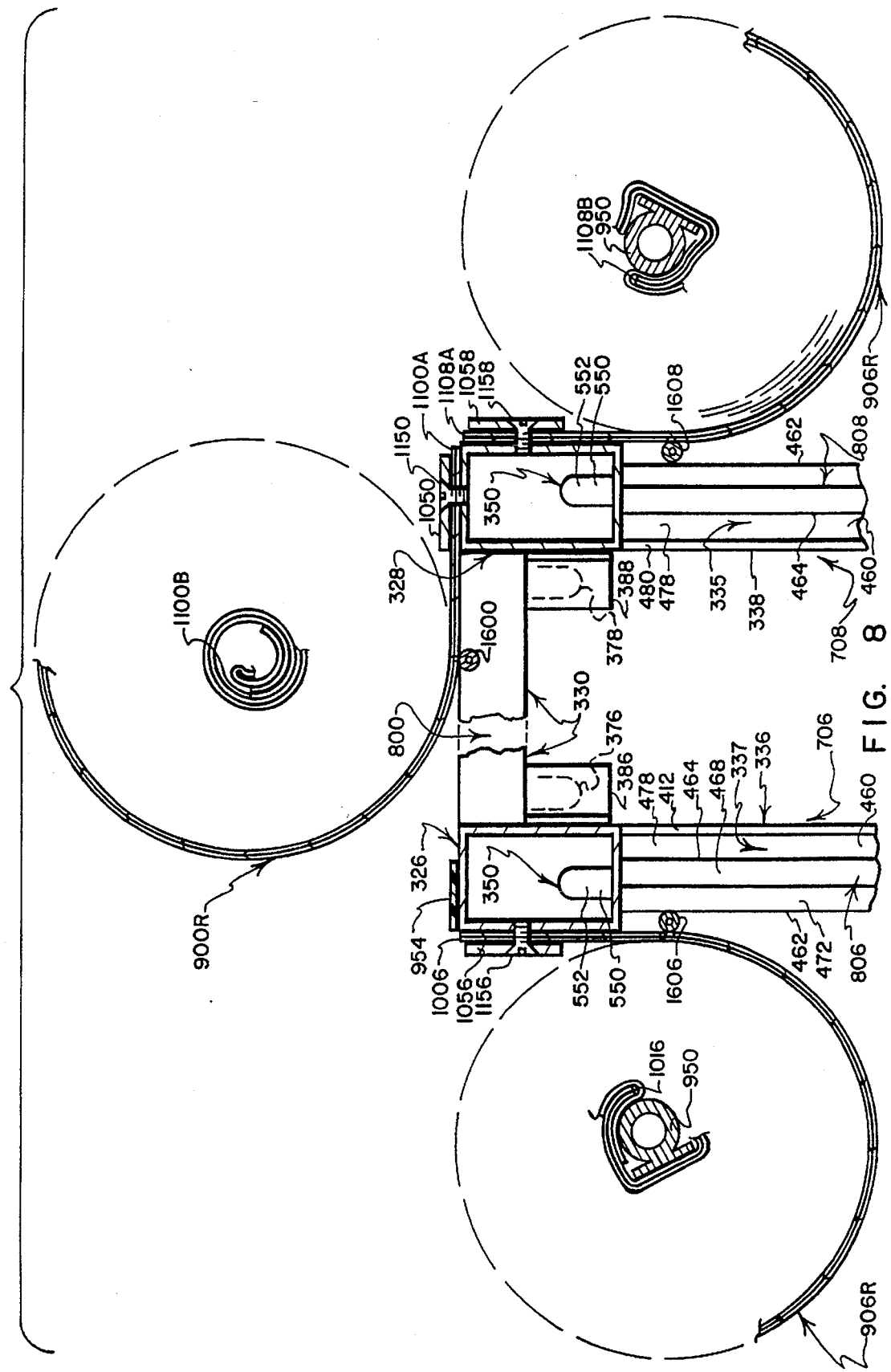

Referring to FIGS. 5–8, header attachment pins 376, 378 depend from opposite end regions of each of the struts 330. Strut connection brackets 386, 388 are carried by the headers 326, 328 at spaced intervals along inwardly-facing surfaces of the headers 326, 328 (see, for example, the manner that the brackets 386 are shown located at spaced intervals along the length of the left header 326 in FIGS. 3 and 4) for receiving the depending header attachment pins 376, 378. When the pins 376, 378 are received by the brackets 386, 388 (as is depicted in FIGS. 7 and 8, the struts 330 are securely connected to the headers 326, 328. To remove the struts 330, the struts 330 are raised relative to the headers 326, 328 to a sufficient extent to permit the pins 376, 378 to disengage from the brackets 386, 388—which uncouples the struts 330 from the headers 326, 328 so that the struts 330 can be removed from the vicinity of framework 300.

The stakes 334, 336, 338 are principally formed from elongate, hollow, tubular extrusions of aluminum alloy, with the composition of the alloy being selected to provide strength, durability and suitable resistance to corrosion. The stakes 334, 336, 338 are removable from the framework 300 (compare FIG. 3 wherein all of the stakes 334, 336, 338 have been removed from the framework 300 with FIG. 2 wherein the stakes 334, 336, 338 are shown as comprising installed components of the framework 300). The stakes 334, 336, 338 are identically configured, and are therefore interchangeable one with another. Features of a typical one of the stakes 336 are illustrated in FIGS. 5 and 6. Features of one of each of the stakes 336, 338 also are illustrated in FIGS. 7 and 8.

Lower end regions 340 of the stakes 334, 336, 338 are configured to be received in the stake pockets 140 that are defined by the bumper rail 134 and by the left and right rub rails 136, 138. In FIG. 7, lower end regions 340 of one of each of the stakes 336, 338 are shown extending into stake pockets 140 that are defined by the left and right rub rails 136, 138.

Upper end regions of the stakes 334, 336, 338 carry spring-projected latch pins 350 that are configured to slip fit into downwardly opening holes 352 (see FIGS. 5 and 6 wherein a typical one of the holes 352 is depicted) that open through downwardly facing surfaces of the top wall member 320 and the headers 326, 328. Each of the holes 352 is situated directly above a separate one of the stake pockets 140.

The typical stake 336 that is depicted in FIGS. 5 and 6 has a cross-sectional configuration that is defined 1) by a first set of web portions 462, 464, 466, 468, 470, 472, 474, 476 that extend substantially the full length of the main extruded component 460 of the stake 336, and 2) by a second set of web portions 482, 484, 486 that are depicted as being cut away at the bottom end region 340 of the stake 336 and/or as being interrupted at an intermediate location 345 along the length of the stake 336.

The first set of web portions (that extends the full length of the extruded component 460) includes parallel extending outer and inner webs 462, 464; parallel extending side webs 466, 468 that join with opposed edges of the inner web 464 and extend outwardly therefrom at right angles thereto; inclined webs 470, 472 that extend at oppositely inclined angles from opposed edges of the outer web 462 to join with outer edges of the side webs 466, 468; and a pair of semi-circular webs 474, 476 1) that are situated within the confines of the enclosure that is defined by the webs 462, 464, 466, 468, 470, 472, 2) that each serve to interconnect the outer and inner webs 462, 464, and 3) that cooperate with each other to define a round, tubular passage 475 that is located centrally within the enclosure that is defined by the interconnected webs 462, 464, 466, 468, 470, 472.

The second set of web portions (each of which is cut away at one or more locations along the length of the extruded component 460) includes an inwardly extending web 478, the outer edge of which joins centrally, at right angles with the inner web 464, and the inner edge of which joins at right angles with two oppositely extending webs 480, 482 that parallel the outer and inner webs 462, 464. In effect, the webs 478, 480, 482 cooperate to define a T-shaped cross-sectional component of the extrusion 460. The oppositely extending webs 489, 482 define the "cross-bar" of the "T." The web 478 defines the "stem" of the "T."

As is best seen in FIG. 6, the diminished cross-section that defines the bottom end region 340 of the stake 336 (i.e., the portion of the stake 336 that is insertable into one of the stake pockets 140) is defined by the absence of all three of the T-forming webs 478, 480, 482 for a distance measured from the bottom end of the extruded component 460 that corresponds to the depth that the stake 336 is to extend into one of the stake pockets 140.

As is best seen in FIG. 5, at the intermediate location 345, the only portions of the cross-section of the extruded member 460 that are absent are the oppositely extending webs 480, 482 that define the "cross bar" of the "T." The webs 480, 482 are cut away for a distance that extends between opposed web-cut surfaces that are indicated by the numerals 344, 346.

The distance between the surfaces 344, 346 (i.e., the length of the cut-away region 345 of the webs 480, 482) extends for a distance of at least about twelve inches. The surface 346 located at the bottom of the cut-away region 345 preferably is located no closer to the cut-away lower end region 340 of the stake 336. What the cut-away region 345 of the webs 480, 482 serves to define is an "entryway" through which opposite ends of one or more boards 355 (or other relatively flat, relatively thin structural members such as panels formed from plywood or other suitable panel material that exhibits adequate strength, rigidity and impact resistance to withstand being engaged by cargo loaded atop the flat bed 110) can be inserted into "opposed U-shaped tracks" 335, 337 (of pairs of adjacent ones of the stakes 334, 336, 338) that are defined by the inner web 464 and by the webs 478, 480, 482 that form a "T."

By suitably positioning the entryway 345, one or more boards or panels 355 can be installed to whatever height above the flat bed 110 as may be desired to give rear, left and right walls 704, 706, 708 that are defined by the framework 300 the capability to be engaged by cargo (not shown) that is carried atop the flat bed 110—i.e., to give walls of the framework 300 the capability to function as so-called "load-bearing walls." While the entryway 345 may be positioned relatively near the top of the stakes 334, 336, 338 to permit boards or panels 355 to fill much of the full height of the spaces that exist between adjacent ones of the stakes 334, 336, 338, if the full heights of such spaces are to be filled, at least one of the boards or panels 355 that are installed between each set of adjacent stakes 334, 336, 338 should be taller than is the distance between the surfaces 344, 346 (so that the extra-tall board or panel 355 cannot be moved through the entryway 345), and should have its opposite end regions hinge-connected so that this last-to-be-inserted extra-tall board or panel (not shown) can complete the "filling" of the height of the wall space, with its hinge-connected end regions being lockable into alignment with each other (so as to extend substantially within a common plane) by means of a suitable latch (not shown) to retain this extra-tall board or panel in position bridging the entryway 345—a technique for fully filling boards between adjacent stakes that is well known to those who are skilled in the art.

The spring-projected latch pin assembly 350 that is located near the upper end region of the typical stake 334 that is depicted in FIGS. 5 and 6 includes an elongate pin member 550 that has a relatively large diameter upper end region 552 that slip-fits within the round, tubular cross-section 475 of the extruded member 460. The lower end region 554 of the pin member 550 is of reduced diameter. An annular shoulder 556 forms a stepped transition between the different diameters of the upper and lower end regions 552, 554. A hole 558 is formed through the lower end region 554 near its bottom end. An elongate slot 560 (see FIG. 5) is formed through the lower end region 554 at a location intermediate the locations of the shoulder 556 and the hole 558. The length of the slot 560 is selected to be at least as long as the distance through which the spring-projected pin member 550 slides within the tubular cross-section 475 when moving from its "extended" position (as depicted in FIGS. 5 and 6) and its "retracted" position (not shown) wherein the spring-projected pin member 550 withdraws sufficiently into the tubular cross-section 475 to not project beyond the upper end of the extruded member 460.

As is best seen in FIG. 6, a spring-coiled tubular pin 570 (a so-called "roll pin" or the like) is pressed or driven through aligned holes 572, 574 formed in the inner and outer webs 462, 464, and is brought to rest with its opposite end regions being snugly received within the aligned holes 572, 574. A central region of the pin 570 extends in a slip fit through the elongate slot 560. By this arrangement, the latch pin member 550 is slidably connected to the extruded member 460, and is rendered movable relative to the extruded member 460 between its above-described "extended" and "retracted" positions.

A compression coil spring 576 extends relatively loosely about and is carried by the reduced diameter portion 554 of the pin member 550. An upper end region 578 of the spring 576 engages the shoulder 556. A lower end region 580 of the spring 576 engages the pin 570. By this arrangement, the compression coil spring 576 acts against the relatively fixed pin 570 and against the shoulder 556 of the relatively movable pin member 550 to bias the pin member 550 away from its "retracted" position toward its "extended" position.

A length of "wire rope" or cable 582 extends through the round tubular cross section 475 of the extrusion 460 from the location of the pin member 550 (where an upper end region 584 of the cable 582 extends through the hole 558 to connect the cable 582 to the pin member 550), downwardly to a location where a bottom end region 586 of the cable 582 depends out of the bottom end of the extruded member 460. A finger-engageable ring 588 is connected to the bottom end region 586 of the cable 582. When the stake 336 is installed as a structural element of the framework 300 (as is depicted in FIGS. 7 and 8), the bottom end of the cable 582 depends through the stake pocket 140 to provide ready access to the ring 588 at a location beneath the flat bed 110 of the trailer 100.

To remove the stake 334 from serving as a structural element of the framework 300, the finger-engageable ring 588 is pulled downwardly to retract the pin member 550 so that it no longer extends beyond the upper end of the extruded member 460 (and therefore no longer extends into the header hole 352). Once the pin member 550 has been retracted, the upper end region of the extruded member 460 can be moved out from under the header 326, which frees the stake assembly 336 to permit its lower end region 340 to be raised out of the stake pocket 140—whereupon the stake 336 is no longer connected to the header 326, to the left rub rail 116, or to any other component of the framework 300.

To reinstall the stake 336, the described method of stake removal is reversed, whereby the lower end region 340 is introduced into the stake pocket 140, the upper end region is positioned to underlie the header 326, and the pin member 550 is permitted to return to its extended position wherein it projects into the header hole 352 to securely connect the stake 336 to the left rub rail 116 and to the header 326. In FIG. 4, various stages of removal and/or installation of right side wall stakes 338 are depicted.

The top wall members 310, 320, and the uprights 306, 308, 316, 318 also are preferably formed as extrusions of aluminum alloy, with the alloy being selected to provide strength, durability and suitable resistance to corrosion. Held in common by the members 306, 308, 310, 316, 318, 320, are configurations that are defined by portions of each of their cross-sections—configurations that define substantially identically shaped "receiving grooves" 406, 408, 410, 416, 418, 420, within which edge portions of curtain-like retractable closures can be received and releasably retained, as will be explained in greater detail. Referring, for example, to FIGS. 10–12 wherein the cross-sectional configurations of the uprights 306, 308, 316, 318 are depicted, it will be seen that the uprights 306, 308 define outwardly-opening receiving grooves 406, 408, respectively; that the uprights 316, 318 define outwardly-opening receiving grooves 416, 418, respectively; and that the uprights 316, 318 also define rearwardly-opening receiving grooves 426, 428, respectively.

Figures 13, 14:
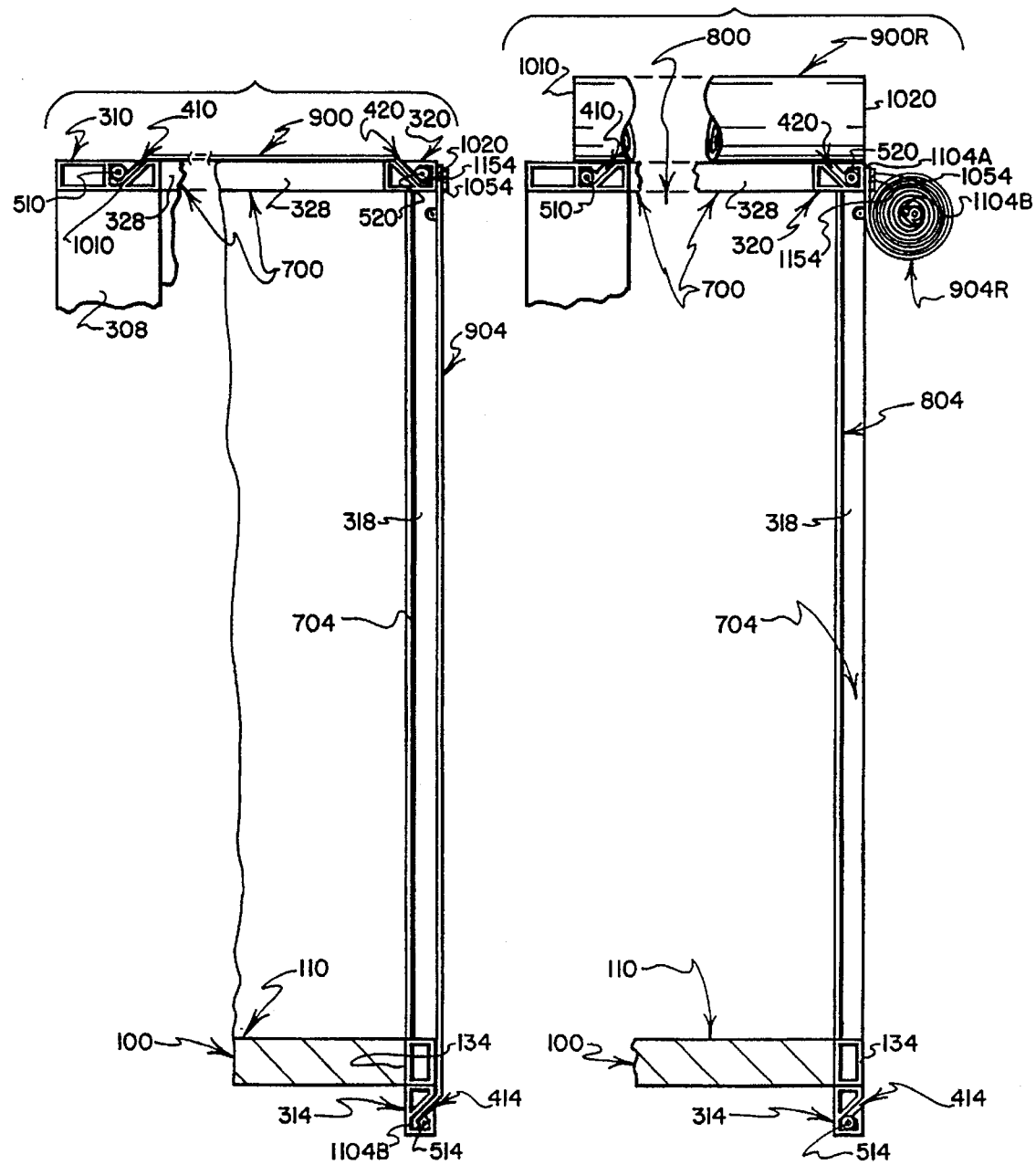

Referring to FIGS. 13 and 14, it will be seen that the top wall members 310, 320 also define receiving grooves 410, 420 that open upwardly; and that an optional rear curtain securing member 314 can be mounted beneath the rear bumper rail 134. The optional rear curtain securing member 314 features a cross-sectional configuration 1) that is substantially identical to selected portions of the cross-sectional configurations of the members 306, 308, 310, 316, 318, 320, that define receiving grooves 406, 408, 410, 416, 418, 420, and 2) that defines a receiving groove 414 that opens rearwardly.

The grooves 406, 408, 410, 414, 416, 418, 420, 426, 428 are identical in cross-section, but are differently oriented, with some pairs of these grooves (e.g., the paired grooves 406, 408; the paired grooves 410, 420; the paired grooves 416, 418; and the paired grooves 426, 428) featuring configurations that constitute mirror images of each other. The grooves 406, 408, 410, 414, 416, 418, 420, 426, 428 run for the full lengths of the associated members 306, 308, 314, 316, 318, 320 that variously define these grooves.

Carried within the grooves 406, 408, 410, 414, 416, 418, 420, 426, 428 are hollow, tubular, fluid-pressure expansible seals 506, 508, 510, 514, 516, 518, 520, 526, 528 that are of identical cross-sectional configuration. The seals 506, 508, 510, 514, 516, 518, 520, 526, 528 have lengths that correspond to the lengths of the grooves 406, 408, 410, 414, 416, 418, 420, 426, 428 within which the seals 506, 508, 510, 514, 516, 518, 520, 526, 528 are carried.

When the seals 506, 508, 510, 514, 516, 518, 520, 526, 528 are not inflated (i.e., when the seals 506, 508, 510, 514, 516, 518, 520, 526, 528 are not exhibiting an "abnormal" "expanded" size in comparison with a "normal" size that tends to be exhibited by the seals 506, 508, 510, 514, 516, 518, 520, 526, 528 when not being acted upon by fluid pressure), the seals 506, 508, 510, 514, 516, 518, 520, 526, 528 take shapes and positions such as typically are characterized by depictions of "deflated" (i.e., "normal" size) seals 506, 508, 516, 518, 526, 528 in FIG. 12. As depicted in FIG. 12, the extrusions that form the members 306, 308, 316, 318 define enlarged cavities 606, 608, 616, 618, 626, 628 within which the seals 506, 508, 516, 518, 526, 528 reside when not "expanded."

When the seals 506, 508, 510, 514, 516, 518, 520, 526, 528 are expanded so as to enlarge in cross-sectional size when pressurized fluid is introduced into the hollow interiors of thereof (typically due to being "inflated" by the introduction thereinto of pressurized air), the enlarged cross-sectional size of the seals 506, 508, 510, 514, 516, 518, 520, 526, 528 causes the seals 506, 508, 510, 514, 516, 518, 520, 526, 528 to project into their associated receiving grooves 406, 408, 410, 414, 416, 418, 420, 426, 428. In FIG. 10, the typical manner in which seal expansion takes place is characteristically illustrated by the manner in which the seals 506, 508, 516, 518, 526, 528 are shown projecting into their associated receiving grooves 406, 408, 416, 418, 426, 426 for clamping such curtain edge regions as extend into the grooves 406, 408, 416, 418, 426, 428 (just as opposed curtain edge regions 1006, 1016 are shown clamped by the seals 506, 516 at locations interiorally with respect to the grooves 406, 416; just as opposed curtain edge regions 1008, 1018 are shown clamped by the seals 508, 518 at locations interiorally with respect to the grooves 408, 418; and just as opposed curtain edge regions 1010, 1020 are shown clamped by the seals 510, 520 at locations interiorally with respect to the grooves 410, 420).

Referring to FIG. 2, what the framework 300 effectively defines are "open-frame" top, rear, left and right walls, that are indicated generally by the numerals 700, 704, 706 and 708, respectively. The open-frame top wall 700 is defined by the front and rear members 310, 320, by the left and right headers 326, 328, and by the removable top wall struts 330. The open-frame rear wall 704 is defined by the bumper rail 134, the top wall member 320, the uprights 316, 318, and the removable stakes 334. The open-frame left wall 706 is defined by the left rub rail 136, the left header 326, the uprights 306, 316, and by the removable stakes 336. The open-frame right wall 708 is defined by the right rub rail 138, the right header 328, the uprights 308, 318, and by the removable stakes 338.

Referring to FIGS. 3 and 4, when the removable struts 330 are removed from the top wall 700, the remaining components of the top wall, namely the front and rear members 310, 320, and the left and right headers 326, 328 cooperate to define a rectangular frame that surrounds what will be referred to as the "top wall opening" 800. When the removable stakes 334 are removed from the rear wall 704, the remaining components of the rear wall 704, namely the bumper rail 134, the top wall member 320 and the uprights 316, 318 cooperate to define a rectangular frame that surrounds what will be referred to as the "rear wall opening" 804. When the removable stakes 336 are removed from the left side wall 706, the remaining components of the left side wall 706, namely the left rub rail 136, the left header 326 and the uprights 306, 316 cooperate to define a rectangular frame that surrounds what will be referred to as the "left side wall opening" 806. When the removable stakes 338 are removed from the right side wall 708, the remaining components of the right side wall 708, namely the right rub rail 138, the left header 328 and the uprights 308, 318 cooperate to define a rectangular frame that surrounds what will be referred to as the "left side wall opening" 808.

To selectively close the wall openings 800, 804, 806 and 808, curtain-like retractable closures 900, 904, 906 and 908 are mounted on the framework 300. When the closures 900, 904, 906, 908 are "retracted," as is illustrated in FIGS. 2–4, the closures 900, 904, 906 and 908 take "roll form configurations," indicated generally by the numerals 900R, 904R, 906R and 918R in FIGS. 2–4, and variously in FIGS. 8 and 14.

The closure 900 is a "top wall closure" or "top wall curtain" that is sized to substantially completely close the top wall opening 800 when the closure 900 is "unrolled" so as to extend across the open-frame top wall 700, as is depicted in FIGS. 1, 7 and 13. The top wall curtain 900 has a "length" that is measured in a substantially horizontal direction that extends transversely across the trailer 100 (i.e., in a direction that substantially parallels the lengths of the front and rear members 310, 320—a direction that generally parallels the direction in which portions of the curtain 900 move relative to each other as the curtain 900 "extends"

from its roll form configuration 900R (shown in FIGS. 2–4, 8 and 14) to its "extended" or "operating position" (shown in FIGS. 1, 7 and 13). Stated in another way, the "length" of the top wall closure or curtain 900 is the distance, measured longitudinally along the fabric of the curtain 900 between opposite end regions 1100A, 1100B of the curtain 900 (i.e., "right" and "left" end regions of the curtain 900, as the curtain is depicted in FIG. 7). Similarly, the "width" of the top wall closure or curtain 900 is the distance, measured transversely across the fabric of the curtain 900 between opposite "front" and "rear" edge regions 1010, 1020, as depicted in FIGS. 13 and 14.

Figure 9:
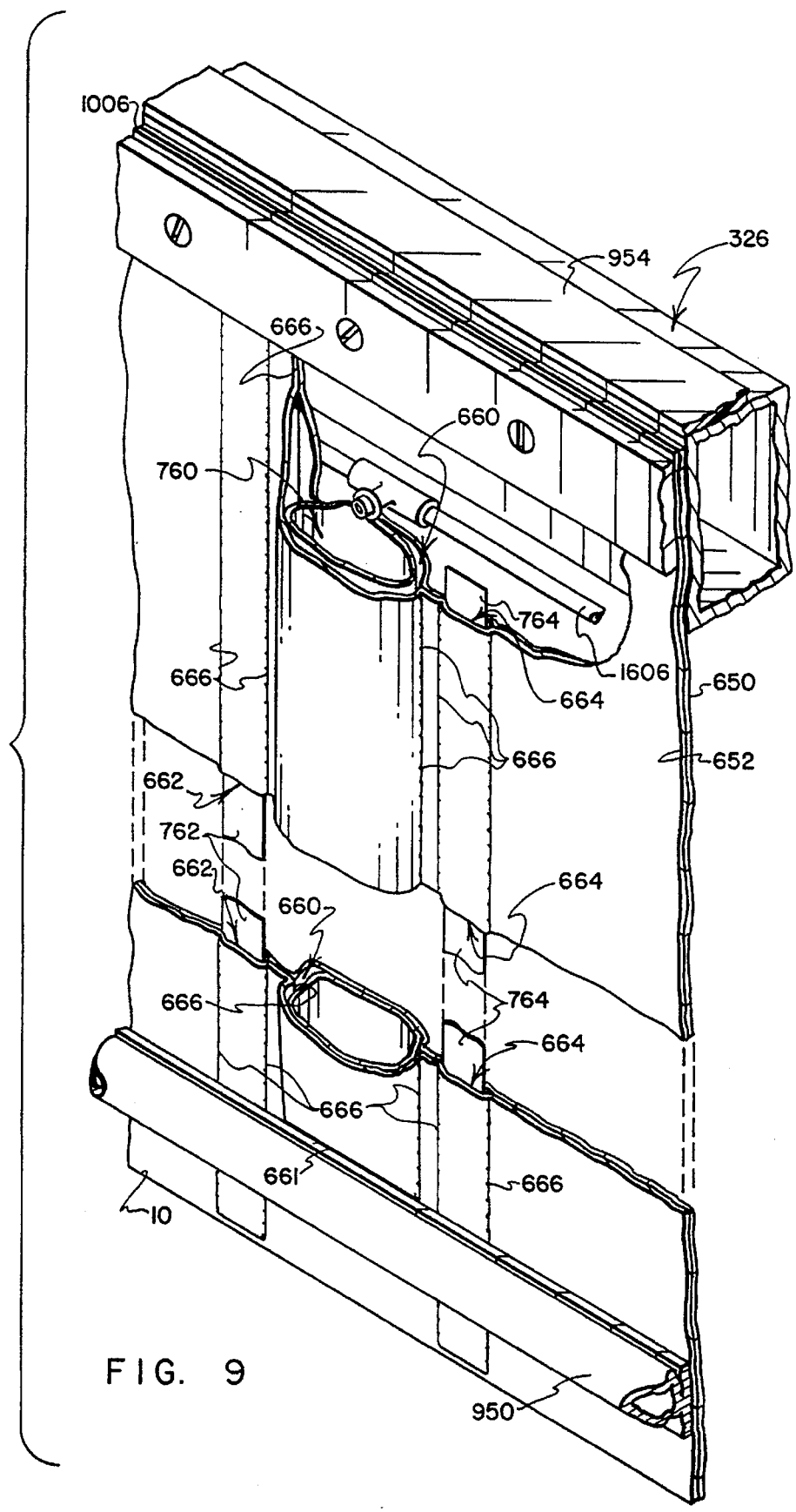

As is seen in FIGS. 7–9, the right end region 1100A of the top wall curtain 900 is mounted on the right header 328 by means of threaded fasteners 1150 that are threaded into holes formed in the header 328 after passing through aligned holes formed in the right end region 1100A of the curtain 900, and through holes that are formed through a mounting bar 1050. When the fasteners 1150 are tightened into place, they cause the right end region 1100A of the curtain 900 to be clamped between the mounting bar 1050 and the right header 328.

The closure 904 is a "rear wall closure" or "rear wall curtain" that is sized to substantially completely close the rear wall opening 804 when the closure 904 is "unrolled" so as to extend across the open-frame rear wall 704, as is depicted in FIGS. 1 and 13. The rear wall curtain 904 has a "length" that is measured in a substantially vertical direction along the fabric of the curtain 904 between opposite end regions 1104A, 1104B of the curtain 904 ("top" and "bottom" end regions of the curtain 904, as depicted in FIG. 13). Similarly, the "width" of the rear wall closure or curtain 904 is the distance, measured in a substantially horizontal direction across the fabric of the curtain 904 between opposite "left" and "right" edge regions 1026, 1028, as depicted in FIGS. 10–12.

As is best seen in FIGS. 13 and 14, the upper end region 1104A of the rear wall curtain 904 is mounted on the top wall member 320 by means of threaded fasteners 1154 that are threaded into holes formed in the member 320 after passing through aligned holes formed in the upper end region 1104A of the curtain 904, and through holes that are formed through a mounting bar 1054. When the fasteners 1154 are tightened into place, they cause the upper end region 1104A of the curtain 904 to be clamped between the mounting bar 1054 and the rear wall member 320.

The closure 906 is a "left wall closure" or "left wall curtain" that is sized to substantially completely close the left wall opening 806 when the closure 906 is "unrolled" so as to extend across the open-frame left side wall 706, as is depicted in FIGS. 1, 7 and 9.

The left wall curtain 906 has a "length" that is measured in a substantially vertical direction along the fabric of the curtain 906 between opposite end regions 1106A, 1106B of the curtain 906 ("top" and "bottom" end regions of the curtain 906, as depicted in FIG. 7). Similarly, the "width" of the left wall closure or curtain 906 is the distance, measured in a substantially horizontal direction across the fabric of the curtain 906 between opposite "front" and "rear" edge regions 1006, 1016, as depicted in FIGS. 10–12.

As is seen in FIGS. 7–9, the upper end region 1106A of the left wall curtain 906 is mounted on the left header 326 by means of threaded fasteners 1156 that are threaded into holes formed in the header 326 after passing through aligned holes formed in the upper end region 1106A of the curtain 906, and through holes that are formed through a mounting bar 1056. When the fasteners 1156 are tightened into place, they cause the upper end region 1106A of the curtain 906 to be clamped between the mounting bar 1056 and the left header 326.

The closure 908 is a "right wall closure" or "right wall curtain" that is sized to substantially completely close the right wall opening 808 when the closure 808 is "unrolled" so as to extend across the open-frame right side wall 708, as is depicted in FIGS. 1, 7 and 13. The right wall curtain 908 has a "length" that is measured in a substantially vertical direction along the fabric of the curtain 908 between opposite end regions 1108A, 1108B of the curtain 908 ("top" and "bottom" end regions of the curtain 908, as depicted in FIG. 7). Similarly, the "width" of the right wall closure or curtain 908 is the distance, measured in a substantially horizontal direction across the fabric of the curtain 908 between opposite "front" and "rear" edge regions 1008, 1018, as depicted in FIGS. 10–12.

As is seen in FIGS. 7 and 8, the upper end region 1108A of the right wall curtain 908 is mounted on the right header 328 by means of threaded fasteners 1158 that are threaded into holes formed in the header 328 after passing through aligned holes formed in the upper end region 1108A of the curtain 908, and through holes that are formed through a mounting bar 1058. When the fasteners 1158 are tightened into place, they cause the upper end region 1108A of the curtain 908 to be clamped between the mounting bar 1056 and the right header 328.

Referring to FIG. 12, immediately after the rear closure or curtain 904 has been "extended" from its roll form configuration 904R to cover the rear wall opening 804, left and right edges 1026, 1028 of the curtain 904 tend to overlie the rearward-facing openings of the receiving grooves 426, 428 without extending into the grooves 426, 428. If it is desired to "grip" or "seal" the left and right edges 1026, 1028 as by establishing secure connections between the left and right edge regions 1026, 1028 and the uprights 316, 318, the edge regions 1026, 1028 are tucked into the grooves 426, 428, as is depicted in FIG. 11, and the seals 526, 528 are inflated, as is depicted in FIG. 10, to clampingly engage the edge regions 1026, 1028 at locations within interiors of the grooves 426, 428.

Referring to FIG. 12, immediately after the left closure or curtain 906 has been "extended" from its roll form configuration 906R to cover the left wall opening 806, front and rear edges 1006, 1016 of the curtain 906 tend to overlie the rearward-facing openings of the receiving grooves 406, 416 without extending into the grooves 406, 416. If it is desired to "grip" or "seal" the front and rear edges 1006, 1016 as by establishing secure connections between the front and rear edge regions 1006, 1016 and the uprights 306, 316, the edge regions 1006, 1016 are tucked into the grooves 406, 416, as is depicted in FIG. 11, and the seals 506, 516 are inflated, as is depicted in FIG. 10, to clampingly engage the edge regions 1006, 1016 at locations within interiors of the grooves 406, 416.

Referring to FIG. 12, immediately after the right closure or curtain 908 has been "extended" from its roll form configuration 908R to cover the right wall opening 808, front and rear edges 1008, 1018 of the curtain 906 tend to overlie the rearward-facing openings of the receiving grooves 408, 418 without extending into the grooves 408, 418. If it is desired to "grip" or "seal" the front and rear edges 1008, 1018 as by establishing secure connections between the front and rear edge regions 1008, 1018 and the uprights 308, 318, the edge regions 1008, 1018 are tucked into the grooves 408, 418, as is depicted in FIG. 11, and the seals 508, 518 are inflated, as is depicted in FIG. 10, to clampingly engage the edge regions 1008, 1018 at locations within interiors of the grooves 408, 418.

In substantially the same manner as has just been described in conjunction with the left and right curtains 906, 908, it will be understood that, immediately after the top closure or curtain 900 has been "extended" from its roll form configuration 900R to cover the top wall opening 800, front and rear edges 1010, 1020 tend to overlie the grooves 410, 420 without extending into the grooves 410, 420; however, the edge regions 1010, 1020 can be tucked into the grooves 410, 420, and the seals 510, 520 can be inflated, as is depicted in FIG. 13, to clampingly engage the edge regions 1010, 1020 at locations within interiors of the grooves 410, 420.

Likewise, it will be understood that, immediately after the rear closure or curtain 904 has been "extended" from its roll form configuration 904R to cover the rear wall opening 804, the bottom edge region 1104B of the curtain 904 will tend to overlie the receiving groove 424 of the optional rear curtain securing member 314 without extending into the groove 414; however, the end region 1104B can be tucked into the groove 424, and the seal 514 can be inflated, as is depicted in FIG. 13, to clampingly engage the end region 1014 within the interior of the groove 414—to thereby securely connect the bottom end region 1104B of the rear closure or curtain 904 to the optional rear curtain securing member 314 at a location just below the rear bumper rail 134.

When the referenced Parent Case was filed, it was envisioned that: 1) the top wall closure 900, the rear wall closure 904, the left side wall closure 906, and the right side wall closure 908 should be constructed quite similarly, utilizing components of substantially the same general character, but with the components being sized and utilized in quantities that are appropriate to provide closures 900, 904, 906, 908 that fit (i.e., that suitably cover) the variously sized top, rear, left and right openings 800, 804, 806, 808; and 2) that a typical one of these closures (e.g., the left side wall closure 906 that is depicted in FIG. 9) should be formed using two juxtaposed, congruently extending, concomitantly overlying sheets of flexible material (e.g., the sheets 650 and 652 depicted in FIG. 9) that cooperate to define the length and width of a particular closure. However, as will become apparent later in this document, this view has changed as research, development and testing have been continued.

Whereas, when the Parent Case was filed, the design of retractable, roll-up closures that are to extend and retract substantially horizontally (such as the top wall closure 900) was viewed as addressing substantially the same set of needs and considerations, and as involving substantially the same set of problems and parameters as are associated with the design of top-hung, retractable, roll-up closures that are to extend and retract substantially vertically, this view has changed considerably. It now is recognized that the design of top-hung, retractable closures for use in selectively opening and closing side wall openings of freight hauling vehicles presents a very specialized set of needs and considerations, and involves a unique set of problems and parameters; and, while there undoubtedly is a body of information that can be carried over from the design of such retractable closures for use in the design of retractable closures that are to be used in other orientations and in other environments, the design of top-hung, retractable closures for side walls of freight hauling vehicles is a topic unto itself—a topic to which the present invention and this document are primarily addressed.

Whereas, when the Parent Case was filed, the most preferred approach to selecting a flexible "fabric" for a retractable, roll-up closure was believed to involve the use of double-layer fabric assemblies, a single-layer sheet of coated "fabric" now is believed to be preferred, with the character of the fabric being selected to feature tear resistance, wear resistance and dimensional stability (i.e., resistance to stretching and other forms of deformation) now is believed to represent a preferred type of construction and construction material for use in flexible, retractable, roll-up closures.

When the referenced Parent Case was filed, it was envisioned that the sheets 650, 652 that form the main "fabric" of a flexible, retractable closure should be selected from among such options as 1) water-repellant treated cotton canvass, 2) cotton-polyester-blend fabric, 3) polyvinylchloride coated nylon material such as typically is used in the manufacture of tarpaulins, 4) other forms of natural or artificial fiber fabric, 5) various forms of synthetic film, or 6) combinations of two or more of these types of material—so long as the material selected is sufficiently flexible to coil and uncoil relatively easily, exhibits needed strength, dimensional stability, wear resistance, longevity of service life and other desirable characteristics, the nature of which often is determined in large measure by the character of the environment in which the resulting closure is to be used. It now is believed, however, that absent a particular need presented by a particular application to provide a special fabric that features some unusual type of chemical resistance or other unusual feature, a normal preferred choice of fabric for a flexible, retractable closure should place primary emphasis on tear resistance, wear resistance and dimensional stability, with a fabric woven from such fiber as is sold by E. I. DuPont de Nemours & Company under the registered trademark KEVLAR—a fiber that is readily available from a variety of sources for commercial purchase, and is well known to those who are skilled in the art—representing an excellent choice among a variety of commercially available selections.

While two sheets 650, 652 are depicted in FIG. 9 as being utilized to form the main component of a typical one of the closures 906 (with the sheets 650, 652 being of substantially equal size and substantially identical shape so that perimetrically extending edge portions of the sheets 650, 652 will concomitantly and congruently overlie each other), it will be understood (in view of the explanation presented immediately above, and in view of the discussion of the preferred embodiment that is presented later in this document in conjunction with a discussion of the closure depicted in FIGS. 16–25) that features of neither the present invention nor the invention of the referenced Parent Case are limited in their utility to use with curtain-like closures that are formed in large measure from two substantially identically sized sheets.

Continuing with reference to FIG. 9, the two depicted sheets 650, 652 are bonded together (as by utilizing suitable adhesive that will not detrimentally inhibit the resulting closure from exhibiting a desired degree of flexibility), and are supplementally stitched together at intervals spaced along the length of the resulting closure 906 (see the "stitch lines" 666 shown in FIG. 9) so that, at locations spaced across the width of the closure, sets of three longitudinally extending "pockets" 660, 662, 664 are defined.

When the referenced Parent Case was filed, it was envisioned that the most preferred arrangement of the pockets 660, 662, 664 (i.e., the most preferred arrangement for the extension members 760 that are carried in the pockets 660, and for the retraction members 762, 764 that are carried in the pockets 662, 664, respectively) was for the pockets 662, 664 (and hence the retraction members 762, 754 that are carried in the pockets 662, 664) to be located relatively close to and extending along opposite sides of the pockets 660 (that carry the extension members 760)—so that, located between each paired set of the pockets 662, 664 is a separate one of the pockets 660 (whereby, located between each paired set of the retraction members 762, 764 is a separate one of the extension members 760). However, as research, development and testing have been carried out to an increasingly extensive degree, this view, too, has changed.

Rather than to provide retraction members at a two-to-one ratio to extension members; rather than to provide arrangements of retraction members that sandwich each extension member; and rather than to associate in some set pattern the positions of the retraction and extension members, it now appears to be desirable to provide: 1) a very limited number of extension members that are properly positioned so as to be located away from opposite edges that define the width of a closure; 2) a substantially larger number of retraction members that are positioned at relatively equally spaced intervals across the width of a closure; 3) with each of the retraction members preferably being positioned so as to extend along a separate vertically extending header support stake (such as the stakes 336, 338) when the closure is extended; and 4) with the resulting layout of extension and retraction members being modified as may be dictated by tests conducted on a particular closure to ensure that retraction and extension movements executed by the closure execute in a desirably smooth and controlled manner.

Returning again to FIG. 9, the retraction member pockets 662, 664 are depicted as being of relatively small cross-sectional size and as flanking opposite sides of the extension member pocket 660, which has a relatively larger cross-sectional size. The stitch lines 666 extend longitudinally along and help to define the pockets 660, 662, 664.

Inserted into the longitudinally extending pockets 660 (which are located at intervals spaced across the width of the closure 906—for example at "on center" spacings of typically about 24 to about 56 inches, with a more preferred range being about 30 to about 48 inches—and with "on-center" spacings of about 40 to about 46 inches being preferred for use with closures 900, 904, 906, 908 that are used for vehicle openings of the general type characterized by the openings 800, 804, 806, 808) are fluid-pressure-expansible members 760 that typically are formed from lengths of resilient tubing—such as is utilized to form inflatable tubes for bicycle tires and the like, and which exhibits a capability to "collapse" in cross-section so as to lie substantially flat, when deflated, (so that the fluid-pressure-expansible members 760, when deflated, easily can be "rolled up" together with the sheet material 650, 652 to assume a "roll form configuration" such as is indicated in the drawings by the numerals 900R, 904R, 906R, 908R).

While the fluid-pressure-expansible members 760 are depicted as being "inserted into" the pockets 660 rather than to be formed integrally with the pockets 660, it is well within present contemplation to form the pockets 660 from material such as neoprene rubber or the like—i.e., suitable material that will retain pressurized fluid so that the pockets 660 themselves can be "pressurized" to effect closure extension.

Inserted into the longitudinally extended pockets 662, 664 (which preferably are located in relatively close proximity to the pocket 600 that are flanked by the pockets 662, 664) are torsion spring members 762, 764 that preferably are formed from bands of spring steel (type 301 stainless steel is one of many suitable steel alloys that is well suited for forming torsion springs, and that tends to exhibit good corrosion resistance and longevity of service) that have "roll form memories" that cause the spring members 762, 764 to be biased toward helically coiled configurations with sufficient force to cause the closure 906 (of which the spring members 762, 764 form component parts) to be self-biased toward assuming the roll-form-configuration that is indicated in the drawings by the numeral 906R.

When the referenced Parent Case was put on file, it was believed that the spring members 762, 764 that serve to retract closures of the type described should be: formed from spring steel that typically exhibits reliable performance over service lives that include four thousand to eight thousand cycles of extension and retraction; that typically has a width of about one to about two inches (with a width of about one and one-fourth inch to about one and one-half inch being preferred); and, that typically has a thickness of about 0.010 inch to about 0.014 inch—for it was believed that spring members of this general type would provide good longevity of service, and that they could be further selected to provide suitable spring force for causing such closures as the depicted closure assembly 906 to gently coil into its "roll form configuration" 906R when the closure assembly 906 is not caused to be "extended" by the introduction into the hollow interiors of the fluid-pressure-expansible members 760 of pressurized fluid such as compressed air.

However, as will become apparent from the discussion that is presented later in this document, continued research, development and testing has given way to the view that the torsion springs used to provide the retraction members of a rollable, retractable closure ought to be significantly wider, preferably between about two to about four inches in width, so that the spring steel used to form the springs can be more lightly stressed while being manufactured to exhibit a desired ability to apply required "coiling force" to a closure—whereby the reliable service life (i.e., the number of thousands of cycles of extension and retraction to which each of the retraction members can be subjected without exhibiting fatigue, breakage or other unsatisfactory performance characteristics) can be doubled if not tripled in comparison with the number of cycles that previously were thought to be required—so that service life of longer duration can be achieved, and so that unanticipated "cycling" of retraction members (that may result in response to such influences as over-the-road movements of a vehicle on which a retractable closure is mounted) will not bring retraction member service life to an abrupt end characterized by premature failure of the spring material that forms the retraction members. More will be said on this and other discoveries, improvements and design refinements later in this document in conjunction with features of the embodiments that are depicted in FIGS. 16–29.

Suitable retraction member springs are commercially available from a number of sources, for example from Vulcan Spring & Mfg. Co., Telford, Pa. 18989, and can be purchased to exhibit substantially "constant force" during substantially their entire process of "coiling up" or "uncoiling," or can be purchased to exhibit diminishing or increasing force as they "coil up" or "uncoil."

In one form of practice which is illustrated in FIG. 9, "constant force" springs 762, 764 are inserted into the pockets 662, 664, and function at all times during the "coiling up" of the closure 904 to exert a substantially uniform "coiling" force. While utilizing "constant force" springs represents an approach that is desirable from the viewpoint of simplicity, there often arise applications wherein it is desirable to use torsion coil springs 762, 764 that slightly increase the "coil up" force they apply as the "coiled up" portion of the closure 904 grows in "roll form diameter" during retraction of the closure 904.

When the Parent Case was filed, it was believed that designing the springs 762, 764 to exhibit about a twenty to about a thirty five percent increase in "coil up" force as the springs progressively more closely approach their fully coiled "retracted" configurations was desirable from the viewpoint of helping to maintain a relatively brisk but gentle type of "coiling action" during the closure "roll-up" or retraction process—the reason for this being believed to be that, as the coil of closure material grows in size while being "coiled up," an increasing amount of force tends to be required to maintain about the same speed at which the closure is being retracted (i.e., more closure material is being moved during final stages of the "coiling up" or "retraction" process than is moved at the beginning of this process when only an end region of the closure 906 needs to be elevated and "curled" to initiate "coiling" of the closure 906).

However, as research, development and testing has continued to be conducted, an understanding has emerged that the foregoing view often needs to be tempered by making adjustments to the manner in which the retraction springs are wound so that, at different stages of retraction, greater or lesser coiling force may need to be applied by the retraction springs. In many closure embodiments, for example, it has been found that a smoother, more desirably controlled type of retraction "coiling action" is achieved if the closure springs are wound so that, near their lowermost ends, the "coiling force" that springs apply to a closure increases rather than decreases—with this somewhat unexpected modification seemingly being needed inasmuch as some closure assemblies clearly require more (rather than less) "coiling force" near the lower ends of their closure springs to initiate coiling of the closure than is required at other higher locations along the lengths of the springs after initial coiling of the closure has been achieved. Stated in another way, how the retraction springs of a particular closure may need to be modified to achieve a desirably smooth and controlled type of retraction movement often can be determined only by the conduct of repeated tests of "best guess" modifications of the manner in which closure springs are manufactured to produce need "coiling force."

As a starting point, if the total weight of the materials comprising the closure 906 total about one hundred thirty two pounds, and if a set of twelve "constant force" springs of the type that each can exert a coil force exertion capability to lift about eleven pounds are available, it makes sense to at least try using such a set of "constant force" springs to see how they will function when installed in the closure 906—to provide a test that is carried out in real life conditions of service. If the resulting closure assembly 906 exhibits a desirably uniform and brisk but gentle "coiling action" during closure retraction, there is no reason to deviate from the use of such "constant force" springs.

However, if it is found that the "constant force" spring retracted closure 906 tends to "coil up" relatively briskly only as it begins to coil (starting with the closure 906 fully extended); or if the closure 906 tends to "coil up" relatively lamely and without exhibiting a desired degree of smoothness of retraction movement; or if the "coiling action" of the closure assembly 906 is not carried out with a sufficient degree of "briskness," it is desirable to conduct tests using modified spring forms until an understanding is achieved that will permit properly made "special order" retraction springs to be specified and provided—which also are available from the aforementioned and other sources.

Continuing, now, to complete the description of what is depicted in FIGS. 1–15, and referring in particular to FIG. 9, the closure 906 is shown as including a tubular stiffener bar 950 extending across its width at a location near the bottom end region 1106 of the closure 906. Referring to FIG. 7, it will be seen that the location of the stiffener bar 950 is at the same height where a length of resilient seal material 952 is adhered to the left rub rail 116—whereby it will be understood that the purpose that is served by the stiffener bar 950 is to assist in maintaining engagement of the closure 906 with the seal 952 when the left wall closure 906 is fully extended.

As also will be seen in FIG. 7, a substantially identical stiffener bar 950 is provided on the right wall closure 908 for assisting to maintain engagement of the closure 908 with a seal 952 that is carried by the right rub rail 118. The stiffener bars 950 often are desirable on vertically-oriented curtains that are to be "strap secured" (as by straps 966 that are shown depending from the left and right closures 906, 908, which typically are secured to the underside of the flat bed 110 of the trailer 100 by conventional load binders, not shown).

A seal 954 also is carried atop the left header 326 (see FIGS. 7–9) for engaging the left end region 1100B of the top wall closure 900 when the top wall closure 900 is extended. Inasmuch as the top wall closure 900 is shown in FIG. 7 as being provided with left-side-depending straps 977 (that are typically are secured to the underside of the flat bed 110 of the trailer 100 by conventional load binders, not shown), there is no need to provide the top wall closure 900 with a stiffener bar to maintain contact between the left end region 1100B of the extended top wall closure 900 and the header-carried seal 954.

Referring once again to FIG. 9, when a stiffener bar 950 is to be utilized with the closure 906, the pockets 660 within which the fluid-pressure-expansible members 760 are carried typically do not depend below the location of the stiffener bar 950, but rather terminate at a location slightly above but quite near to the stiffener bar 950, as is indicated in FIG. 9 by the numeral 661. The pockets 662, 664 within which the spring members 762, 764 are carried extend substantially the full length of the closure 906. Pocket length and arrangement in the preferred closure embodiment of FIGS. 16–25, discussed later herein, will be found to differ.

To inflate and deflate the fluid-pressure-expansible members 760 of the curtain-like closure 906, a supply conduit 1606 (see FIGS. 7–9 wherein portions of the actual supply conduit 1606 are shown, and FIG. 15 wherein the conduit 1606 is depicted schematically) is provided that communicates with each of the members 760 at a location near the upper end region 1106A of the closure 906. The connections that are made between the supply conduit 1606 and the expansible members 760 are sufficiently strong to mount the supply conduit 1606 on the closure 906—whereby the supply conduit 1606 will be understood to constitute a component part of the closure 906 that ordinarily does not require separate provision for support.

Referring to FIG. 7 and 8, it will be seen that a supply conduit 1600 for the top wall closure 900, the supply conduit 1606 for the left wall closure 906, and a supply conduit 1608 for the right wall closure 908 are shown in cross section as being connected to the fluid-pressure-expansible members 760 of the closures 900, 906, 908 at locations near the closure end regions 1100A, 1106A, 1108A (i.e., near where the closures 900, 906, 908 "roll up" when they retract to take on the "roll form configurations" 900R, 906R, 908R. In FIGS. 13 and 14 it will be seen that a supply conduit 1604 for the rear wall closure 904 is similarly provided. Each of the supply conduits 1600, 1604, 1606, 1608 and the fluid-pressure-expansible members 760 of the closures 900, 904, 906, 908 to which the supply conduits 1600, 1604, 1606, 1608 are depicted schematically in FIG. 15.

Figure 15:
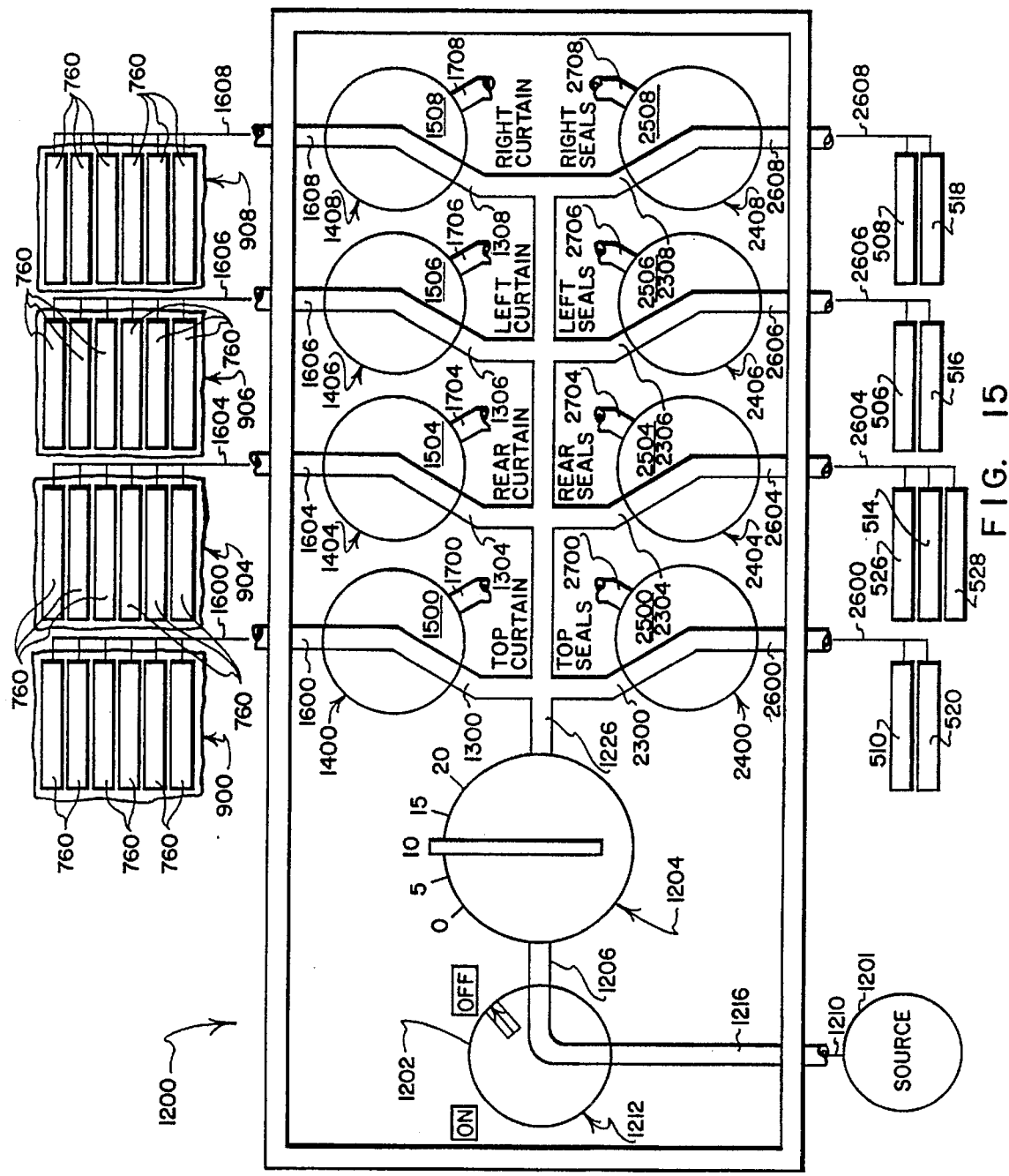

Referring to FIG. 15, a control panel 1200 that includes an "on/off" valve 1202 and a pressure regulator control valve 1204 that are connected in series by an interconnection conduit 1206. The "on/off" valve 1202 has a control knob 1212 that is rotatable between an "on" position (schematically depicted in FIG. 15 as serving the function of providing unrestricted fluid flow communication between a fluid pressure supply conduit 1216 and the interconnection conduit 1206), and an "off" position (not depicted) wherein it will be understood that no fluid communication is established between the conduits 1206, 1216. The supply conduit 1216 is connected to a source of pressurized fluid 1201— such as a compressor-filled pressurized air reservoir tank of a semi-trailer tractor (not shown).

The pressure regulator control valve 1204 has a control knob 1214 that is rotatable from a "zero" position wherein substantially no appreciable rate of flow of fluid is permitted between the interconnection conduit and a plenum conduit 1226, and "adjustment positions" wherein controlled flows of pressurized fluid—typically fluid flows that are suitable for delivering pressurized fluid such as compressed air at suitable pressures ranging from zero to about twenty pounds per square inch above ambient atmospheric pressure—are permitted to flow from the interconnection conduit 1206 to the plenum conduit 1226.

The plenum conduit 1226 has communicating branches 1300, 1304, 1306, 1308 and 2300, 2304, 2306, 2308 for establishing substantially unrestricted fluid flow communication between the pressure regulator control valve 1204 and inlets of curtain extension/retraction control valves 1400, 1404, 1406, 1408 and seal inflation/deflation control valves 2400, 2404, 2406, 2408, respectively.

The curtain extension/retraction control valves 1400, 1404, 1406, 1408 have control knobs 1500, 1504, 1506, 1508 that are rotatable between "extension" positions (schematically depicted in FIG. 15 as serving the function of providing unrestricted fluid flow communication between the plenum branches 1300, 1304, 1306, 1308 of the plenum conduit 1226 and curtain operator conduits 1600, 1604, 1606, 1608) and "retraction" positions (wherein it will be understood that the valves 1400, 1404, 1406, 1408 serve the function of communicating the curtain operator conduits 1600, 1604, 1606, 1608 with exhaust conduits 1700, 1704, 1706, 1708 that permit pressurized fluid to exhaust from the operator conduits 1600, 1604, 1606, 1608 (typically to atmosphere, assuming that the pressurized fluid that is being utilized is compressed air).

As will readily be understood by those who are skilled in the art, the valves 1400, 1404, 1406, 1408 can only establish "one at a time" communication between the operator conduits 1600, 1604, 1606, 1608 and either the fluid pressure supply branches 1300, 1304, 1306, 1308 of the plenum conduit 1226 or the exhaust conduits 1700, 1704, 1708, 1708. When the operator conduits 1600, 1604, 1606, 1608 are communicated by the valves 1400, 1404, 1406, 1408 with the supply branches 1300, 1304, 1306, 1308, no communication is established by the valves 1400, 1404, 1406, 1408 with the exhaust conduits 1700, 1704, 1706, 1708. Likewise, when the operator conduits 1600, 1604, 1606, 1608 are communicated with the exhaust conduits 1700, 1704, 1706, 1708, no communication is established by the valves 1400, 1404, 1406, 1408 with the supply branches 1300, 1304, 1306, 1308.

The seal inflation/deflation control valves 2400, 2404, 2406, 2408 have control knobs 2500, 2504, 2506, 2508 that are rotatable between "extension" positions (schematically depicted in FIG. 15 as serving the function of providing unrestricted fluid flow communication between the plenum branches and fluid pressure supply branches 2300, 2304, 2306, 2308 of the plenum conduit 1226 and seal operator conduits 2600, 2604, 2606, 2608) and "retraction" positions (wherein it will be understood that the valves 2400, 2404, 2406, 2408 serve the function of communicating the seal operator conduits 2600, 2604, 2606, 2608 with exhaust conduits 2700, 2704, 2706, 2708 that permit pressurized fluid to exhaust from the operator conduits 2600, 2604, 2606, 2608 (typically to atmosphere, assuming that the pressurized fluid that is being utilized is compressed air).

As will readily be understood by those who are skilled in the art, the valves 2400, 2404, 2406, 2408 can only establish "one at a time" communication between the operator conduits 2600, 2604, 2606, 2608 and either the fluid pressure supply branches 2300, 2304, 2306, 2308 of the plenum conduit 1226 or the exhaust conduits 2700, 2704, 2708, 2708. When the operator conduits 2600, 2604, 2606, 2608 are communicated by the valves 2400, 2404, 2406, 2408 with the supply branches 2300, 2304, 2306, 2308, no communication is established by the valves 2400, 2404, 2406, 2408 with the exhaust conduits 2700, 2704, 2706, 2708. Likewise, when the operator conduits 2600, 2604, 2606, 2608 are communicated with the exhaust conduits 2700, 2704, 2706, 2708, no communication is established by the valves 2400, 2404, 2406, 2408 with the supply branches 2300, 2304, 2306, 2308.

The curtain operator control valve 1400 serves the functions of selectively 1) communicating the conduits 1300, 1600, 2) communicating the conduits 1600, 1700, or 3) communicating none of the conduits 1300, 1600, 1700. When the valve 1400 is configured as depicted in FIG. 15 to communicate the fluid-pressure-expansible members 760 of the top wall curtain 900 with the plenum conduit 1226, pressurized fluid that has been supplied to the plenum conduit 1226 by the series arrangement of the "on/off" and "regulator" valves 1202, 1204 will be ducted to the fluid-pressure-expansible members 760 of the top wall curtain 900 to extend the top wall curtain 900 away from its "retracted" "roll form configuration 900R toward its fully "extended" configuration. However, when the valve 1400 is configured to communicate the fluid-pressure-expansible members 760 of the top wall curtain 900 with the exhaust conduit 1700, pressurized fluid from within the fluid-pressure-expansible members 760 will be permitted to exhaust so that the top wall curtain 900 will be permitted to retract under the influence of its spring members 762, 764 toward its "roll form configuration" 900R.

The curtain operator control valve 1404 serves the functions of selectively 1) communicating the conduits 1304, 1604, 2) communicating the conduits 1604, 1704, or 3) communicating none of the conduits 1304, 1604, 1704. When the valve 1404 is configured as depicted in FIG. 15 to communicate the fluid-pressure-expansible members 760 of the rear wall curtain 904 with the plenum conduit 1226, pressurized fluid that has been supplied to the plenum conduit 1226 by the series arrangement of the "on/off" and "regulator" valves 1202, 1204 will be ducted to the fluidpressure-expansible members 7670 of the rear wall curtain 904 to extend the rear wall curtain 904 away from its "retracted" "roll form configuratino 904R toward its fully "extended" configuration. However, when the valve 1404 is configured to communicate the fluid-pressure-expansible members 760 of the rear wall curtain 904 with the exhaust conduit 1704, pressurized fluid from within the fluid-pressure-expansible members 760 will be permitted to exhaust so that the rear wall curtain 904 will be permitted to retract under the influence of its spring members 762, 764 toward its "roll form configuration" 904R.

The curtain operator control valve 1406 serves the functions of selectively 1) communicating the conduits 1306, 1606, 2) communicating the conduits 1606, 1706, or 3) communicating none of the conduits 1306, 1606, 1706. When the valve 1406 is configured as depicted in FIG. 15 to communicate the fluid-pressure-expansible members 760 of the left wall curtain 906 with the plenum conduit 1226, pressurized fluid that has been supplied to the plenum conduit 1226 by the series arrangement of the "on/off" and "regulator" valves 1202, 1204 will be ducted to the fluid-pressure-expansible members 760 of the left wall curtain 906 to extend the left wall curtain 906 away from its "retracted" "roll form configuration 906R toward its fully "extended" configuration. However, when the valve 1406 is configured to communicate the fluid-pressure-expansible members 760 of the left wall curtain 906 with the exhaust conduit 1706, pressurized fluid from within the fluid-pressure-expansible members 760 will be permitted to exhaust so that the left wall curtain 906 will be permitted to retract under the influence of its spring members 762, 764 toward its "roll form configuration" 906R.

The curtain operator control valve 1408 serves the functions of selectively 1) communicating the conduits 1308, 1608, 2) communicating the conduits 1608, 1708, or 3) communicating none of the conduits 1308, 1608, 1708. When the valve 1408 is configured as depicted in FIG. 15 to communicate the fluid-pressure-expansible members 760 of the right wall curtain 908 with the plenum conduit 1226, pressurized fluid that has been supplied to the plenum conduit 1226 by the series arrangement of the "on/off" and "regulator" valves 1202, 1204 will be ducted to the fluid-pressure-expansible members 760 of the right wall curtain 908 to extend the right wall curtain 908 away from its "retracted" "roll form configuration 908R toward its fully "extended" configuration. However, when the valve 1408 is configured to communicate the fluid-pressure-expansible members 760 of the right wall curtain 908 with the exhaust conduit 1708, pressurized fluid from within the fluid-pressure-expansible members 760 will be permitted to exhaust so that the right wall curtain 908 will be permitted to retract under the influence of its spring members 762, 764 toward its "roll form configuration" 908R.

The seal operator control valve 2400 serves the functions of selectively 1) communicating the conduits 2300, 2600, 2) communicating the conduits 2600, 2700, or 3) communicating none of the conduits 2300, 2600, 2700. When the valve 2400 is configured as depicted in FIG. 15 pressurized fluid that has been supplied to the plenum conduit 1226 by the series arrangement of the "on/off" and "regulator" valves 1202, 1204 will be ducted to the fluid-pressure-expansible top curtain seals 510, 520 to expand the seals 510, 520 within the receiving grooves 410, 420 to clampingly engage and establish seals with edge regions 1010, 1020 of the top curtain 900 if the edge regions 1010, 1020 have been tucked into the grooves 410, 420 at a time after the top curtain 900 has been extended to cover the top wall opening 800. However, when the valve 2400 is configured to communicate the fluid-pressure-expansible top curtain seals 510, 520 with the exhaust conduit 2700 to duct pressurized fluid from within the fluid-pressure-expansible top curtain seals 510, 520 into the exhaust conduit 2700, the seals 510, 520 will be permitted to deflate to release their grip on the curtain edge regions 1010, 1020.

The seal operator control valve 2404 serves the functions of selectively 1) communicating the conduits 2304, 2604, 2) communicating the conduits 2604, 2704, or 3) communicating none of the conduits 2304, 2604, 2704. When the valve 2404 is configured as depicted in FIG. 15 pressurized fluid that has been supplied to the plenum conduit 1226 by the series arrangement of the "on/off" and "regulator" valves 1202, 1204 will be ducted to the fluid-pressure-expansible rear curtain seals 514, 526, 528 to expand the seals 514, 526, 528 within the receiving grooves 414, 426, 428 to clampingly engage and establish seals with edge regions 1104B, 1026, 1028 of the rear curtain 904 if the edge regions 1104B, 1026, 1028 have been tucked into the grooves 414, 426, 428 at a time after the rear curtain 904 has been extended to cover the rear wall opening 804. However, when the valve 2404 is configured to communicate the fluid-pressure-expansible rear curtain seals 514, 526, 528 with the exhaust conduit 2704 to duct pressurized fluid from within the fluid-pressure-expansible rear curtain seals 514, 526, 528 into the exhaust conduit 2704, the seals 514, 526, 528 will be permitted to deflate to release their grip on the curtain edge regions 1104B, 1026, 1028.

The seal operator control valve 2406 serves the functions of selectively 1) communicating the conduits 2306, 2606, 2) communicating the conduits 2606, 2706, or 3) communicating none of the conduits 2306, 2606, 2706. When the valve 2406 is configured as depicted in FIG. 15 pressurized fluid that has been supplied to the plenum conduit 1226 by the series arrangement of the "on/off" and "regulator" valves 1202, 1204 will be ducted to the fluid-pressure-expansible left curtain seals 506, 516 to expand the seals 506, 516 within the receiving grooves 406, 416 to clampingly engage and establish seals with edge regions 1006, 1016 of the left curtain 906 if the edge regions 1006, 1016 have been tucked into the grooves 406, 416 at a time after the left curtain 906 has been extended to cover the left wall opening 806. However, when the valve 2406 is configured to communicate the fluid-pressure-expansible top curtain seals 506, 516 with the exhaust conduit 2706 to duct pressurized fluid from within the fluid-pressure-expansible left curtain seals 506, 516 into the exhaust conduit 2706, the seals 506, 516 will be permitted to deflate to release their grip on the curtain edge regions 1006, 1016.

The seal operator control valve 2408 serves the functions of selectively 1) communicating the conduits 2308, 2608, 2) communicating the conduits 2608, 2708, or 3) communicating none of the conduits 2308, 2608, 2708. When the valve 2408 is configured as depicted in FIG. 15 pressurized fluid that has been supplied to the plenum conduit 1226 by the series arrangement of the "on/off" and "regulator" valves 1202, 1204 will be ducted to the fluid-pressure-expansible right curtain seals 508, 518 to expand the seals 508, 518 within the receiving grooves 408, 418 to clampingly engage and establish seals with edge regions 1008, 1018 of the right curtain 908 if the edge regions 1008, 1018 have been tucked into the grooves 408, 418 at a time after the right curtain 908 has been extended to cover the right wall opening 808. However, when the valve 2408 is configured to communicate the fluid-pressure-expansible top curtain seals 508, 518 with the exhaust conduit 2708 to duct pressurized fluid from within the fluid-pressure-expansible right curtain seals 508, 518 into the exhaust conduit 2708, the seals 508, 518 will be permitted to deflate to release their grip on the curtain edge regions 1008, 1018.

In operation, a particular one of the closure curtains 900, 904, 906, 908 is selected to be opened. The seal operator control valve 2400, 2404, 2406, 2408 for the selected curtain is set to deflate the edge-gripping seals that are associated with the selected curtain. After the seals that are associated with the selected curtain have been deflated and after edge regions of the selected curtain have been manually withdrawn from their associated receiving grooves, the curtain operator control valve 1400, 1404, 1406, 1408 for the selected curtain is set to deflate the inflatable members 760 of the selected curtain so that the selected curtain then will retract gently under the influence of its torsion springs 762, 764. To open other curtains, the same sequence of steps is carried out.

To effect curtain closure, a particular one of the curtains 900, 904, 906, 908 is selected to be closed. The valves 1202, 1204 are set to deliver compressed air to the plenum conduit 1226 at about twenty pounds per square inch, and the curtain operator control valve 2400, 2404, 2406, 2408 for the selected curtain is set to deliver pressurized air from the plenum conduit 1226 to the fluid-pressure-expansible members 760 of the selected curtain to cause the selected curtain to gently extend. When the selected curtain has become fully extended, any tie-down straps that may need to be secured to hold the extended curtain in place are dutifully secured. If other curtains also are to be closed, the same sequence of steps is carried out with respect to each such curtain to effect its closure.

Once closure of all desired curtains has been completed, the pressure regulator valve 1204 then is preferably set to deliver pressurized air at a lower pressure such as about five pounds per square inch to the plenum conduit 1226—whereby a suitable supply of pressurized air is supplied to the inflatable members 760 of the closed curtains to assist in keeping them properly closed.

With pressurized air being supplied to the plenum conduit 1226 at a pressure of preferably about five pounds per square inch, selected ones of the seal operator control valves 2400, 2404, 2406, 2408 can be operated, preferably on a one-at-a-time basis to effect inflation of such ones of the curtain edge seals as are ready to engage curtain edge regions that have been tucked into their associated receiving grooves. When all desired seals have been inflated, the supply of pressure to the plenum conduit 1226 is maintained at preferably about five pounds per square inch so that the expansible members 760 of the closed curtains will continue to be supplied with pressurized air, and so that inflated seals also will continue to be supplied with pressurized air.

Whereas much of the foregoing "detailed description" has been taken from that which appears in the referenced Parent Case, the discussion that follows builds upon, expands upon and updates the foregoing discussion to bring to this document the benefit of new knowledge, information and understanding that has led to the development of a relatively large number of improvement features—features that can be utilized in various forms of combination and/or in combination with such features as are described previously and form the subject matter of the referenced Parent Case.

While closure components, constructions and features that are discussed in conjunction with the embodiments of FIGS. 16–29 differ in a number of ways from those which have been discussed in conjunction with the embodiments of FIGS. 1–15, the vehicle and supporting frame structure features that have been described in conjunction with and are depicted in FIGS. 1–15 carry over to (and, for the most part are identical to) the vehicle and supporting frame that are depicted to various degrees in FIGS. 16–29.

To avoid having to needlessly repeat many pages of description in introducing basic features that are depicted in FIGS. 16–29, a system of "corresponding" numerals is utilized to designate certain components that are depicted in FIGS. 16–29 that "correspond" to and remain substantially unchanged in comparison to previously described and depicted components. Components and features that are designated in FIGS. 16–29 by four-digit numerals that begin with the numeral "3" "correspond" to such components and features as have been discussed in detail in conjunction with and are depicted in FIGS. 1–15, and are which designated in FIGS. 1–15 by three-digit numerals that are identical to the four-digit numerals of FIGS. 16–29 except that the "corresponding" numerals used in FIGS. 1–15 have no initial fourth digit "3."

Thus, for example, it will be understood 1) that, the vehicle wheels that are depicted in FIGS. 16 and 17, and that are designated in FIGS. 16 and 17 by the four-digit numeral 3120 "correspond" to the vehicle wheels that are depicted in FIGS. 1 and 2, and that are designated in FIGS. 1 and 2 by the "corresponding" three-digit numeral 120; 2) that the description that applies to wheels 120 in conjunction with FIGS. 1 and 2 is equally applicable to the "corresponding" wheels 3120 that are depicted in FIGS. 16 and 17; and, 3) that there is no need to repeat or otherwise provide herein a further description herein of the "corresponding" wheels 3120. The same holds true with respect to "corresponding" features that are designated by other four-digit numerals that begin with the digit "3" in FIGS. 16–29 that are designated by "corresponding" three-digit numerals in FIGS. 1–15, as will be readily understood by those who are skilled in the art.

Referring to FIGS. 16–19 and 21–23, a preferred form of flexible, top-hung, upwardly retractable, downwardly extensible, curtain-like closure for use in closing a vertically extending side wall opening of a freight hauling vehicle is indicated generally by the numeral 4908. An upper section of the closure 4908 is indicated by the numeral 4908U. A lower section of the closure 4908 is indicated by the numeral 4908L.

Figure 21:
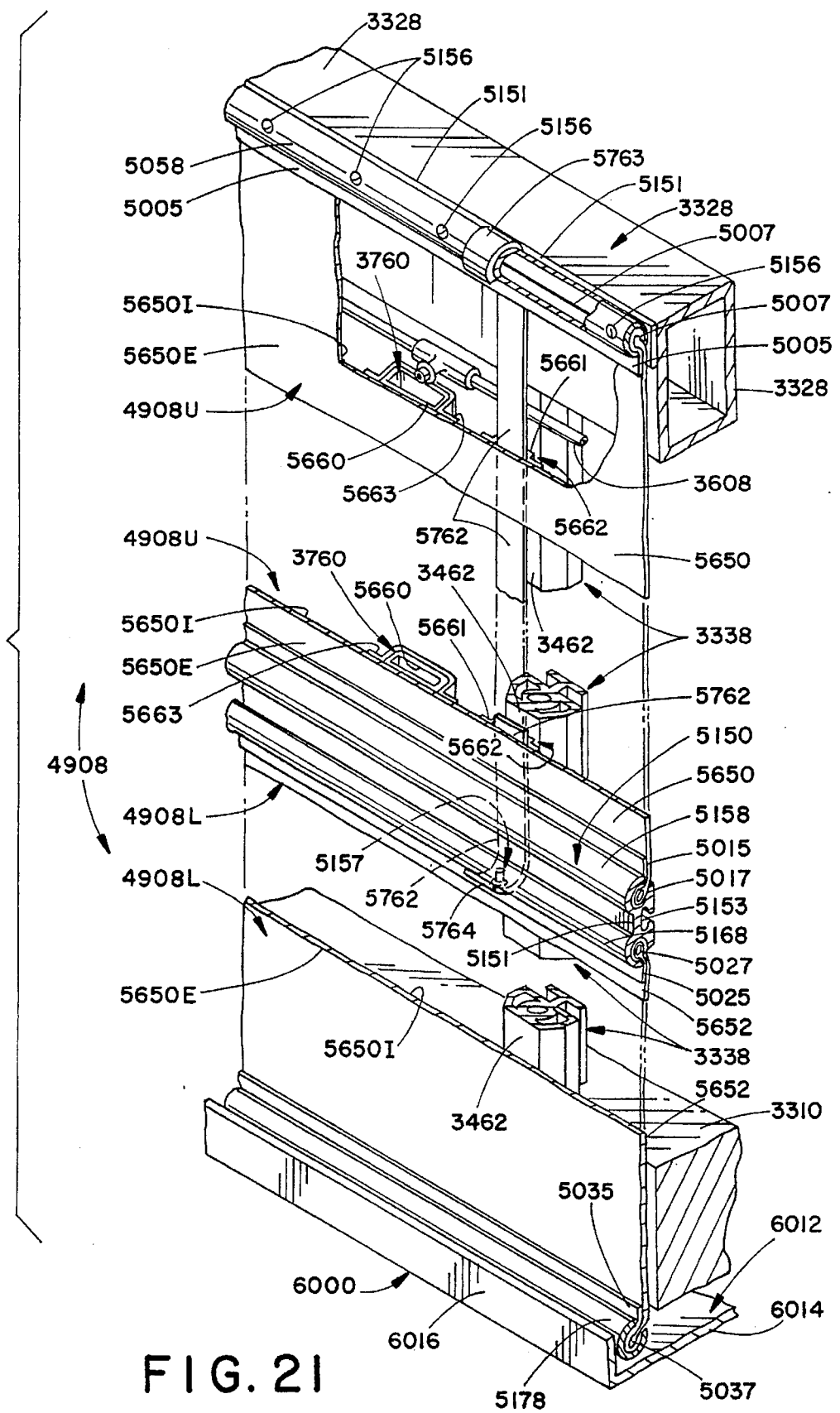

The closure or curtain 4908 has a "length" that is measured in a substantially vertical direction (when the closure or curtain 4908 is "extended" in the manner that is depicted in FIGS. 17, 19 and 21—i.e., in a direction that substantially parallels the direction in which portions of the curtain 4908 move relative to each other as the curtain 4908 "extends" from its roll form configuration 4809R (shown in FIGS. 16 and 23) to its "extended" or "operating position" (shown in FIGS. 17, 19 and 21). Stated in another way, the "length" of the side wall closure or curtain 4809 is the distance, measured longitudinally along the fabric of the curtain 4908 between opposite top and bottom end regions of the curtain 4908, as depicted in FIGS. 17, 19 and 21. The "width" of the side wall closure or curtain 4809 is the distance, measured in a substantially horizontal direction, across the fabric of the curtain 4908 between opposite "right" and "left" (i.e., "front" and "rear") edge regions 5008, 5018, respectively, as depicted in FIGS. 16 and 17.

A simple option that can be utilized in place of providing front and rear edge regions 5008, 5018 with inflatable seals of the type that are described and discussed in conjunction with FIGS. 10–12 is depicted in FIG. 18 where the upright 3308 is shown as being provided with a simple "air dam" 4308 that functions to divert air flowing around the forward bulkhead structure 3130 and alongside the extended curtain 4908 (as indicated by arrows 5000 in FIG. 18) to refrain from buffering the right edge region 5008 of the curtain 4908 (and from flowing behind or along the inside surface of the curtain 4908). In many applications, simple "air dams" of the general type depicted in FIG. 18 will suffice to keep unwanted air flow, undue moisture and the like from moving behind the extended curtain 4908, and will suffice to keep the front edge region 5008 of the curtain 4908 from being buffeted about by the air flow 5000.

As is depicted in FIG. 21, elongate spacer strips 5151 are interposed between the upper end region 5005 of the curtain section 4908U and a header 3328 to which the upper curtain section 4908 is to be connected by means of threaded fasteners 5156 that extend through aligned holes formed in a hollow extrusion member 5058 and in the upper end region 5005 of the curtain section 4908U, and are threaded into aligned openings formed in the header 3328. The spacer strips 5151 terminate so as to leave spaces between adjacent ones of the spacer strips 5151 at locations where retraction member springs 5762 have curved upper end regions 5763 that wrap a short distance about the hollow extrusion 5058.

The spacer strips 5151 (two are depicted in FIG. 21, but none are shown in FIG. 19) are thicker than are the upper end regions 5763 of the springs 5762, and serve to define "slots" or "slot-like spaces" (one of which is indicated by the numeral 5001 in FIG. 19) located between the hollow extrusion 5058 and the header 3328. Because the slots 5001 are made wider (by the thickness of the spacers 5151) than are the thicknesses of the upper end regions 5763 of the springs 5762, the extrusion 5058 and the header 3328 to not clamp the upper end regions 5763 of the springs 5762. Instead, the slots 5001 permit the spring end regions 5763 to move lengthwise as may be needed to accommodate extension and retraction movements of the fabric 5650 of the closure section 4908U—so that the springs 5762 can, in effect, "self adjust" to accommodate closure extension and retraction movements.

Figure 23:
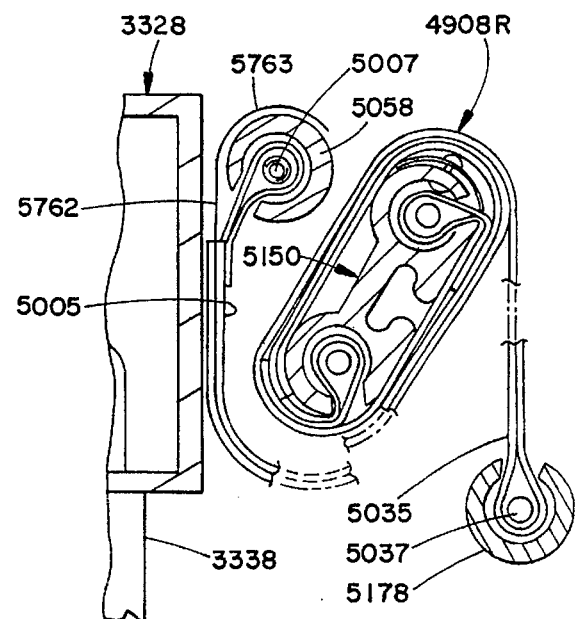

This "self adjustment" is reflected by the extent to which the upper end regions 5763 of the springs 5762 "wrap" about the periphery of the hollow extrusion member 5058. For example, in FIG. 19 an upper end region 5763 of one of the springs 5762 is shown as having a relatively lengthy reach that wraps about the extrusion 5058 when the curtain 4908 is fully extended—which is to be contrasted with what is depicted in FIG. 23 where the curtain 4908R is shown in its "rolled-up" or retracted position wherein the spring end region 5763 is seen to have only a relatively short reach that wraps about the extrusion 5058.

While permitting the upper end regions 5763 to "wrap" and "unwrap" in something of the manner in which a "yo-yo" string wraps and unwraps about the stem of a "yo-yo," may seem inconsequential, it needs to be appreciated that this is a meaningful element of an approach that has been developed through testing in order to deal with the tendency of closure retraction springs of top-hung roll-up closures to fail in the vicinities of their upper end regions. Testing has shown that, with a great many top-hung, retractable, roll-up closure configurations, the location where retraction springs are most likely to fail (i.e., to "break") is in the vicinity of their upper end regions. It has been found that such breakage tends to increase in frequency at diminished lengths of service life 1) if fasteners (such as the threaded fasteners 1156, 1158 that are depicted in FIG. 8) are installed so as to extend through holes formed in upper end regions of the retraction springs; 2) if the upper end regions of the retraction springs are rigidly clamped (such as by using the fastener-clamped bars 1156, 1158 that are depicted in FIG. 8); and/or 3) if "end curl" (a tendency of spring end regions to "curl" that is introduced when the springs are manufactured) is not somehow accommodated and preserved by the manner in which the spring end regions are held in place at the upper end regions of top-hung curtains. The non-fastener connected, non-clamped, extrusion-wrapped manner (depicted in FIGS. 19 and 21) in which upper end regions 5763 of the retraction springs 5762 are held in place addresses these drawbacks, and the freedom of movement that is provided for the spring end regions 5763 helps to permit the springs 5762 to accommodate curtain extension and retraction without causing buckling, wrinkling or other distortions in the coiled, retracted fabric of the curtain 4908.

The upper end region 5005 of the fabric 5650 of the curtain section 4908U incorporates a "welt" or cord-like length 5007 of relatively non-crushable material such as woven fiber cord (typically woven from such fibers as nylon) that gives the upper end region 5005 of the curtain fabric 5650 a rounded, enlarged cross-sectional area that extends into and is retained (by virtue of its enlarged cross-sectional size) within the interior of the hollow extrusion 5058. As is best seen in FIG. 20, the hollow extrusion 5058 is of generally C-shaped cross-section—a cross-sectional configuration that remains constant along the length of the extrusion 5058. By this arrangement, a simple, preferred form of connection is provided between the fabric 5650 of the curtain section 4908U and the extrusion 5058 that permits the weight of the fabric 5650 to be supported by the extrusion 5058 (which, in turn, is supported by the threaded fasteners 5158 from the header 3328 so as to "top hang" the closure or curtain 4908 along the right side of the trailer 3100).

Referring to FIGS. 19 and 21, similar connecting uses are made of welt-carrying fabric edge regions that are received and retained in hollow, generally C-shaped extrusion formations. For example: 1) a lower edge region 5015 of the fabric 5650 of the upper curtain section 4908U that carries a welt 5017 is received and retained within a hollow extrusion formation 5158; 2) an upper edge region 5025 of the fabric 5652 of the lower curtain section 4908L that carries a welt 5027 is received and retained within a hollow extrusion formation 5168; and 3) a lower edge region 5035 of the fabric 5652 of the lower curtain section 4908L that carries a welt 5037 is received and retained within a hollow extrusion 5178.

The hollow extrusion 5178 is identical in cross-section to the hollow extrusion 5058. Each of the hollow extrusions 5058, 5178 extend in a substantially uninterrupted manner across substantially the full widths of the curtain sections 4908U, 4908L, respectively.

While the hollow extrusion formations 5158, 5168 are substantially identical to the cross-sections of the extrusions 5058, 5178, the hollow extrusion formations 5158, 5168 are not entirely independent members but rather comprise integrally formed portions of what will be referred to as a "connecting extrusion" 5150. The connecting extrusion 5150 has a central web 5151 which extends between and rigidly connects the extrusion formations 5158, 5168. An undercut, generally T-shaped slot 5153 is defined by the central web 5151 for providing a formation to which a variety of conventional connecting devices can be coupled should there be a need to provide an attachment at substantially any desired location along the length of the connecting extrusion 5150.

Referring still to FIGS. 19 and 21, it will be seen that lower end regions 5764 of the springs 5762 are wrapped only a short distance around curved bottom surfaces of the hollow extrusion formation 5168, and are rigidly attached to the connecting extrusion 5150 by means of fasteners, preferably rivets 5157. By this arrangement, the springs 5762 are rigidly connected to the curtain 4908 at only the locations of the rivets 5157—which leaves most of the length of the material of the elongate springs 5762 free to move relative to the fabric 5650 of the curtain section 4908U, which often is needed to prevent buckling and wrinkling of curtain fabric during extension and retraction movements.

As those who are skilled in the art readily will understand, the objective of connecting each of the retraction springs 5762 rigidly to the fabric of a retractable closure at only one location along the length of each of the springs 5762 can be achieved without confining the point of such connection to the lower end region 5764 of the spring 5762. However, in developments made to date, no better way (than has been described above) of effecting such connections has been found, and the approach that has been described above has, at least as of the present time, been deemed to be satisfactory. While testing has shown that locating such connections along upper end regions 5763 of the springs 5762 easily can result in premature spring failure taking place within the vicinity of the upper end regions 5763, locating such connections along the lower end regions 5764 has not disclosed an equivalent tendency to promote premature spring failure.

The majority of the length of the retraction springs 5762 extends through (i.e., is received within) pocket formations (i.e., "pockets") 5662 that preferably are formed by stitching, bonding, welding or otherwise suitably fastening an elongate, relatively narrow panel of fabric 5661 (see FIG. 21) to the inner surface 5650I (as opposed to the exterior surface 5650E) of the curtain fabric 5650. By positioning the pockets 5662 to extend along the inner surface 5650I, several advantages obtain. One advantage is that, to the extent that one of more of the spring-carrying pockets 5662 may extend transversely out of the plane of the fabric 5650 of the extended curtain section 4908U, the resulting "bulge" of material will project inwardly with respect to the vehicle trailer 3100 rather than outwardly relatively thereto so as to be less likely to be snagged by, impacted by, or otherwise undesirably contacted by objects that pass by the exterior surface 5650E of the curtain section 4908U during over-the-road travel of the vehicle trailer 3100. Because unwanted snagging, impaction and contact with the springs 5762 may result in spring deformation, malfunction or failure, it is desirable to take steps to "shield" the springs 5762 from inappropriate influences of this sort—an objective that is furthered by positioning the springs 5762 to extend along the inner surface 5650I rather than along the exterior surface 5650E of the curtain section 4908U.

Another advantage that is achieved by locating the springs 5762 to extend along the inner surface 5650I is that the spring-carrying pockets 5662 are likewise interiorily located and therefore do not disrupt an effort that often will be made to preserve a smooth, uninterrupted exterior surface 5650E so that advertising, attractive designs and/or various forms of indicia such as lettering can be provided on the exterior surface 5650E.

Still another advantage that is furthered by locating the springs 5762 to extend along the inner surface 5605I is that opposite end regions 5763, 5764 of the springs (that wrap or "curl" for short distances about the upper extrusion 5058 and about the lower extrusion formation 5168) tend to form "end curls" without also forming "reverse bends" (i.e., bends that extend in directions opposite to the manner in which the spring end regions 5763, 5764 have been "curled" when the springs 5762 originally were fabricated)—which is not necessarily the case if the springs must be deflected from the location of the exterior surface 5650E prior to forming "end curls." Minimizing the introduction of "reverse bends" into the springs 5762 minimizes spring failure that may tend to occur at locations where reverse bends have been formed.

A further factor that has been found to contribute to an improvement in enhancing the length of the service life of the springs 5762 is to locate each of the spring carrying pockets 5662 so that it extends in juxtaposition with the outer surface 3462 of a separate one of the stakes 3338— with the stakes 3338 (and hence the spring pockets 5662) being spaced substantially equidistantly along the length of the trailer 3100, preferably at intervals of about four feet, on center. By this arrangement, the outer surfaces 3462 of the stakes 3338 serve to somewhat limit the extent to which the nearby springs 5762 can flex out of the plane of the fabric 5650 of a tautly extended closure 4908, and thereby serve to limit the extent to which the springs 5762 can be inadvertently "cycled" as the result of such outside influences as the bouncing about of the trailer 3100 during over-the-road movement of the trailer 3100.

Spacing the retraction springs 5762 at substantially equidistant intervals of about four feet, on center, represents quite a different approach than is described in conjunction with, and illustrated in the embodiment of FIGS. 1–15. Tests have shown that, when used with top-hung, vertically extending, retractable closures for side walls of freight hauling vehicles, spring spacings of approximately four feet apart across the width of a closure will suffice to provide such force as may be needed to operate a closure that is formed from relatively heavy, tear resistant and deformation resistant woven fabric such as DuPont KEVLAR—without requiring that the springs 5762 be so forcefully wound as to inappropriately diminish their longevity of service. Moreover, by fabricating the springs 5762 so that they have a relatively wide width, preferably within the range of about two to about four inches, spring service life can be further extended inasmuch as the "preloading" of the spring material that is effected when the springs 5762 are wound can stress the spring material to a lesser extent than if the same force output much be gotten from a spring of much narrower width. (As a rule of thumb, the less stress that needs to be imposed on a spring, the longer will be its resulting service life.)

Referring to FIG. 19, the spring pockets 5662 have upper ends 5665 that terminate near where the upper edge region 5005 of the fabric 5650 extends into the hollow extrusion 5058, and lower ends 5667 that terminate where the lower edge region 5015 of the curtain 5650 extends into the hollow extrusion formation 5158.

Figure 22:
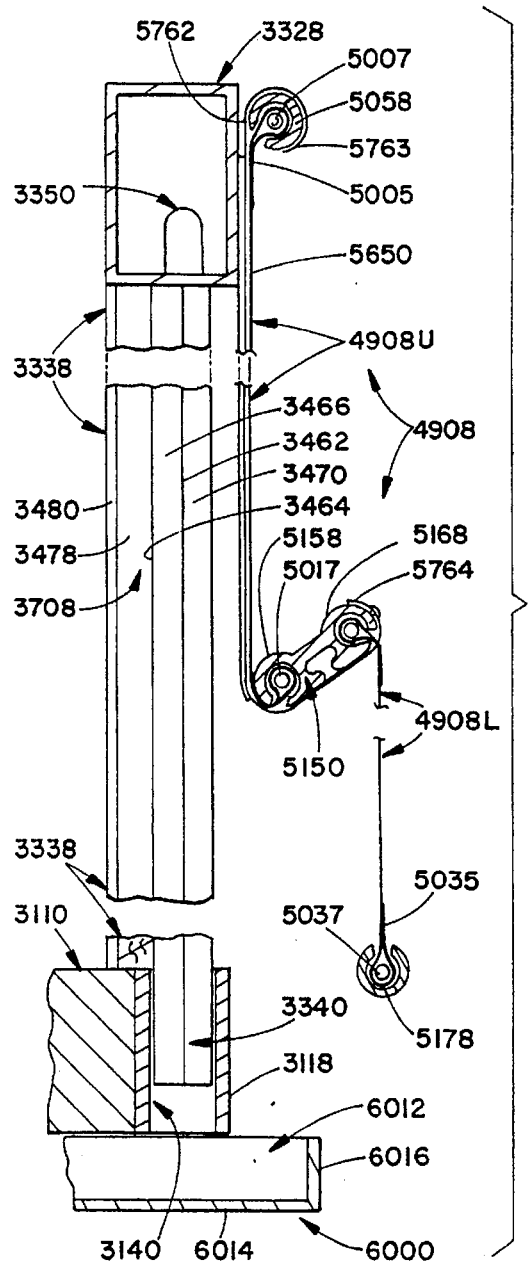

Lower end regions 5764 of the springs 5762 depend from the lower ends of the spring pockets 5662, extend along the inner side of the central web 5151 of the connecting extrusion 5150, and then curl about the lower surface of the hollow extrusion formation 5168, as is best seen in FIG. 19. By this arrangement, it is assured that, as the curtain 4908 begins to "roll up" during its movement from an extended position to a retracted position (as is depicted in FIG. 22), the "roll up" or "coiling" of the closure 4908 will tend to initiate within the vicinity of, if not directly at the location of, the connecting extrusion 5150—and the connecting extrusion 5150 will be caused to form the "core" of the resulting "rolled up" or retracted curtain 4908R, as is depicted in FIG. 23.

Referring to FIG. 17 wherein a preferred arrangement of retraction springs 5762 and of extension members 3670 is shown by phantom lines that extend along the upper section 4908U of an extended closure 4908, preferably only three of the extension members 3670 are used in combination with more than a dozen retraction springs 5762. Except for the fact that the extension members 3670 do not extend for the full length of the closure 4908 (rather they extend for only about half of the length of the closure, namely for the length of the upper section 4908U), the description presented above relating to the extension members 670 will be found to be applicable to the extension members 3670.

The use of only three extension members 3670 in a closure of more than forty feet in width represents a substantial change in approach from that which has been described in conjunction with the closure embodiment of FIGS. 1–15; however, tests and experience have shown that relatively few extension members 3670 (in comparison with the significantly larger number of retraction springs 5762 that are utilized by a relatively wide closure) will suffice and will provide good longevity of service. Moreover, inasmuch as the extension members 3670 tend to be more "bulky" than are the springs 5762 (which have very minuscule cross-sections in comparison with inflated extension members 3670) and therefore are sometimes found to hinder smooth "roll-up" of a closure to a far more significant extent than do the springs 5762, the fewer the number of extension members 3670, the easier it tends to be to get a closure to behave, as desired, during retraction.

As is depicted in FIG. 17, what seems to be of principal importance as regards retraction member positioning at locations across the width of the curtain section 4908U, is that the retraction springs 5762 be substantially equally spaced. Whether the set of retraction springs 5762 that is depicted by hidden lines in FIG. 2 includes a spring that is located substantially adjacent a vertically extending edge of the curtain section 4908U (e.g., in the manner that one of the retraction springs 5762 is depicted as extending immediately along the front edge of the curtain section 4908U), or whether a vertical edge of the curtain section 4908U has no adjacent retraction spring 5762 (see the rear edge of the curtain section 4908U that has no retraction spring 5762 within several inches thereof) presently is not deemed to be of particular import. However, as those who are skilled in the art readily will appreciate, there is always a possibility that tests conducted of a particular curtain configuration may show that, for the particular curtain configuration being tested, it may be desirable to specially position one or more of the retraction springs to accommodate special needs or conditions.

As is depicted in FIG. 17, adjacent ones of the three extension members 3670 are substantially equally spaced, and the front-most and rear-most of the extension members 3670 are spaced away from the front and rear edges of the closure section 4908L by substantial distances. Spacings between adjacent extension members 3670 of about twelve to about fifteen feet have been found to serve well for use with covers that range from about forty to about forty eight feet in width; and spacings inwardly from the front and rear edges of the closures to the locations of the front-most and rear-most of the extension members of about eight to about fourteen feet also have been found to serve well, with tests indicating that, in many applications, none of these spacings tend to be especially critical.

What is preferred, as regards the number and the positioning of the extension members that are used to extend a top-hung, retractable, roll-up, curtain-like closure for a freight hauling vehicle is 1) to use relatively few extension members (preferably as few as are found to perform their function satisfactorily); 2) to space adjacent ones of the extension members apart by substantially equal distances; and, 3) to position the front-most and the rear-most extension members inwardly from the front and rear edges of the closure, respectively, by substantially equal distances that are within the range of about one-half of to about an equal amount of the distance that is utilized for the substantially equal spacings of adjacent ones of the extension members.

Referring to FIG. 21, substantially the entire lengths of the extension members 3760 are contained within pocket formations (i.e., "pockets") 5660 of the upper closure section 4908U. Like the spring pockets 5662, the extension member pockets 5660 preferably are formed by stitching, bonding, welding or otherwise suitably fastening an elongate, relatively narrow panel of fabric 5663 (see FIG. 21) to the inner surface 5650I (as opposed to the exterior surface 5650E) of the curtain fabric 5650. By positioning the pockets 5660 to extend along the inner surface 5650I, a number of advantages obtain—chief among which are 1) that the "bulge" of material that forms the pocket 5660 will extend inwardly rather than outwardly so as to not detract from the smooth outer surface 5650E of the fabric 5650, and 2) that the extension members 3670 will, to some extent, be "shielded" by virtue of their being located inwardly rather than outwardly with respect to the fabric 5650 of the closure 4908.

By forming the closure 4908 as it is depicted in FIGS. 17, 19 and 21 so that the closure 4908 has upper and lower panels 4908U, 4908L with only the upper of these panels containing or carrying the extension and retraction members 3760, 5762, a number of advantages obtain.

One very practical advantage that results from this kind of dual-panel arrangement relates to ease of manufacture and to keeping minimal the cost of manufacture. Because two individual panels of fabric 5650, 5652 that can be of substantially equal width can be used to form the closure 4908, this means that each of fabric panels 5650, 5652 probably will not need to have a height that is greater than about sixty four to about seventy two inches—to form a closure 4908 that has a total height of about one hundred twenty to about one hundred thirty inches (which is about what relatively tall semi-trailer trucks require for a side wall closure). This brings the manufacture of each of the fabric panels 5650, 5552 within range of the production "width" capability of present-day looms, many of which can produce a substantially endless panel of fabric that has a width of up to about sixty four to about seventy two inches. The capability to form each of the panels 5650, 5652 as a single woven piece of fabric means that the panels 5650, 5652 will be much easier to fabricate and much less costly to fabricate than would be the case if one or more panels had to be fabricated by assembling separate pieces of woven fabric.

The well known DuPont fiber sold under the registered trademark KEVLAR can be woven in widths of about sixty four to about seventy two inches utilizing present-day looms—hence two single-piece panels 5650, 5652 of woven KEVLAR can be utilized to form of the closure 4980 (instead of using a far more difficult and expensive-to-fabricate assembly of sewn-together, welded-together or bonded-together pieces of woven KEVLAR fabric). Thus, if the highly tear-resistant and dimensionally stable fiber KEVLAR is to be used to form the fabric of a retractable closure, the dual-curtain-panel arrangement that is depicted in FIGS. 17, 19 and 21 can be utilized to further this objective.

An advantage that also is significant from the viewpoint of keeping the cost of production low is that, by utilizing retraction members 5762, extension members 3760 and pocket panels 5661, 5663 that extend for only about half the length of the entire curtain 4908, the cost of providing these components is significantly diminished as compared with the cost of the "full length" counter-parts of these members that are utilized in closures such as are depicted in FIGS. 1–15.

An advantage having to do with prolonged service life is that, by eliminating the presence of retraction and extension members in the bottom panel 4908L of the curtain 4908, damaging impacts and puncture-causing incidents (to which bottom panel portions seem to be subjected to a much higher degree than do top panel portions of a top-hung retractable closure used on a freight hauling vehicle) are prevented from causing damage to or puncture of the retraction and extension members. Thus, the absence of extension and retraction members from the bottom panel 4908L will diminish the number of instances when, and the frequency with which, retraction or extension members need to be serviced or replaced.

A further advantage has to do with the manner in which a two-panel, connection-extrusion-coupled curtain behaves during retraction, as by forming what will be referred to as a "double wound" coil. As depicted in FIG. 22, a "double wound" coil begins to be formed just as soon as the dual-panel curtain 4908 begins to retract. "Double winding" occurs because, as the forceful coiling of the upper panel 4908U is begun under the influence of the retraction springs 5762 (it begins at the location of the connection extrusion 5150, as is depicted in FIG. 22), the lower panel 4908L of fabric is caused to be "wound up into" a "double wound" coil that also contains the top panel 4908U. This "double winding" of the two panels 4908L, 4908U continues until the lower panel 4908L is "wound up into" the coiled upper panel 4908U.

As a "double wound" coil of the panels 4908L, 4908U is formed, a layer of the heavy lower panel fabric 4908L is inserted between overlying layers of the upper panel fabric 4908U, whereby pressurized air tends to be forcefully expelled from the expansion members 3760. As a result, a coil of relatively uniform diameter (with little in the way of "bulges" at locations of the expansion members 3760) tends to be formed—which is a preferred type of coil to form because the retraction and extension movements that it tends to exhibit often are easier to reliably control than are the retraction and extension movements of a more sloppily wound coil.

Still another operational advantage that obtains (as a "double wound" coil of the top-hung, retractable, roll-up curtain 4908 is formed during closure retraction) has to do with the type of movement that is imparted to the bottom edge region of the curtain 4908 (the region of the panel 4908L that is located adjacent the bottom extrusion 5178). At the moment that retraction begins, the bottom edge region of the curtain panel 4908L begins to "lift"—it is literally "picked up" as a double-coil begins to form, as is depicted in FIG. 22. This immediate lifting of the bottom extrusion 5178 at the initiation of closure retraction is advantageous, for it provides a means by which the bottom extrusion 5178 can be lifted straight out of engagement with a variety of types of latching and tensioning systems that can be used to selectively engage, retain and apply tension to bottom portions of the extended curtain assembly 4908.

Figure 24:
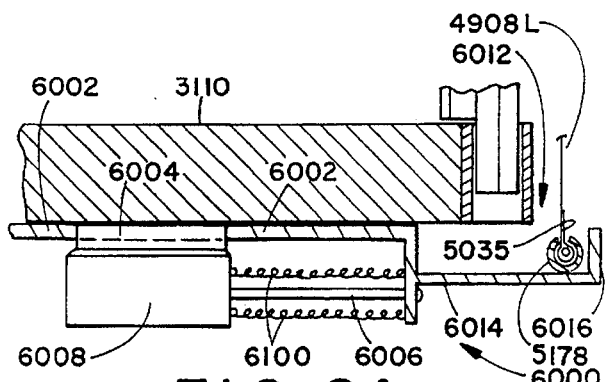
Figure 25:
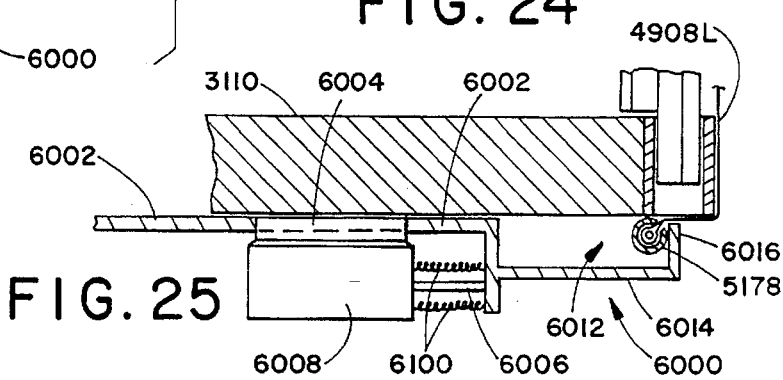

One such latching and tensioning system is depicted in FIGS. 19–22, 24 and 25. A tray-like receptacle, indicated generally by the numeral 6000, is supported on the trailer 3100 at a location immediately beneath the trailer bed 3110 for movement between an extended position that is depicted in FIGS. 19, 21, 22 and 24, and a retracted position that is depicted in FIGS. 20 and 25. As is depicted in FIGS. 19, 21 and 23, when the tray 6000 is extended, the bottom edge region of the curtain 4908 (including the extrusion 5178) can be inserted into the upwardly opening tray 6000—and, if the tray 6000 then is retracted, as is depicted in FIGS. 20 and 25, the tray 6000 can be used not only to hold the bottom edge region of the curtain 4908 in a "captured" position but also can be used as a means of applying tension force to the curtain 4908 to draw taut the curtain 4908 for over-the-road travel of the trailer 3100.

While a mechanism for extending and retracting the tray 6000 is shown somewhat schematically in FIGS. 24 and 25, those who are skilled in the art will understand that a wide variety of well known systems for effecting linear extension and retraction of the tray-like receptacle 6000 can be utilized to provide, as desired, power-operated and/or manually-operated control. Included in the schematic depictions of FIGS. 24 and 25 is an inwardly extending portion 6002 of the tray 6000 that is guided for linear extension and retraction movements by a guide 6004; an actuating stem 6006 that connects with the tray 6000 for retraction and extension movement therewith; a power-operated pneumatic cylinder 6008 that connects with the stem 6006 for effecting retraction and/or extension movements of the tray 6000; and springs 6010 that are interposed between the tray 6000 and the cylinder (or its supporting guide 6004) for biasing the tray 6000 toward its retracted position.

The tray 6000 has a curtain-receiving portion 6012 that includes a bottom wall 6014 and an upwardly extending flange 6016. When the cylinder 6008 is operated to extend the tray 6000, the curtain-receiving portion 6012 is caused to project outwardly from beneath the bed 3110 of the trailer 3100 so that the bottom edge region of the closure panel 4908L can be inserted into the curtain-receiving portion 6012, and so that portions of the curtain panel 4908L that are situated adjacent the extrusion 5178 can be supported in the tray 6000 atop the bottom wall 6014. When the tray 6000 is retracted (due to operation of the pneumatic cylinder 6008 and/or the influence of the springs 6010), lower portions of the closure panel 4908L are "captured" (the tray flange 6016 prevents movement of the lower portions of the closure panel 4908L out of the tray 6000), and engagement of the lower portions of the closure panel 4908L with the tray flange 6016 is utilized to tension and to draw taut the flexible closure 4908, with this application of force to the flexible closure 4908 preferably being due at least in part to the influence of the springs 6010 which continue to try to further retract the tray 6000 beneath the bed 3110 of the vehicle 3100.

Figure 29:
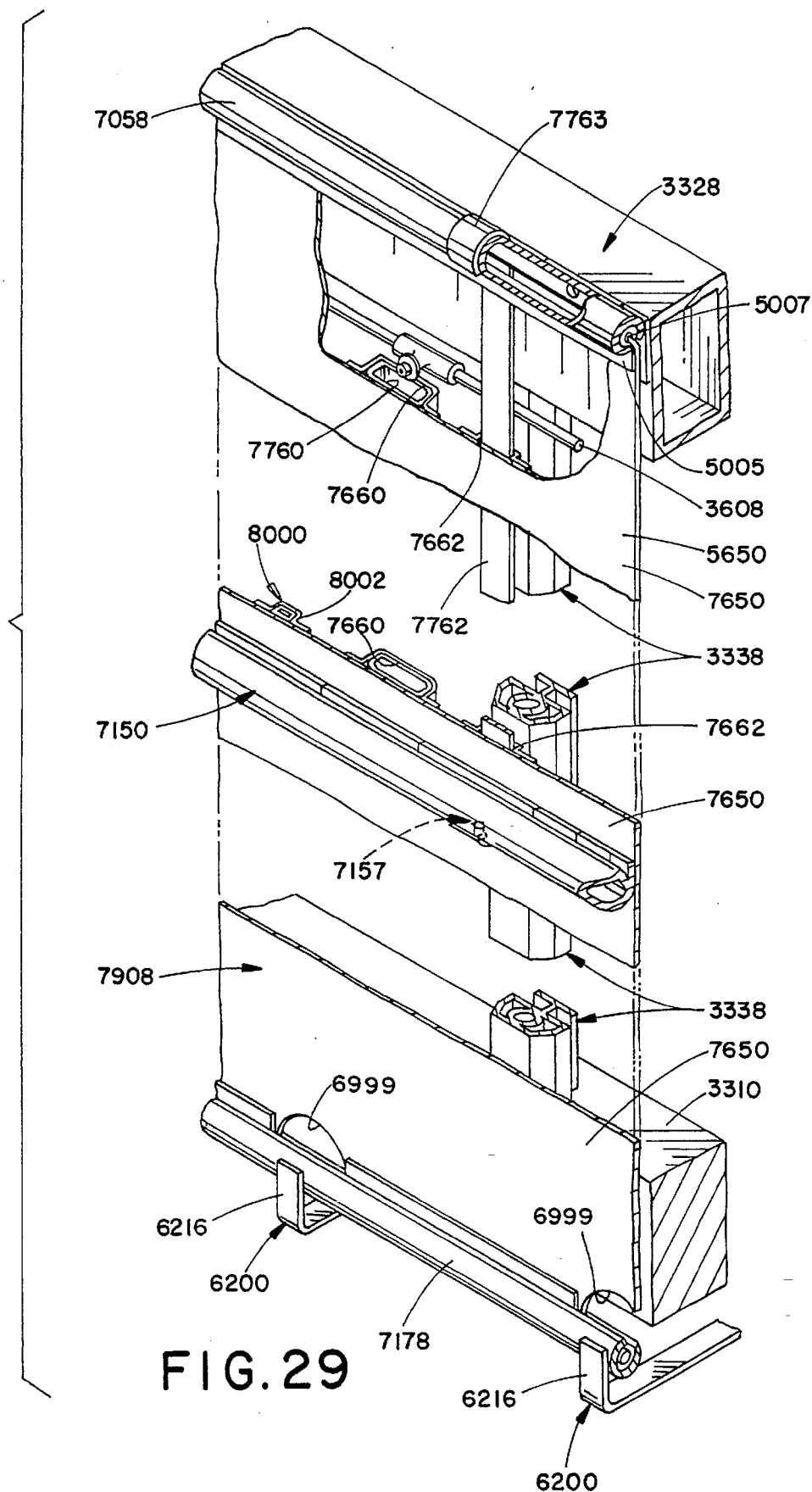

Referring briefly to FIG. 29, instead of utilizing a continuous tray-like receptacle that extends along a major portion of the length of the vehicle 3100, a plurality of narrower jaw-like members 6200 can be substituted; and, if desired, openings 6999 can be formed in the fabric of an adjacent closure 7908 to receive upwardly extending flange portions 6216 of the jaws 6200 when the jaws 6200 have been retracted to tension the closure 7908. Operation of the jaw-like members 6200 is, for all practical purposes, quite the same as has been described in conjunction with the tray-like receptacle 6000—except that, when a continuous tray-like receptacle is not to be used, it is desirable to provide the closure 7908 with jaw-receiving openings 6999 so that the jaw flanges 6216 do not puncture the closure 7908 during tensioning of the closure 7908.

Figure 26:
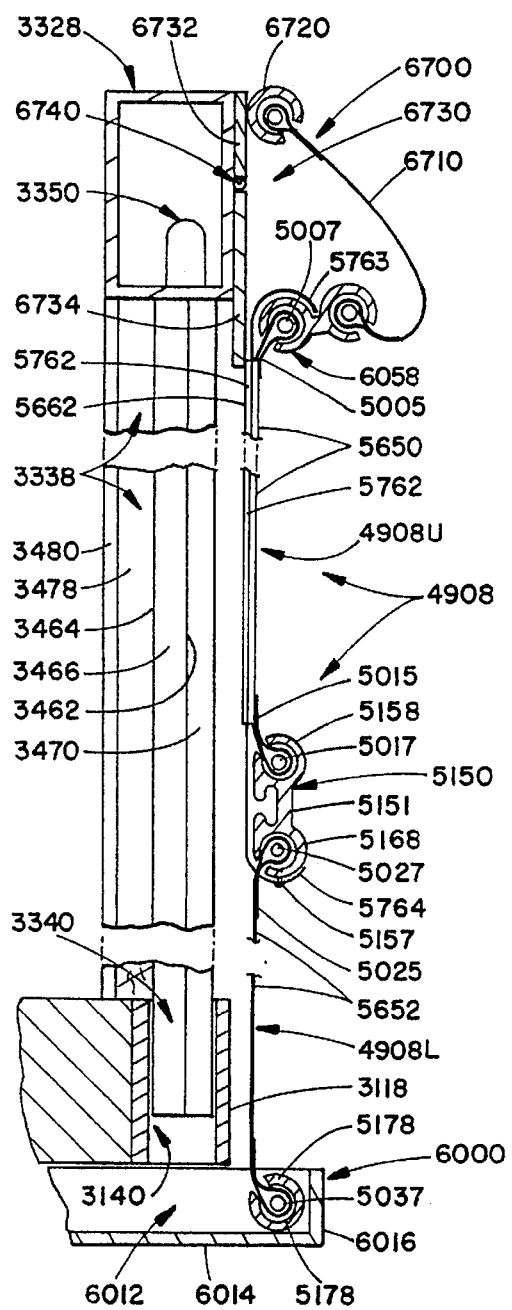
Figure 27:
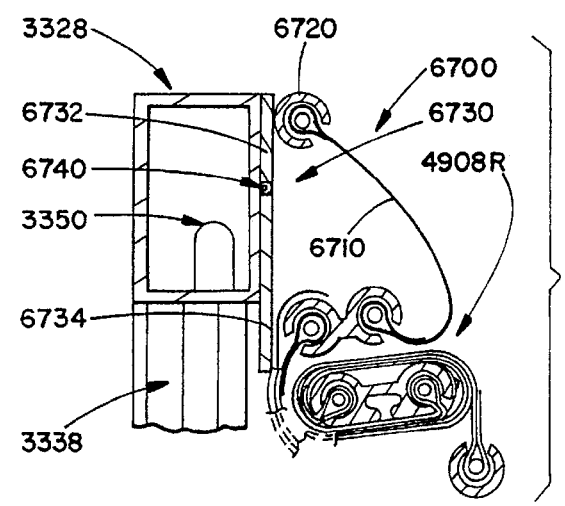
Figure 28:
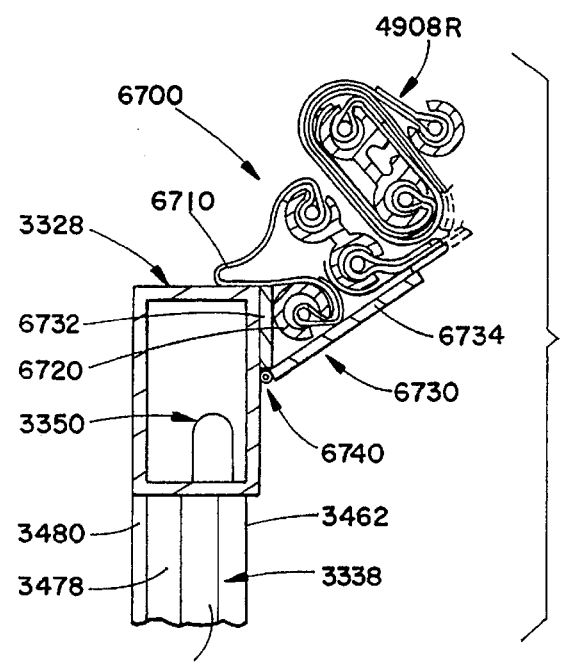

Referring to FIGS. 26-28, a hinged positioning device, indicated generally by the numeral 6700, is shown interposed between the header 3328 and the retractable closure 4908, for permitting the "rolled-up" or retracted closure 4908R to be lifted (see FIG. 28) so that it will not depend below the header 3328. There are trailer applications wherein loading and unloading of a trailer through a side wall opening requires that the full height of the side wall opening not be obstructed by the mass of a rolled-up closure depending below its supporting header—and, in such applications, the positioning device 6700 (or a substantially equivalent sort of lifting mechanism) is desirable.

The only difference in the closure 4908 (as it is depicted in FIGS. 26-28) that is necessitated when the positioning device 6700 is employed is the substitution of a specially configured "double-C shaped" extrusion 6058 for the "single-C shaped" extrusion 5058 that is depicted in FIGS. 19 and 21. The use of the double-C shaped extrusion 6058 permits a weather protection flap 6710 of fabric to be joined to the closure 4908 and to an added C-shaped extrusion 6720 that is positioned near the top of the header 3328 as a weather-protector.

At the heart of the device 6700 is a hinge assembly 6730 that has an upper portion 6732 connected to the header 3328, and a lower portion 6734 that supports the double-C extrusion 6058 (in the manner that the single-C extrusion 5058 has been described as being supported on the header 3328). The upper and lower portions 6732, 6734 are pivotally connected for movement about an axis that extends along the header 3328, indicated generally by the numeral 6740. When the lower portion 6734 lies flat against the header 3328, the closure 4908 can be moved between and positioned in its extended and retracted positions, as depicted in FIGS. 26 and 27. When the closure 4908 is in its retracted position, the lower portion 6734 of the hinge assembly 6730 can be pivoted about the axis 6740 to the position depicted in FIG. 28 to thereby raise the coiled, retracted closure 4908R so that it does not depend to any significant extent beneath the header 3328.

As will be understood by those who are skilled in the art, any of a wide variety of manually operated or power operated mechanisms (not shown) can be added to the positioning device 6700 to facilitate pivoting the lower portion 6734 of the hinge assembly 6730.

What is intended to be illustrated by FIG. 29 is that a number of the improvements that have been described above in conjunction with the two-panel closure 4908 also can be utilized to advantage in conjunction with a one-panel closure 7908. A comparison of the closure 7908, as it is depicted in FIG. 29, with the closure 4908 as it is depicted in FIG. 21, discloses many similarities, including:

The use of a C-shaped top extrusion 7058 that corresponds to the C-shaped top extrusion 5058 in that it functions to mount the curtain 7908 on the header 3328 in the same manner that the curtain 4908 is mounted;

The use of a C-shaped bottom extrusion 7178 that corresponds to the C-shaped bottom extrusion 5178 in that it defines the bottom of the curtain 7908 in the same manner that the bottom extrusion 5178 defines the bottom of the curtain 4908;

The use of a special extrusion 7150 at a location somewhere between the locations of the top and bottom extrusions 7058, 7178 that serves to stabilize and rigidify the curtain 7908 in a manner that is somewhat analogous to the stabilization and rigidification function that is provided by the connecting extrusion 5150 of the curtain 4908;

The rigid connection of retraction member springs 7762 of the curtain 7908 to the mid-curtain stabilization extrusion 7150 by rivets 7157 in very much the same manner that corresponding springs 5762 of the curtain 4908 are connected to the connection extrusion 5150 of the curtain 4908 by rivets 5157;

The use by the curtain 7908 of a simple wrap of the upper end region 7763 of each of the retraction springs 7762 to movably connect each of the upper end regions 7763 to the upper extrusion 7058 in the manner that upper end region wraps 5763 of the springs 5762 are connected to the upper extrusion 5058 of the curtain 4908;

The limitation of the length of the retraction members 7762 and of extension members 7760 to upper portions of the curtain 7908 located above the mid-curtain stabilization extrusion 7150 in very much the same manner that the retraction and extension members 5762, 3760 are of limited lengths that do not extend beneath the connection extrusion 5150; and, Other features such as the use of a single thickness of fabric 7650 to which are connected inwardly projecting pockets 7760, 7762 for housing portions of the extension and retraction members 7660, 7762 in the manner that the curtain panel 4908U has pocket forming panels 5663, 5661 with inwardly projecting pockets 5660, 5662 for housing its extension and retraction members 3760, 5762.

As will be readily apparent to those who are skilled in the art, the many similarities that exist between the curtains 4908, 7908 endow the single-panel curtain 7908 with many of the same capabilities and advantages that have been discussed in conjunction with the double-panel curtain 4908.

Also illustrated in FIG. 29 is the optional provision of inflatable "stays" that can be provided in any of the curtain embodiments of the present and Parent Cases at selected locations across the width of a panel of curtain fabric for rigidifying at least a selected region of a curtain—for example to prevent spring retraction members from being "reverse bent" or "cycled" due to movement, vibration, and/or the effect of air flow along-side the extended curtain of a moving vehicle. As is indicated in FIG. 29 by the numeral 8000, an optional inflatable "stay" of desired cross-sectional size, shape and length can be provided at substantially any desired location(s), preferably housed in specially provided pockets 8002, for being inflated only when needed to selectively stabilize and/or rigidify at least a selected portion of a retractable closure. While no plumbing connection to the inflatable stay 8000 is depicted in FIG. 29, it will be understood that pressurized air can be selectively supplied to and released from the stays 8000 in the same manner that pressurized air is supplied to and released from the extension members 7660.

While the invention has been described with a certain degree of particularity, it will be understood that the present disclosure of the preferred embodiment has been made only by way of example, and that numerous changes in the details of construction and the combination and arrangement of elements can be resorted to without departing from the true spirit and scope of the invention as hereinafter claimed. It is intended that the patent shall cover, by suitable expression in the claims, such features of patentable novelty as exist in the invention.

What is claimed is:

1. A closure having a retractable closure portion, wherein the retractable closure portion comprises:

a) flexible sheet means for defining a flexible sheet portion extendible across a selected area and retractable into a roll form, with the flexible sheet portion having a length and a width, and having opposed outer and inner sides;

b) retraction means for retracting the flexible sheet portion into said roll form, the retraction means including a plurality of elongate spring members that each are self-biased toward forming a roll, the spring members being arranged to extend across the flexible sheet portion in a substantially lengthwise direction at locations spaced transversely across the flexible sheet portion when the flexible sheet portion is extended, and being coilable together with the flexible sheet portion to form said roll form;

c) extension means connected to the flexible sheet portion for applying an extension force to the flexible sheet portion to unroll and to extend the flexible sheet portion in opposition to the biasing action of the retraction means; and, d) connecting means for connecting only one segment along the length of selected spring members to adjacent segments of the flexible sheet portion, and for connecting other segments of the lengths of the selected spring members to adjacent segments of the flexible sheet portion to permit lengthwise movement therebetween wherein the extension means includes a plurality of elongate fluid-pressure-expansible members that are carried in pockets formed from flexible fabric that extend along the inner side of the flexible sheet portion in a substantially lengthwise direction and are connected to the flexible sheet portion at transversely spaced locations, wherein the fluid-pressure-expansible members expand in response to a received supply of pressurized fluid to extend the flexible sheet portion, and means for connecting the fluid-pressure-expansible members to a source of pressurized fluid to selectively supply pressurized fluid to the fluid-pressure-expansible members.

2. The closure of claim 1 wherein:
a) the connecting means includes pocket-defining means connected to the inner side of the flexible sheet portion to define a plurality of elongate pockets, said pockets enclosing said other segments of the spring members to establish connections between said other segments of the spring members and said adjacent segments of the flexible sheet portion;
b) the elongate spring members are arranged to coil the flexible sheet portion into said roll form, and to cause said roll form to "roll up" during retraction, and to "unroll" during extension of the flexible sheet portion; and,
c) the elongate spring members extend along the inner side of the flexible sheet portion, with the spring members being enclosed in said pockets.

3. The closure of claim 1 further comprising attachment means for connecting said flexible sheet portion to a support structure, and wherein the retraction means and the extension means are connected to the flexible sheet portion to cause said roll form to assume a retracted position at one of a pair of opposite ends of the flexible sheet portion when the flexible sheet portion is retracted.

4. The closure of claim 3 wherein said attachment means extends about a length of a welt material to define an end formation having an enlarged cross section at said one of the opposite ends of the flexible sheet portion, and includes elongate means having C-shaped cross sections connected to the support structure for defining a hollow passage for retaining therein the cross section of the end formation.

5. The closure of claim 4 wherein said other segments of the spring members include spring member end regions connected to said elongate means to move during retraction and extension of the flexible sheet portion, and to alter the extent to which said spring member end regions wrap about a curved outer surface portion defined by said elongate means.

6. The closure of claim 4 wherein at least one of the elongate spring members has movable curved end regions that wrap about exterior portions of at least one of the generally C-shaped cross sections.

7. The closure of claim 1 wherein:
(a) one of a pair of opposite ends of the flexible sheet portion is connected to supporting structure for supporting the closure in a top-hung manner to extend and cover an opening located beneath the supporting structure, and for retracting to uncover the opening by "rolling up" into said roll form near said one of the opposite ends;
b) the closure also includes a flexible sheet element that is connected to the other of the opposite ends of the flexible sheet portion to cover said opening; and
c) the closure includes support means for raising and lowering the roll form of the retracted flexible sheet means, and elongate connecting means to connect said flexible sheet portion to said flexible sheet element, which defines attachment means for attaching another structure to the connecting means.

8. The closure of claim 7 wherein the end segment of said flexible sheet portion and the end segment of said flexible sheet element each have enlarged cross sectional areas that are captured within the hollow interiors of C-shaped cross sections that are defined by the elongate connecting means, and ones of the elongate spring members have curved end regions that wrap about exterior portions of at least one of said C-shaped cross sections.

9. The closure of claim 7 additionally including latching means for defining at least one opening member for retaining the sheet element, with the bottom region of the closure being visible immediately at the onset of retraction of the closure.

10. The closure of claim 9 additionally including a structure for guiding the opening member for movement between a tensioning position and a release position, so that the opening member can be moved from the release position to the tensioning position wherein the bottom region of the closure causes the flexible sheet means to be drawn taut.

11. The closure of claim 10 additionally including a power operated means for moving the opening member in at least one direction between its tensioning and release positions, and spring means for biasing the opening member in a direction opposite to the motion effected by the power operated means toward one of its tensioning and release positions, wherein the power operated means, when actuated, overcomes the biasing action of the spring means to move the opening member toward its release position.

12. The closure of claim 1 additionally including an auxiliary elongate inflatable means connected to and extending along the flexible sheet means for serving as a "stay" to rigidify the flexible sheet means, and for not impeding retraction of the flexible sheet means.

13. The closure of claim 1 wherein the flexible sheet portion is formed, at least in part, from a material that exhibits high resistance to tearing, stretching, and other forms of deformation.

14. The closure of claim 1 wherein the flexible sheet means extends to define a smooth and continuous surface on which indicia such as attractive designs may be imprinted, and elongate pocket formation means extend along the inner side of the flexible sheet means to define one set of elongate pockets for containing portions of the retraction means and portions of the extension means.

15. The closure of claim 14 wherein the extension means includes a plurality of separate inflatable members for extending the flexible sheet portion, wherein the inflatable members are spaced substantially eguidistantly across the inner surface of the flexible sheet means.

16. A top-hung retractable closure including a flexible sheet of material that is connectable to a support structure extending along an opening that is selectively covered by the closure, with the flexible sheet being retractable into and extensible from a roll form, a retraction means carried in one set of pocket formations of only an upper portion of the flexible sheet for coiling the upper portion into said roll form, and extension means carried in another set of pocket formations of only said upper portion of the flexible sheet for unrolling said upper portion, wherein the retraction means concurrently incorporates a lower portion of the flexible sheet into said roll form thereby producing a "double roll" that contains parts of said upper and lower portions of the flexible sheet.

17. The top-hung retractable closure of claim 16 additionally including an elongate connection means for extending across and connecting to the flexible sheet along a region of juncture of said upper and lower portions of the flexible sheet, wherein the upper and lower portions of the flexible sheet are connected by the elongate connection means thereby respectively constituting separate and distinct upper and lower sheet members, and the retraction means have lower end regions that are connected to the elongate connection means.

18. The top-hung retractable closure of claim 16 wherein the retraction means includes a plurality of elongate self-biased spring members connected to the upper portion of the flexible sheet to coil the upper portion of the flexible sheet thereby forming a roll, and with each of the spring members extending across the flexible sheet into a separate pocket formation of said one set of pocket formations.

19. The top-hung retractable closure of claim 18 wherein the extension means includes a plurality of elongate and inflatable fluid-pressure-expansible members that extend across the upper portion of the flexible sheet at transversely spaced locations, with the fluid-pressure-expansible members being expandable for extending the upper portion of the flexible sheet.

20. The closure of claim 16 additionally including retracted closure positioning means interposed between the upper portion of the flexible sheet and said support structure for selectively raising and lowering the "double roll" of the retracted closure, and elongate connecting means to connect the upper and lower portions of the flexible sheet, wherein the elongate connecting means defines attachment means coupling another structure with said attachment means.

21. The closure of claim 16 wherein the elongate spring members are attached to the upper portion of the flexible sheet causing roll-up of the closure during retraction to initiate between the upper and lower portions of the flexible sheet.

22. The closure of claim 16 additionally including latching means for defining at least one opening member for retaining the bottom region of the flexible sheet and holding the closure extended with the bottom region of the flexible sheet being removable from the opening member, and a structure for guiding the opening member to move between a tensioning position, causing the closure to be drawn taut, and a release position causing the closure to withdraw from the opening member.

23. The closure of claim 22 additionally including power operated means for moving the opening member in at least one direction between its tensioning and release positions, and spring means for biasing the opening member toward one of its tensioning and release positions in a direction opposite to the power operated means, wherein the power operated means, when actuated, overcomes the biasing action of the spring means to move the opening member toward its release position.

24. The closure of claim 16 wherein the extension means includes a plurality of separate inflatable members for extending the upper portion of the flexible sheet, wherein the inflatable members are spaced equidistantly across the inner surface of the upper portion of the flexible sheet.

25. A retractable closure hung substantially vertically from a substantially horizontally extending support structure located near an upper area of a wall opening, and for providing a closure portion that is extensible to cover and retractable to uncover at least a portion of said opening, wherein the closure comprises:
   a) flexible sheet means for defining a rollable structure 1) that extends from an upper end region of the flexible sheet means across a central region thereof to a lower end region thereof, 2) that can be retracted by causing its central region and the lower end region to be rolled-up to a retracted position wherein the closure uncovers said opening, and 3) that can be extended by causing its central region and its lower end region to be unrolled into an extended position wherein the closure covers said portion of said opening;
   b) mounting means 1) for connecting the upper end region of the flexible sheet means to said support structure such that the central region and the lower end region of the flexible sheet means define an extensible portion of the flexible sheet means that unrolls during extension and rolls-up during retraction movements of the flexible sheet means;
   c) retraction means for an upper part of said extensible portion of the flexible sheet means;
   d) extension means for extending said upper part of said extensible portion of the flexible sheet means; and,
   e) wherein a lower part of said extensible portion of the flexible sheet means rolls-up into a "double roll" together with said upper part of the extensible section during retraction of said flexible sheet means.

26. The closure of claim 25 additionally including first pocket-defining means connected to the upper part of the flexible sheet means for defining a first set of elongate pockets that enclose at least portions of said retraction means, wherein the retraction means includes a plurality of elongate spring members that extend within said first set of elongate pockets, and connection means are provided for connecting each of the elongate spring members to the flexible sheet means at only one location along each of the elongate spring members.

27. The closure of claim 26 additionally including second pocket-defining means connected to the upper part of the flexible sheet means for defining a second set of elongate pockets that enclose at least portions of said extension means, wherein the extension means includes a plurality of elongate inflatable extension members that extend within said second set of elongate pockets.

28. The closure of claim 25 wherein said retraction means comprises elongate spring members which are connected to the upper part of the flexible sheet means and are configured to coil the upper part of the flexible sheet means during retraction.

29. The closure of claim 28 additionally including pocket defining means connected to the inner surface of the upper part of the flexible sheet means for connecting the extension means to the upper part of the flexible sheet means, and for connecting the retraction means to the upper part of the flexible sheet means.

30. The closure of claim 28 wherein the elongate spring members are positioned in a set of elongate pockets located on the inner surface of the flexible sheet means.

31. The closure of claim 25 wherein:
   a) the retraction means includes a plurality of elongate spring members that extend across the upper part of the flexible sheet means in a lengthwise direction and are connected to the upper part of the flexible sheet means for retracting the upper part of the flexible sheet means; and,
   b) the extension means includes a plurality of fluid-pressure-expansible members that extend across the upper part of the flexible sheet means in a lengthwise direction and are connected to the upper part of the flexible sheet means to intersperse the fluid-pressure expansible members among the elongate spring members, wherein the fluid-pressure-expansible members expand and apply extension force to the upper part of the flexible sheet means.

32. The closure of claim 25 additionally including connection means for forming a juncture between the central and lower regions of the flexible sheet means, to initiate roll-up of the closure during retraction within the vicinity of the connection means, and to raise a bottom part of the lower portion immediately at the onset of retraction of the closure.

33. The closure of claim 32 additionally including latching means for defining at least one opening member for retaining the bottom part and holding the closure extended, with the bottom part being removable immediately at the onset of retraction of the closure, and a structure for guiding the opening member for movement between a tensioning position, when the bottom part is retained by the opening member thereby drawing the flexible sheet taut, and a release position thereby withdrawing the bottom part from the opening member.

34. The closure of claim 33 additionally including power operated means for moving the opening member in at least one direction between its tensioning and release positions, and spring means for biasing the opening member in a direction opposite to the power operated means, wherein the spring means biases the opening member toward its tensioning position, and the power operated means, when actuated, overcomes the biasing action of the spring means to move the opening member toward its release position.

35. The closure of claim 25 additionally including auxiliary elongate inflatable means connected to the flexible sheet means and extending along a segment of the inflatable sheet means for rigidifying the segment of the flexible sheet means.

36. A vertically-hung retractable closure for covering and uncovering a selected area by unrolling from a retracted roll form configuration, and by rolling up into the retracted roll form configuration, wherein the closure comprises:
   a) a flexible sheet;
   b) means for mounting a top end region of the flexible sheet atop the selected area;
   c) retraction means including a plurality of elongate spring members connected to the flexible sheet for retracting the flexible sheet upwardly into a roll form configuration to uncover the selected area;
   d) extension means including a plurality of elongate inflatable members connected to the flexible sheet that cause the flexible sheet to unroll from said roll form configuration to cover the selected area; and,
   e) wherein at least one of the retraction and extension means does not extend the full length of the sheet so that the roll-up retraction initiates along the length of the sheet.

37. The closure of claim 36 additionally including an elongate, rigid member connected to the flexible sheet and extending along the sheet where roll-up retraction initiates while the closure is fully extended, wherein bottom end regions of the elongate spring members are connected to the rigid member, with the other portions of the elongate spring members being movable relative to the flexible sheet.

38. The closure of claim 37 wherein the rigid member has a C-shaped hollow passage that retains an enlarged formation of the flexible sheet, and wherein said means for mounting the top end region of the flexible sheet includes a rigid member that has a C-shaped hollow passage that retains an enlarged formation of the top end region of the flexible sheet thereby establishing a connection between the rigid member and the top end region of the flexible sheet.

39. The closure of claim 36 additionally including a first set of elongate pocket defining means that defines elongate pockets spaced across and connected to the interior surface of the flexible sheet for containing at least portions of the elongate inflatable members, and a second set of elongate pocket defining means that defines elongate pockets spaced across and connected to said interior surface for containing at least portions of the elongate spring members, with the elongate inflatable members including separate elongate inflatable members installed in each of said elongate pockets of said first set, and the pockets of the second set each receiving portions of a separate one of the elongate spring members.

40. The closure of claim 30 wherein said means for mounting the top end region of the selected area covered and uncovered by the closure includes retracted roll form positioning means for raising the roll form of the closure when the closure is fully retracted to ensure that the retracted roll form fully uncovers the area.

41. A retractable closure for an opening of a freight hauling vehicle, comprising:

a sheet of flexible material having a first longitudinally extending section terminating in a first end of said sheet and a second longitudinally extending section terminating in a second end of said sheet;

a securing means for fastening said first end of said sheet to the freight hauling vehicle adjacent the opening thereof, wherein said sheet is configured, when in an extended position, to cover the opening of the vehicle and, when in a retracted position, to uncover the opening of the vehicle;

a retraction spring for applying a retraction force to said sheet to cause said sheet to roll upon itself and uncover the opening of the vehicle, said retraction spring being secured to said sheet first longitudinal section and extending from adjacent said sheet first end toward said sheet second end; and, an extension member for applying an extension force to said sheet, in opposition to said retraction force, to cause said sheet to unroll and cover the opening of the vehicle, said extension member comprising a first fluid pressure expansible tube secured to at least said first longitudinal section of said sheet.

42. The retractable closure of claim 41 wherein said securing means comprises a first housing for holding said first end of said sheet.

43. The retractable closure of claim 42 further comprising a second housing for holding said second end of said sheet.

44. The retractable closure of claim 41 further comprising a means for selectively connecting said first fluid pressure expansible member to a source of pressurized fluid.

45. A retractable closure for an opening of a freight hauling vehicle, comprising:

a first curtain section of flexible material having a first end and a second end;

a first housing in which said first curtain section first end is secured, said first housing being secured to the freight hauling vehicle adjacent the opening thereof;

a second curtain section of flexible material having a first end and a second end, said second curtain section being located adjacent said first curtain section and being operatively secured thereto;

a second housing in which said second curtain section second end is secured, said second housing being selectively secured to the freight hauling vehicle adjacent the opening thereof in a spaced manner from said first housing, wherein said first and second curtain sections are configured, when in an extended position, to cover the opening of the vehicle and, when in a retracted position, to uncover the opening of the vehicle;

a first retraction spring for applying a retraction force to said first curtain section to cause said first curtain section to roll upon itself and uncover the opening of the vehicle, said first retraction spring being secured to said first curtain section; and, an extension member for applying an extension force to said first curtain section, in opposition to said retraction force, to cause said first curtain section to unroll and cover at least a portion of the opening of the vehicle, said extension member comprising a first fluid pressure expansible tube secured to at least said first curtain section.

46. The retractable closure of claim 45 further comprising a third housing in which said first curtain section second end and said second curtain section first end are secured, said third housing being operatively secured to the freight hauling vehicle adjacent the opening thereof.

47. The retractable closure of claim 45 wherein said extension member further comprises a plurality of additional fluid pressure expansible tubes which are secured to said sheet and which are spaced from each other and from said first fluid pressure expansible tube.

48. The retractable member of claim 45 further comprising a plurality of additional retraction springs secured to said first curtain section and spaced from each other and from said first retraction spring.

49. A retractable closure for an opening of a freight hauling vehicle, comprising:

a first sheet of flexible material having first and second ends;

a second sheet of flexible material, spaced from said first sheet, and having first and second ends;

an upper housing member, in which said first end of said first sheet is secured, said upper housing being fastened to the freight hauling vehicle adjacent the opening thereof;

a central housing member in which said second end of said first sheet and said first end of said second sheet are secured, wherein said first and second sheets are configured, when in an extended position, to cover the opening of the vehicle and, when in a retracted position, to uncover the opening of the vehicle;

a retraction member secured to said first sheet for applying a retraction force to said first sheet to cause said first sheet second end to roll said central housing member up into said first sheet and thereby also roll said second sheet up into said first sheet along with said central housing member and uncover the opening of the vehicle, said retraction member being secured to said first sheet; and, an extension member secured to said first sheet for applying an extension force to said first sheet in opposition to said retraction force, to cause said first sheet, said central housing member and said second sheet to unroll and cover the opening of the vehicle.

50. The retractable closure of claim 49 further comprising a lower housing member to which said second end of said second sheet is secured, said lower housing member being selectively securable to the freight hauling vehicle below the opening.

51. The retractable closure of claim 49 wherein said extension member comprises a plurality of spaced fluid-pressure-expansible tubes which are secured to said first sheet.

52. The retractable closure of claim 51 further comprising a means for selectively connecting said plurality of fluid-pressure-expansible members to a source of pressurized fluid.

53. The retractable closure of claim 49 wherein said retraction member comprises a plurality of spaced retraction springs secured to said first sheet.

54. The retractable closure of claim 49 wherein said first sheet includes a pair of opposed side edges and further comprising first and second fastening members for securing said first and second side edges to said freight hauling vehicle on opposed sides of the opening when said first sheet is in an extended position.

* * * * *